(12) United States Patent
Minobe et al.

(10) Patent No.: US 7,614,776 B2
(45) Date of Patent: Nov. 10, 2009

(54) DIFFUSING BOARD AND SURFACE LIGHT SOURCE DEVICE

(75) Inventors: Tetsuya Minobe, Kusatsu (JP); Masayuki Shinohara, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 214 days.

(21) Appl. No.: 11/629,269

(22) PCT Filed: Jun. 10, 2005

(86) PCT No.: PCT/JP2005/010700
§ 371 (c)(1), (2), (4) Date: Dec. 12, 2006

(87) PCT Pub. No.: WO2005/121844
PCT Pub. Date: Dec. 22, 2005

(65) Prior Publication Data
US 2007/0242475 A1 Oct. 18, 2007

(30) Foreign Application Priority Data
Jun. 14, 2004 (JP) .............................. 2004-175773

(51) Int. Cl.
*F21V 7/04* (2006.01)
(52) U.S. Cl. ...................... 362/620; 359/599
(58) Field of Classification Search ................ 362/608, 362/619, 620; 359/599
See application file for complete search history.

(56) References Cited

U.S. PATENT DOCUMENTS

2002/0080308 A1 6/2002 Umemoto et al.

2003/0137824 A1 7/2003 Shinohara

FOREIGN PATENT DOCUMENTS

| EP | 1174735 A2 | 1/2002 |
|---|---|---|
| EP | 1279892 | 1/2003 |
| JP | 8-129205 | 5/1996 |
| JP | 8-160203 | 6/1996 |
| JP | 2003-215584 | 7/2003 |
| JP | 2003-240924 | 8/2003 |

OTHER PUBLICATIONS

Supplementary European Search Report dated Apr. 3, 2009, for related application No. 05749059.1, 6 pages.
English Patent Abstracts of Japan for patent application with publication No. JP08160203, Publication Date: Jun. 21, 1996, 1 page.
International Search Report for PCT/JP2005/010700 mailed Sep. 27, 2005 (2 pages).
Examination Report for Application No. 05 749 059.1-2216, mailed on Sep. 1, 2009 (6 pages).

*Primary Examiner*—John A Ward
(74) *Attorney, Agent, or Firm*—Osha • Liang LLP

(57) ABSTRACT

A diffusing board which can suppress moiré fringes, color flickering and screen brightness deterioration on a screen of a liquid crystal display device. On the surface of a transparent board (83), a pattern wherein substantially rectangular shapes are arranged in lattice by using a synthesized pattern (86) is formed. The synthesized pattern (86) is provided by synthesizing a plurality of first uneven patterns (84) having a linear shape which is long in one direction, and a plurality of concave lens shaped second uneven patterns (85) arranged at random.

2 Claims, 48 Drawing Sheets

[FIG. 1]
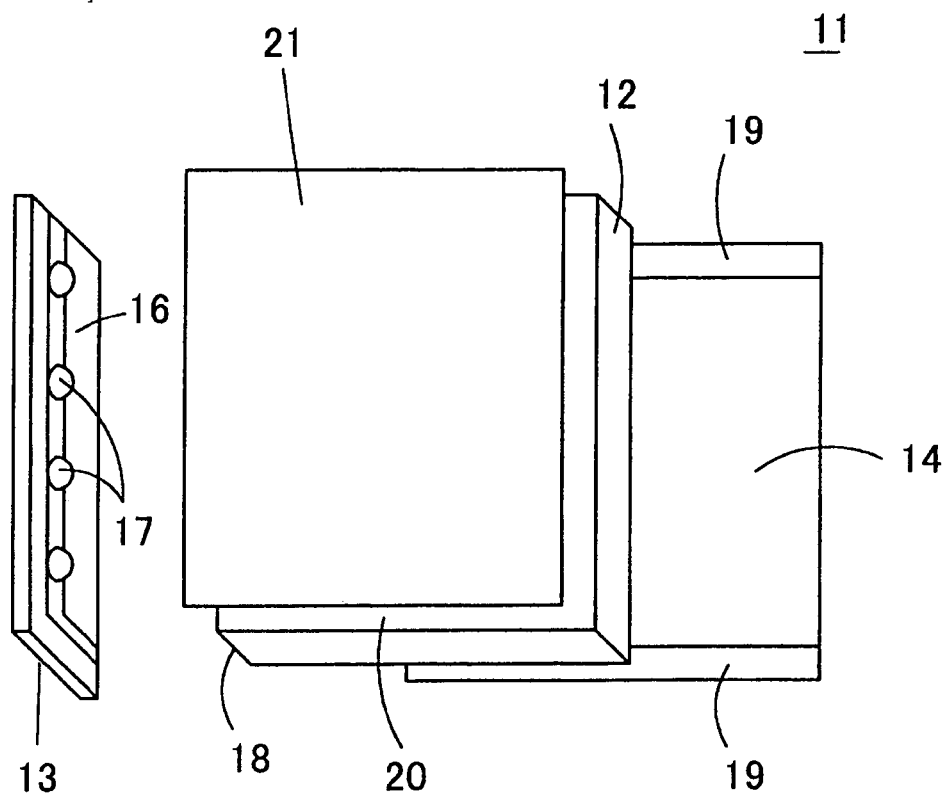
[FIG. 2]
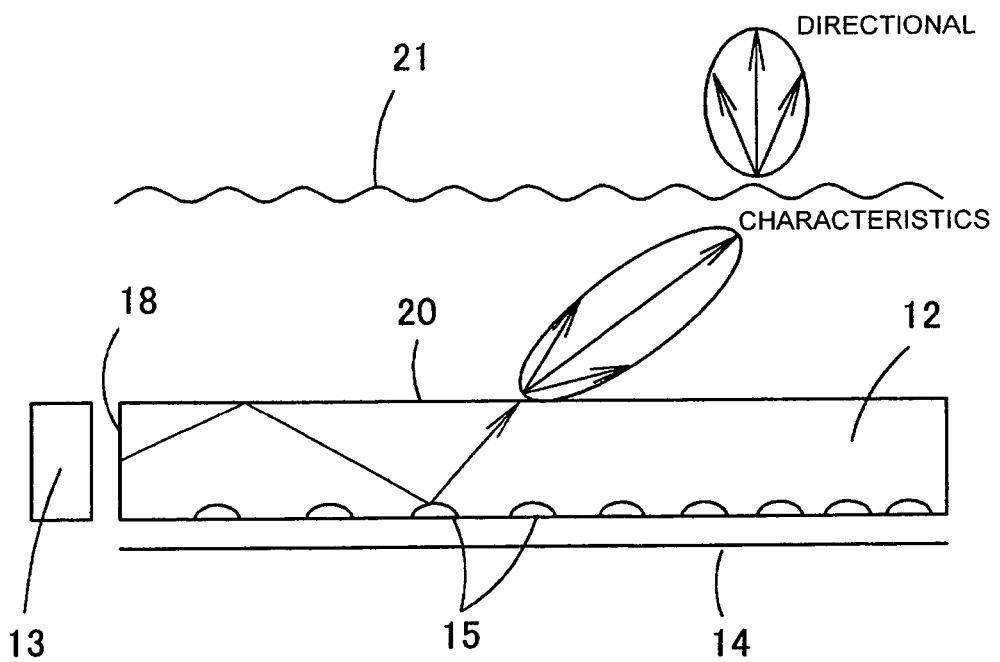

[FIG. 3]
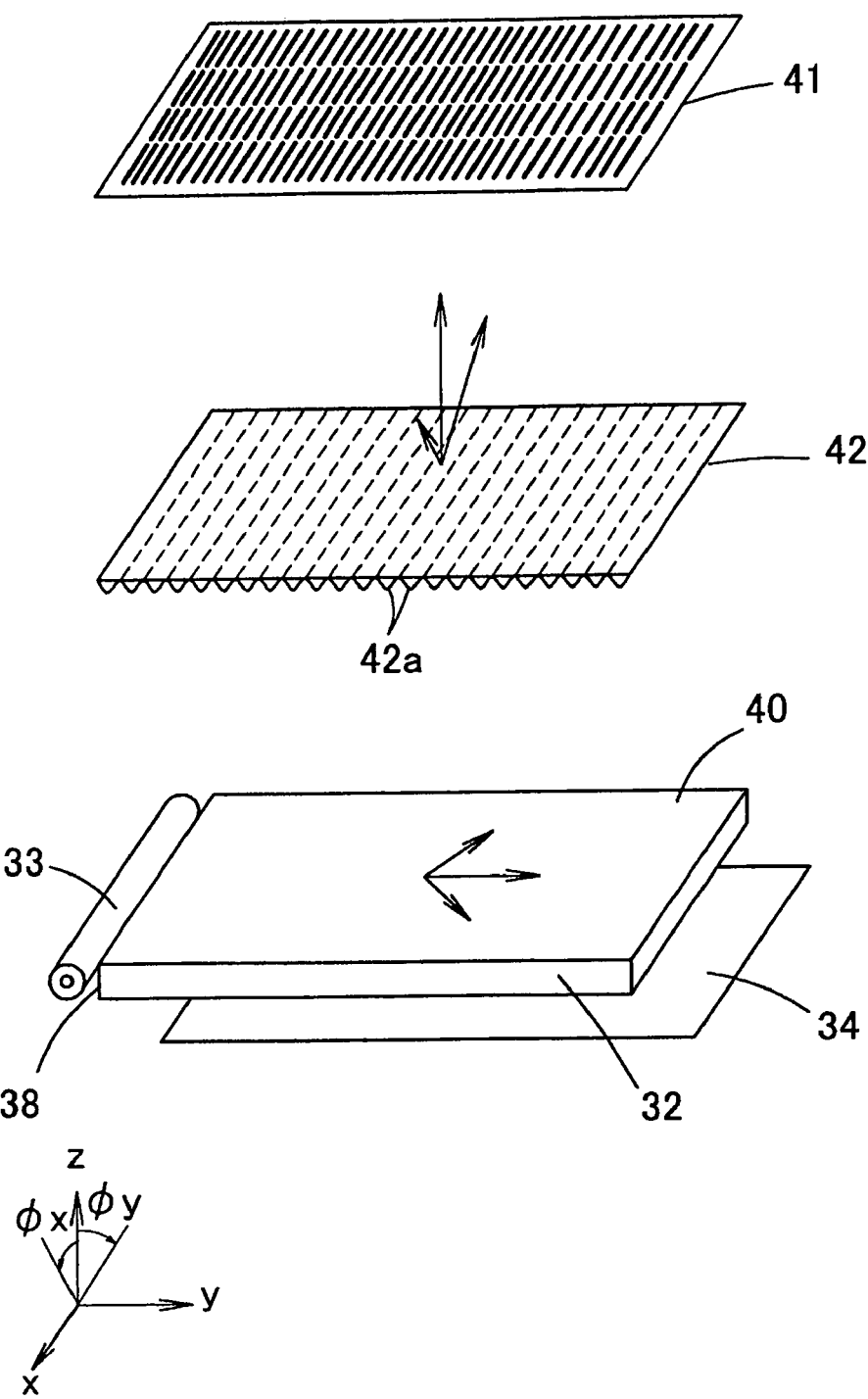

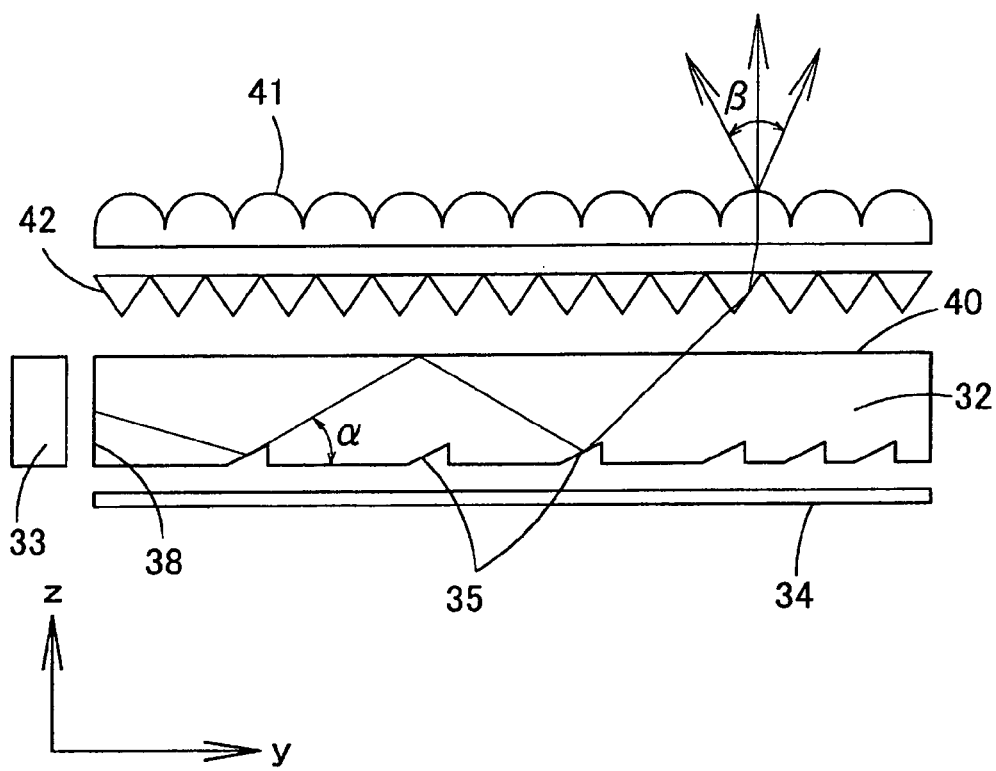
[FIG. 4]

[FIG. 5]
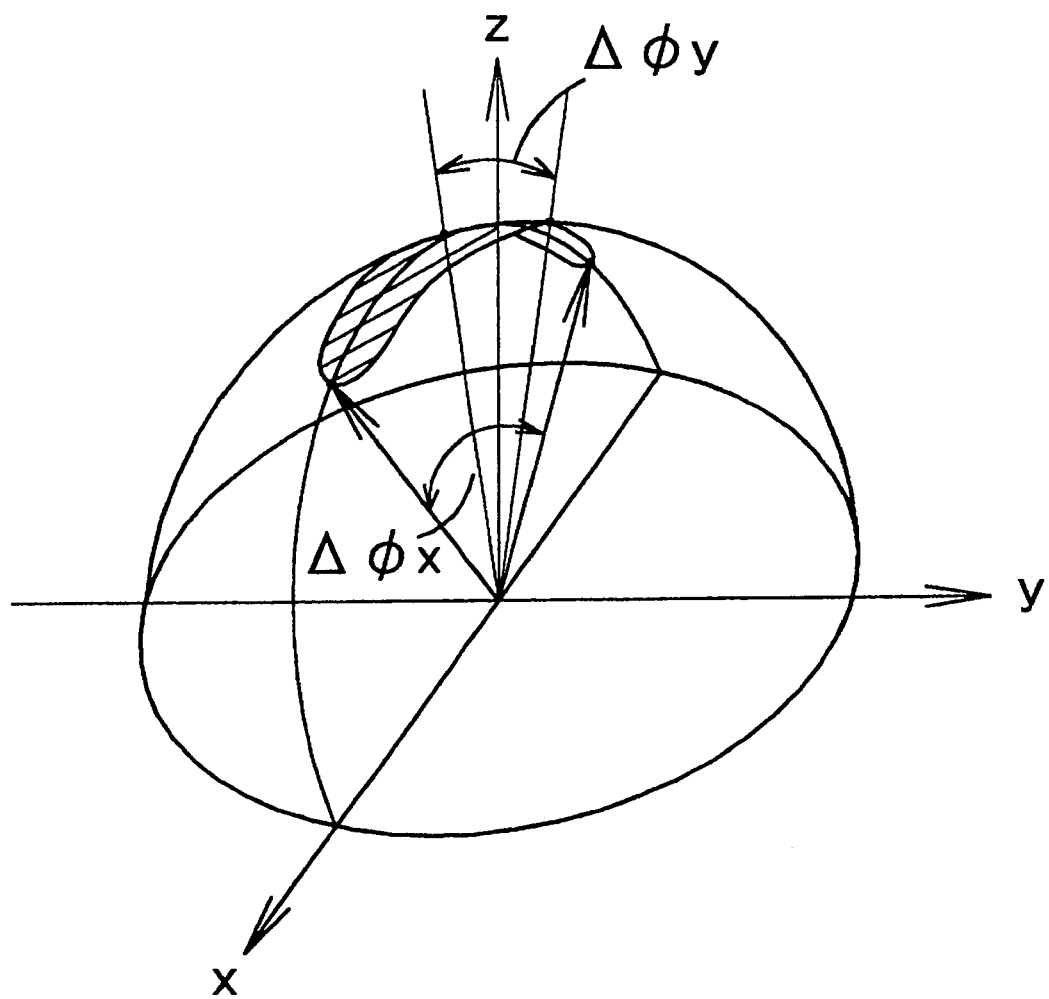

[FIG. 6]
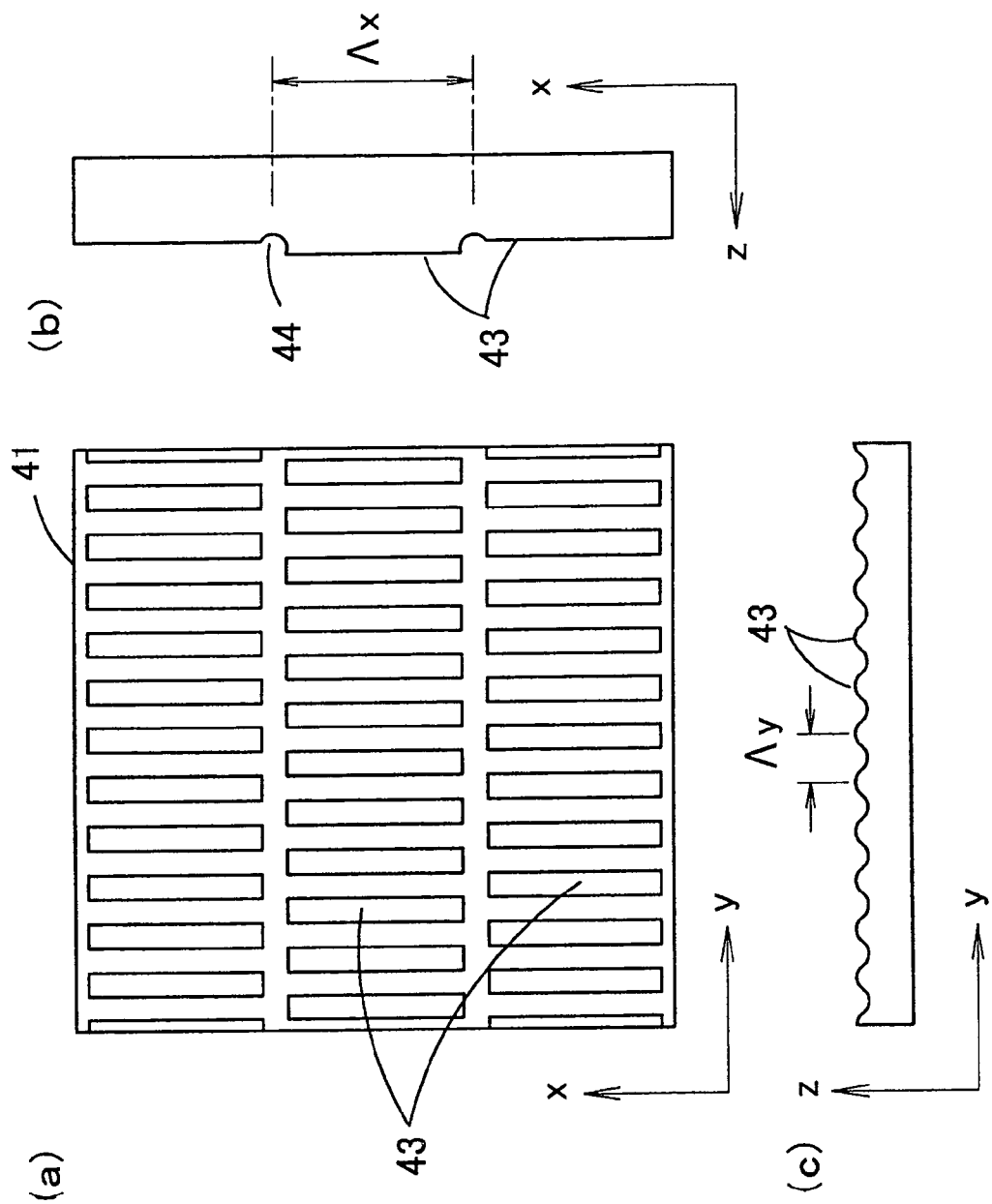

[FIG. 7]
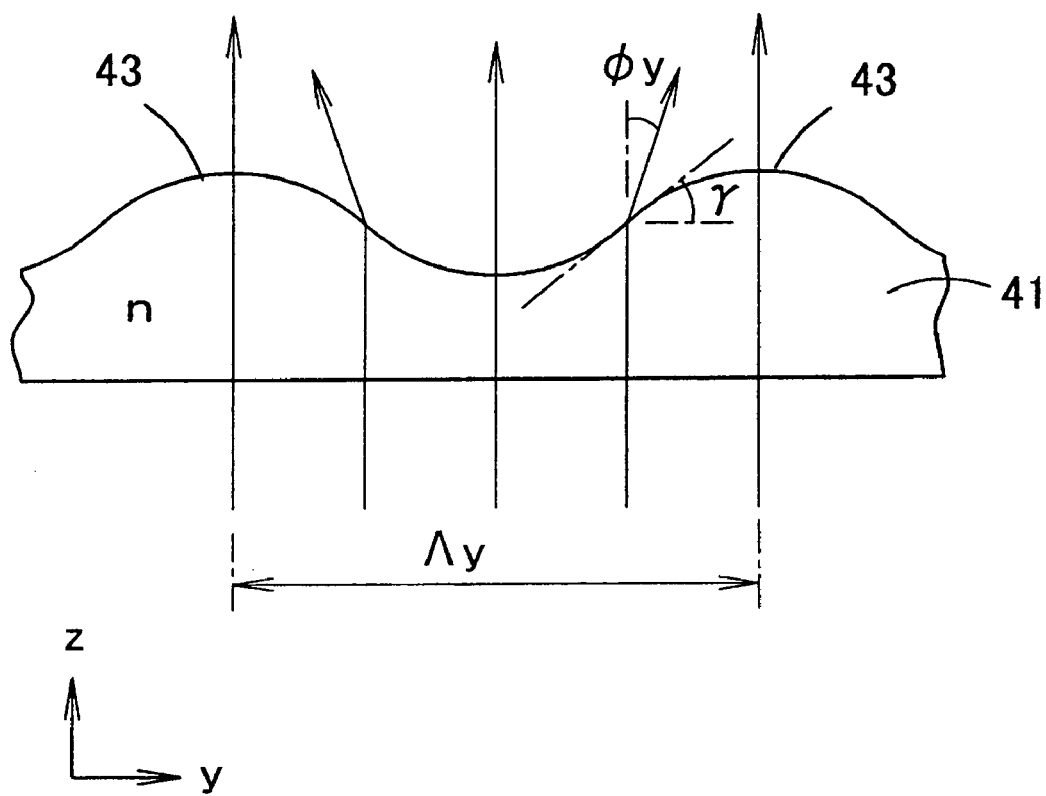

[FIG. 8]
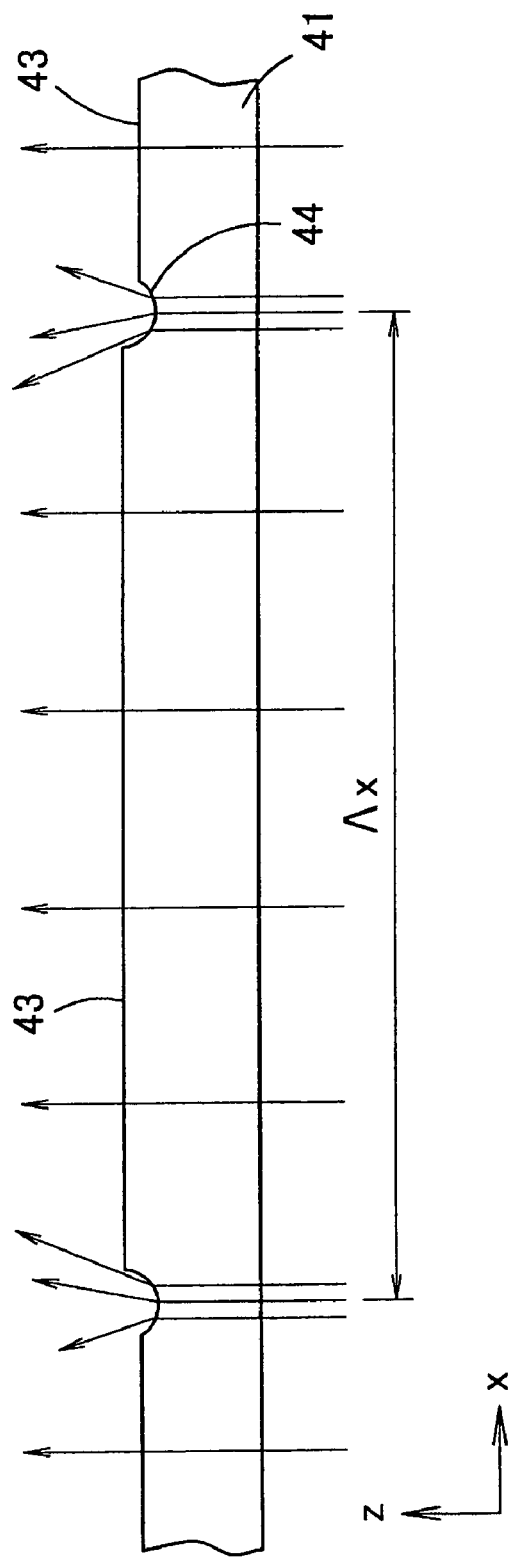

[FIG. 9]
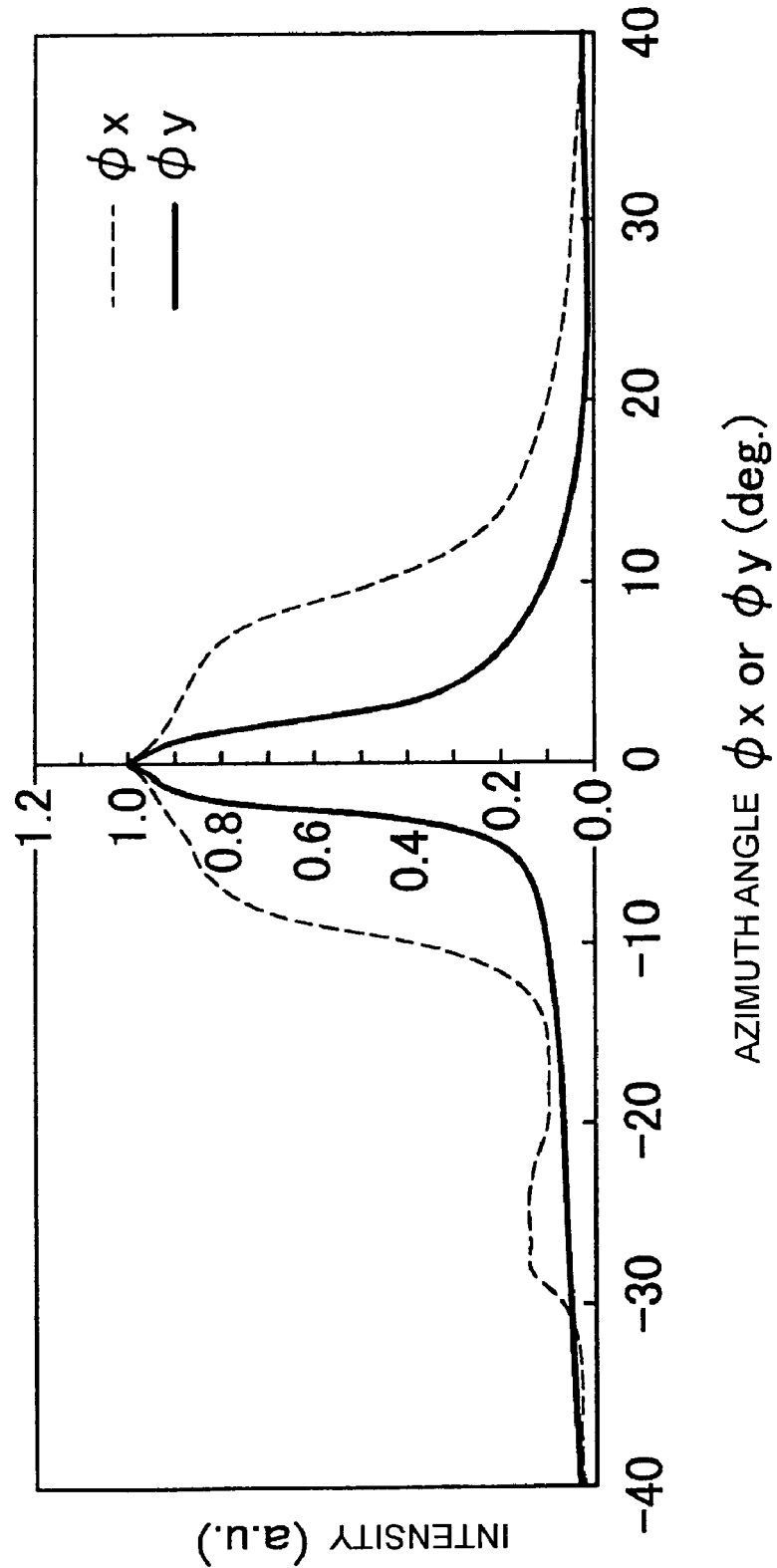

[FIG. 10]
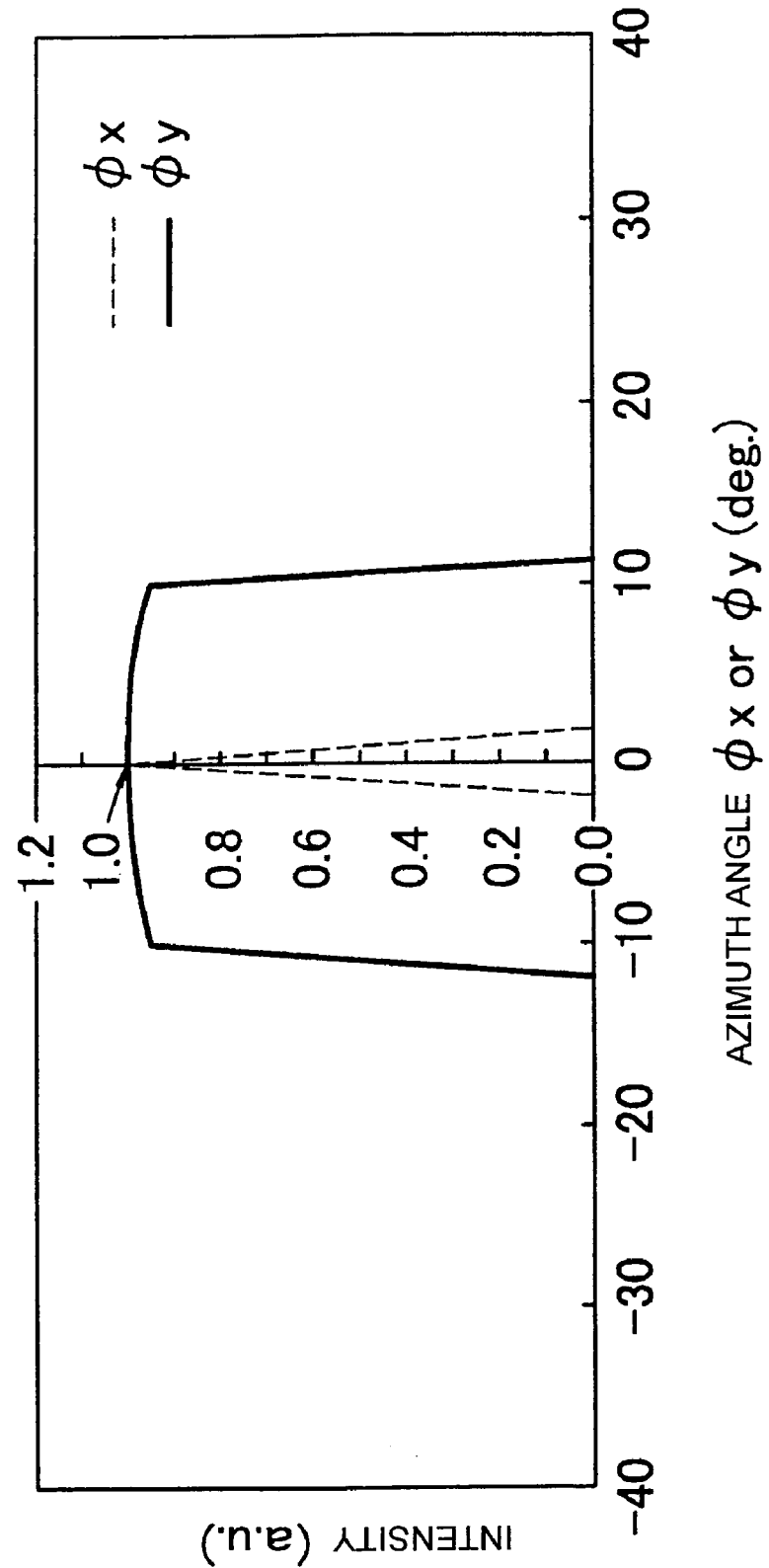

[FIG. 11]
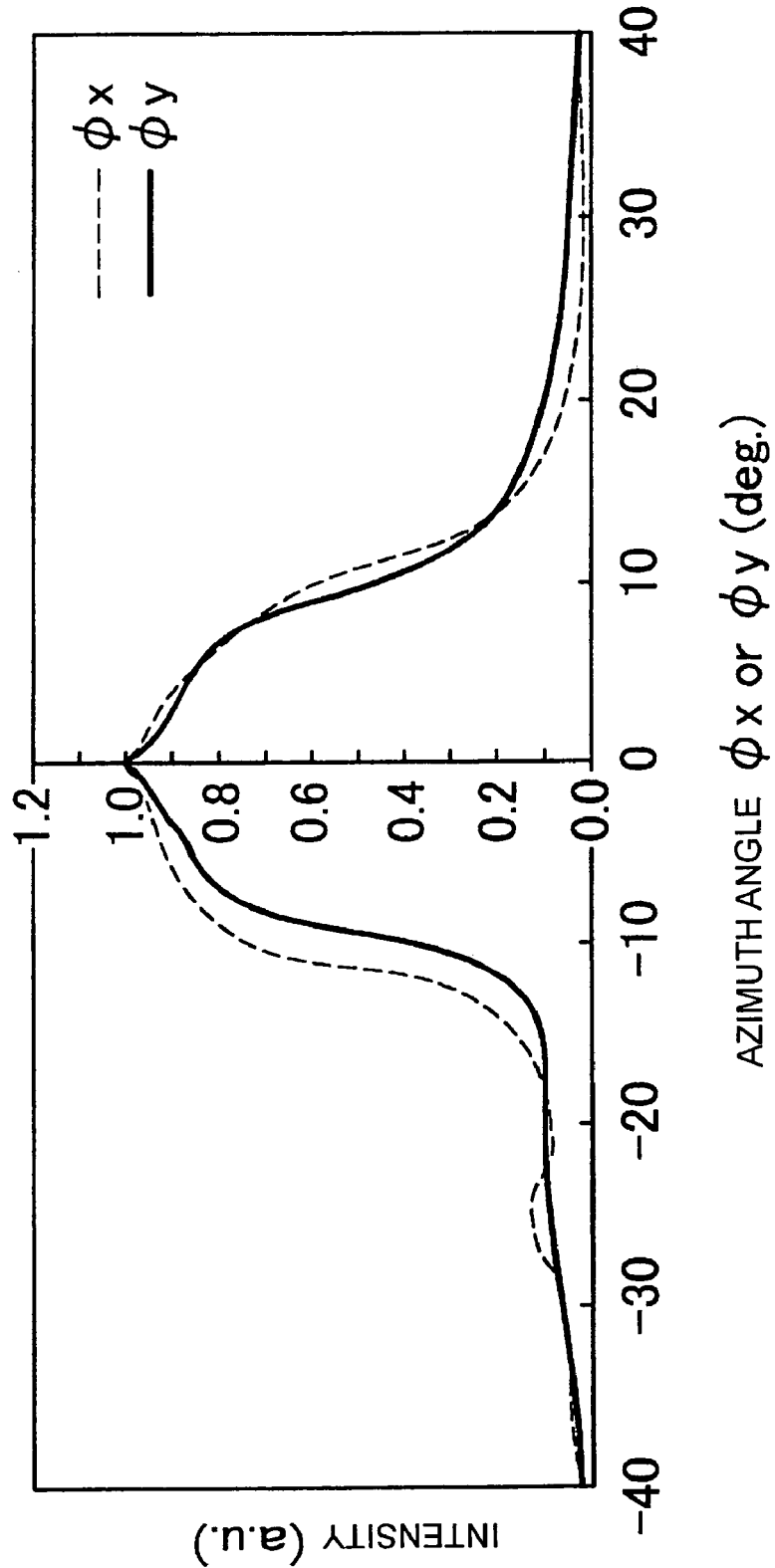

[FIG. 12]
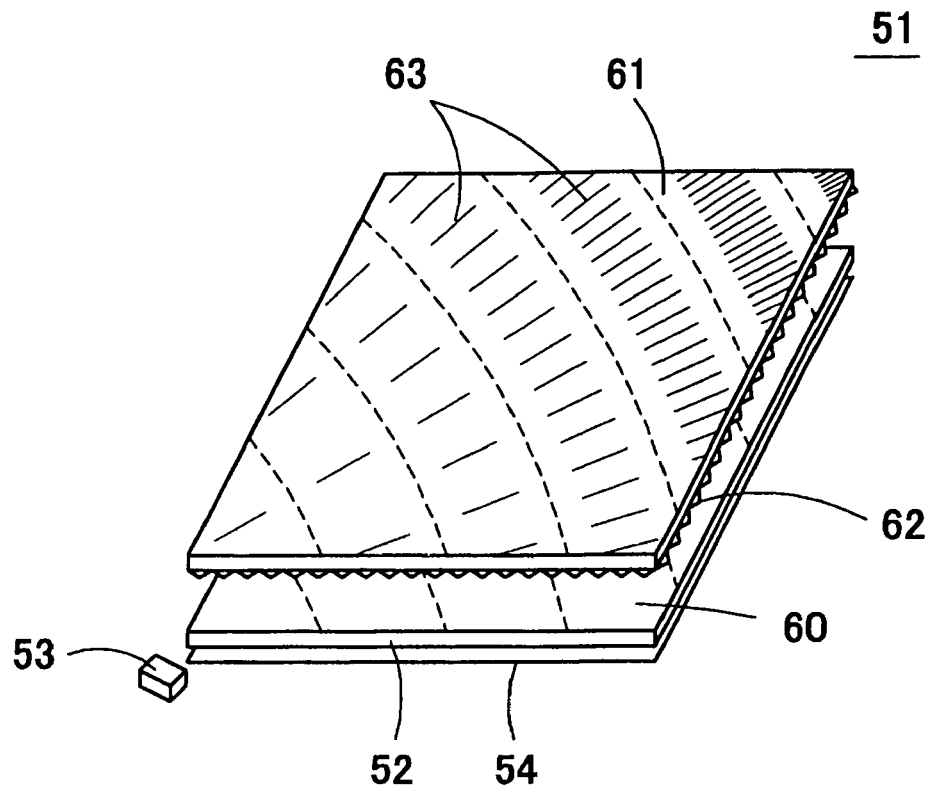
[FIG. 13]
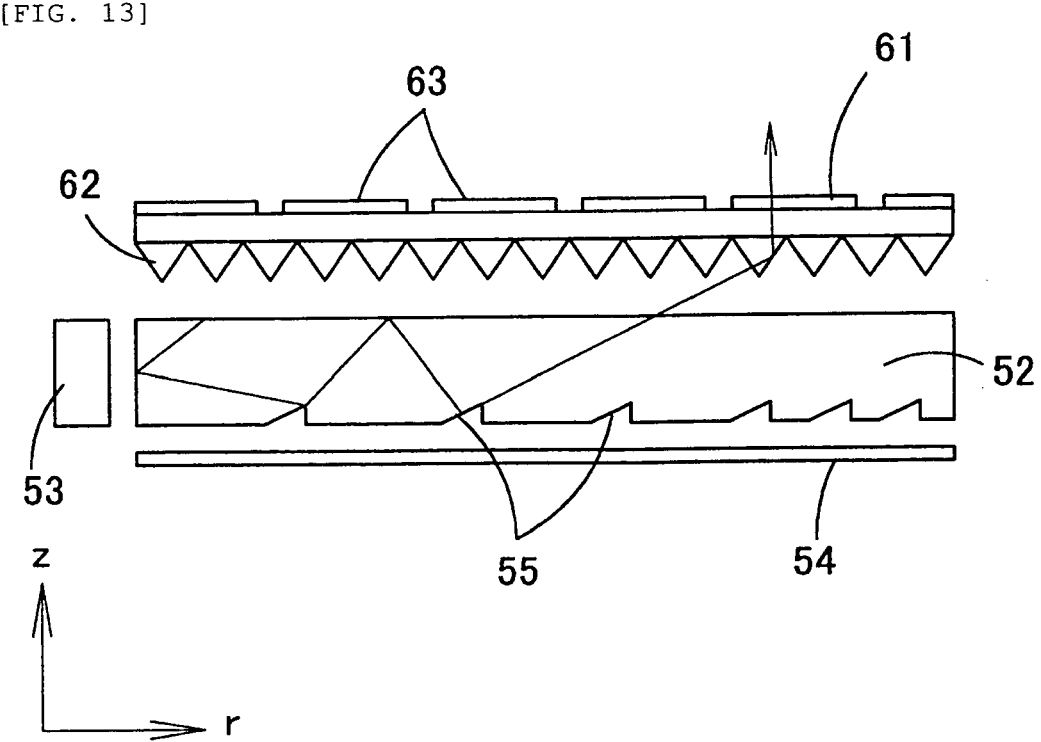

[FIG. 14]
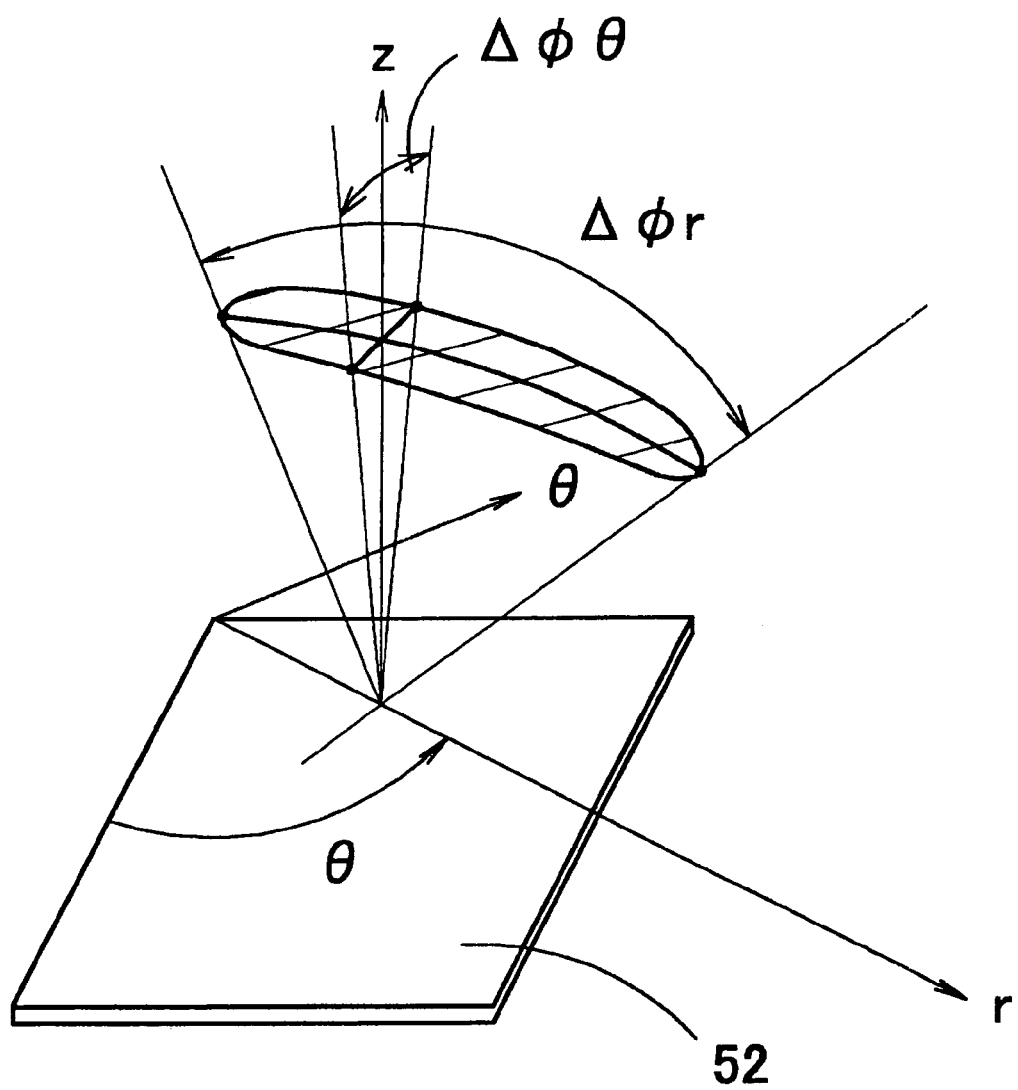

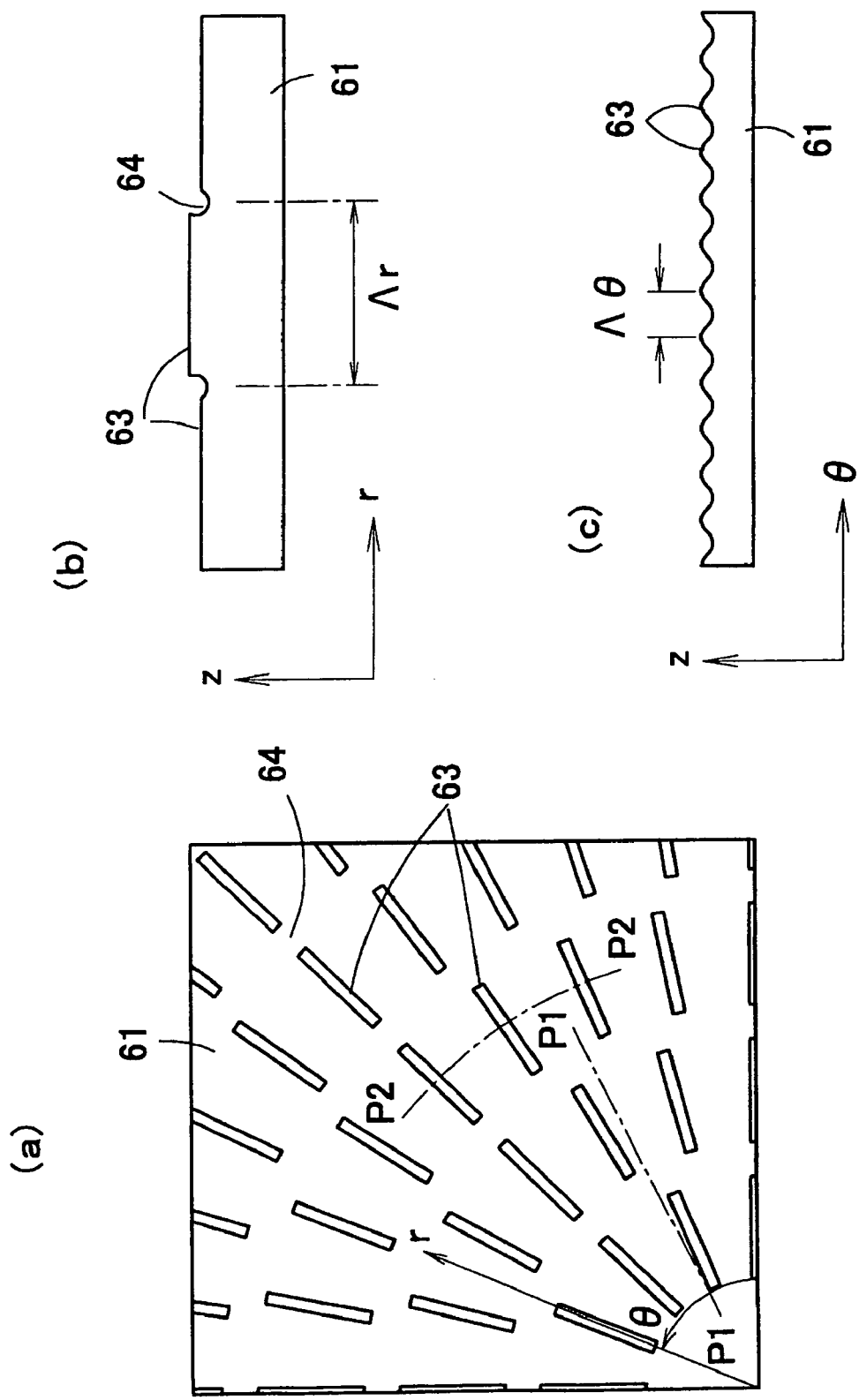
[FIG. 15]

[FIG. 16]
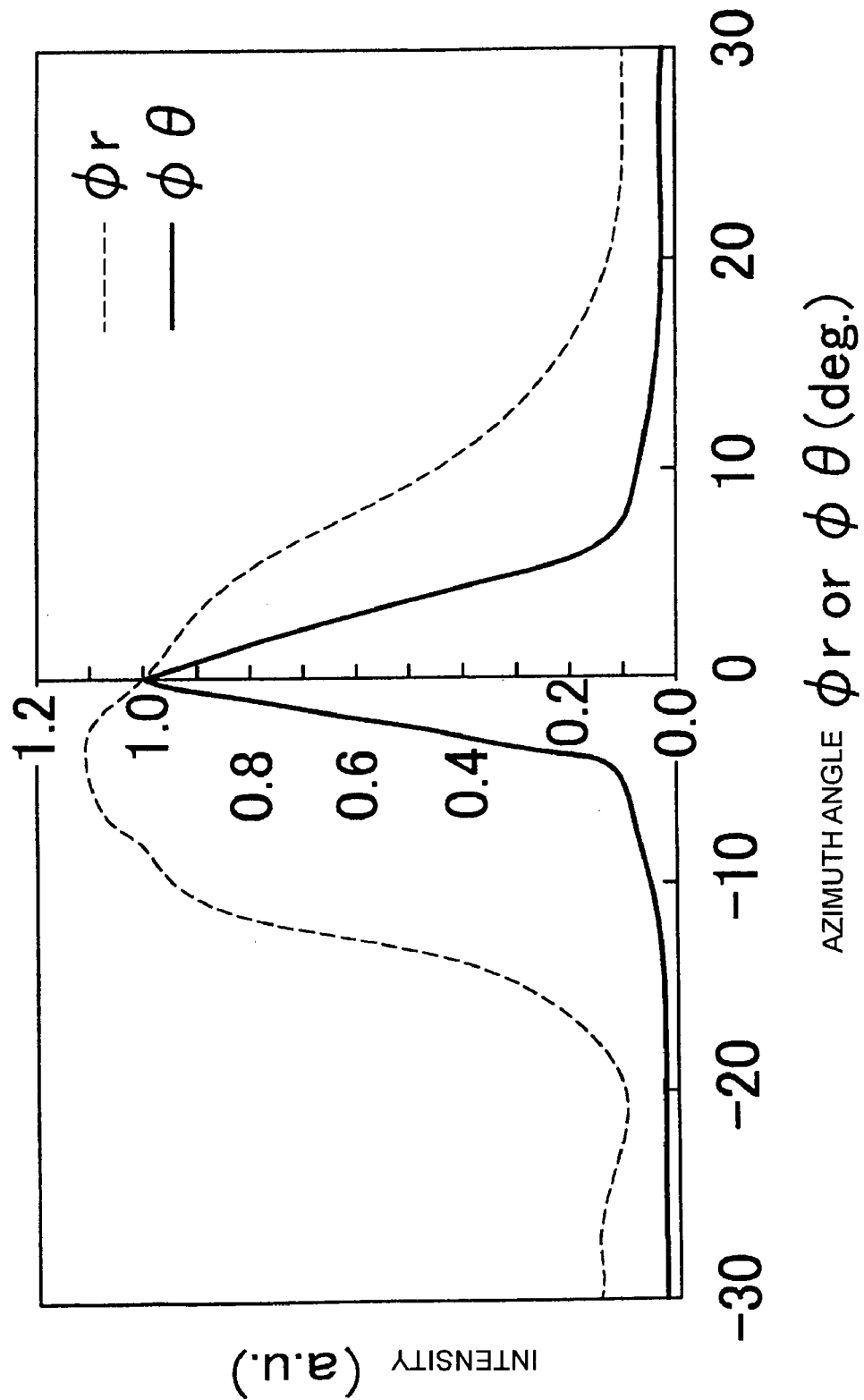

[FIG. 17]
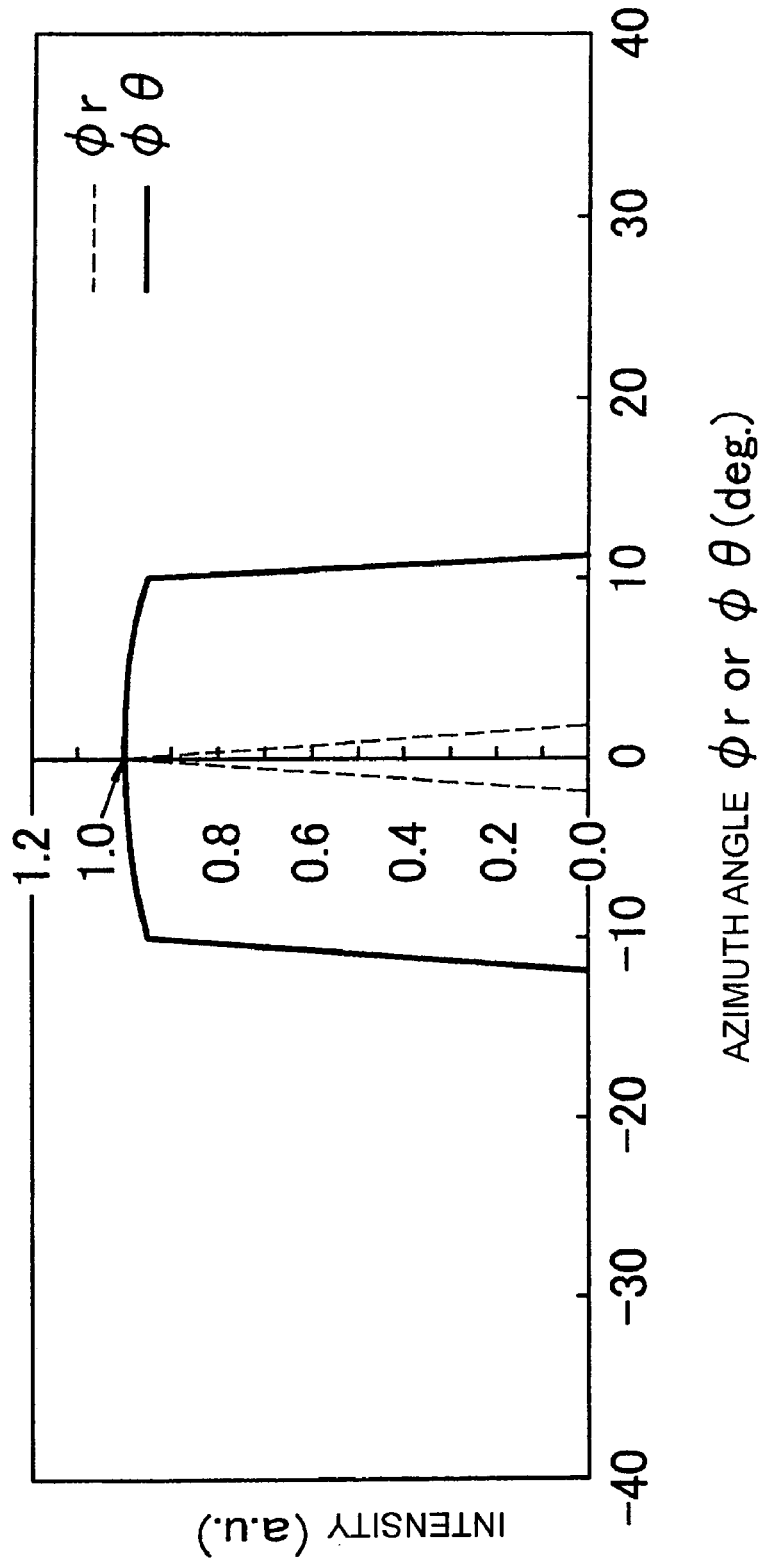

[FIG. 18]
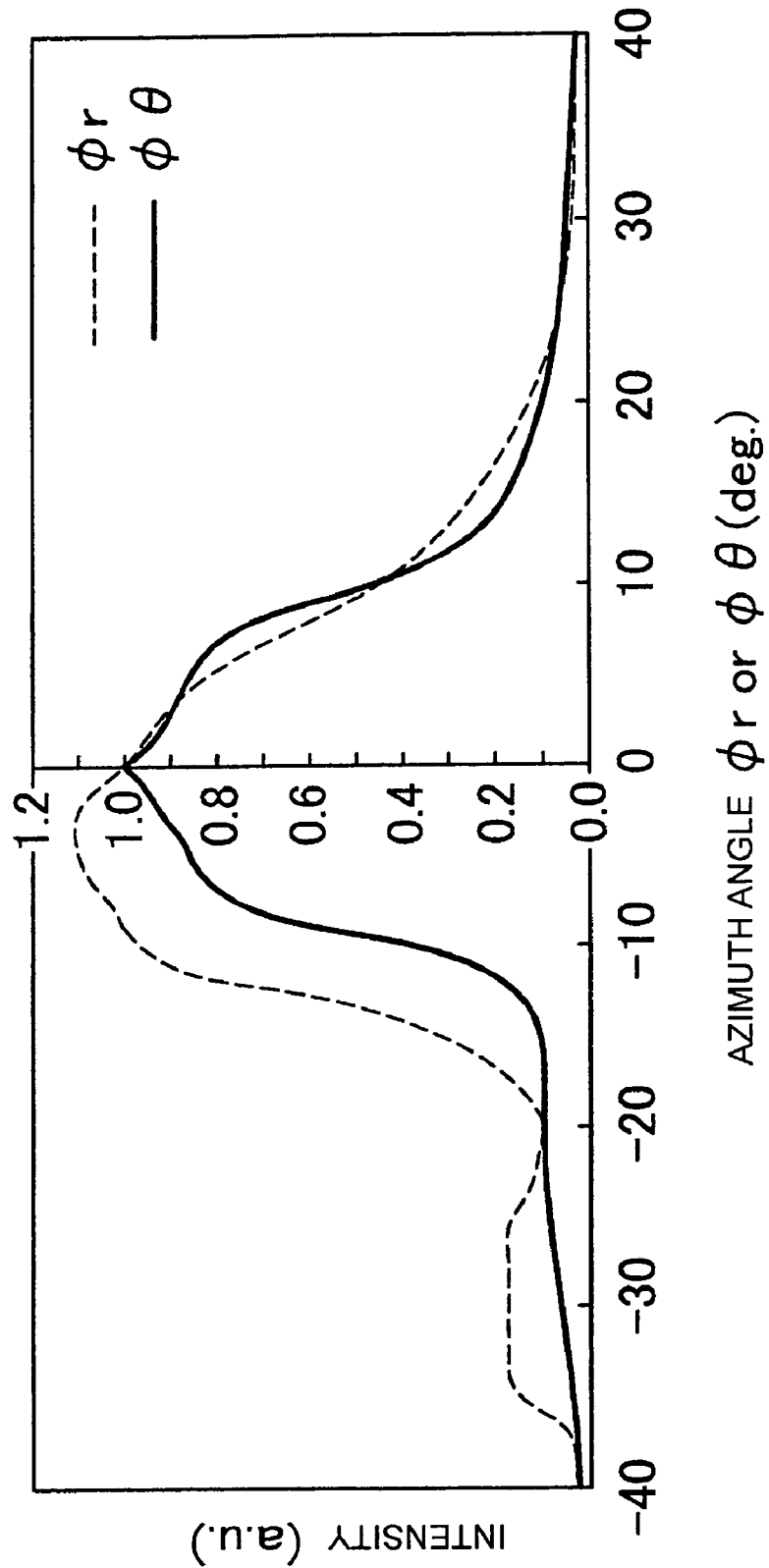

[FIG. 19]
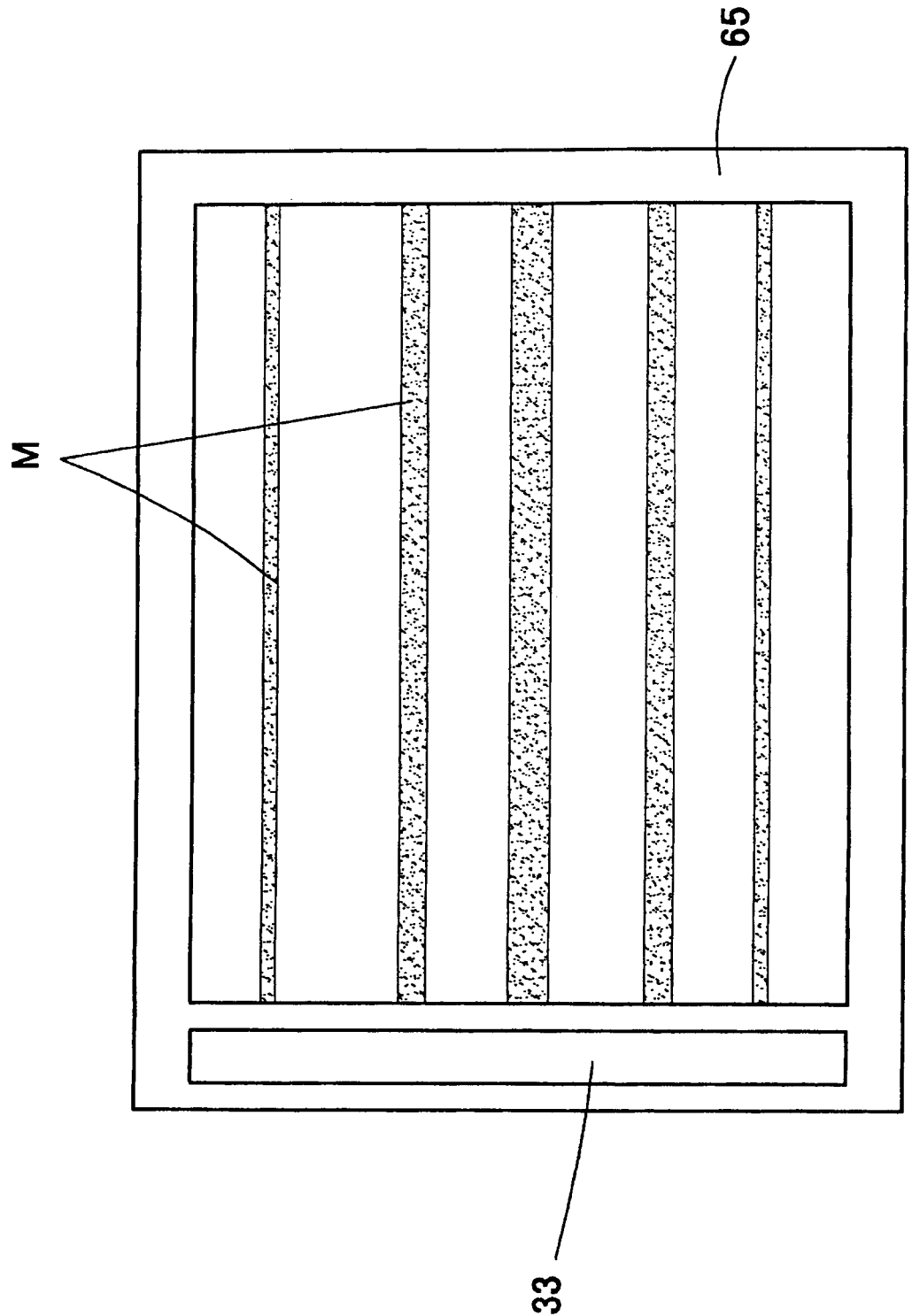

[FIG. 20]
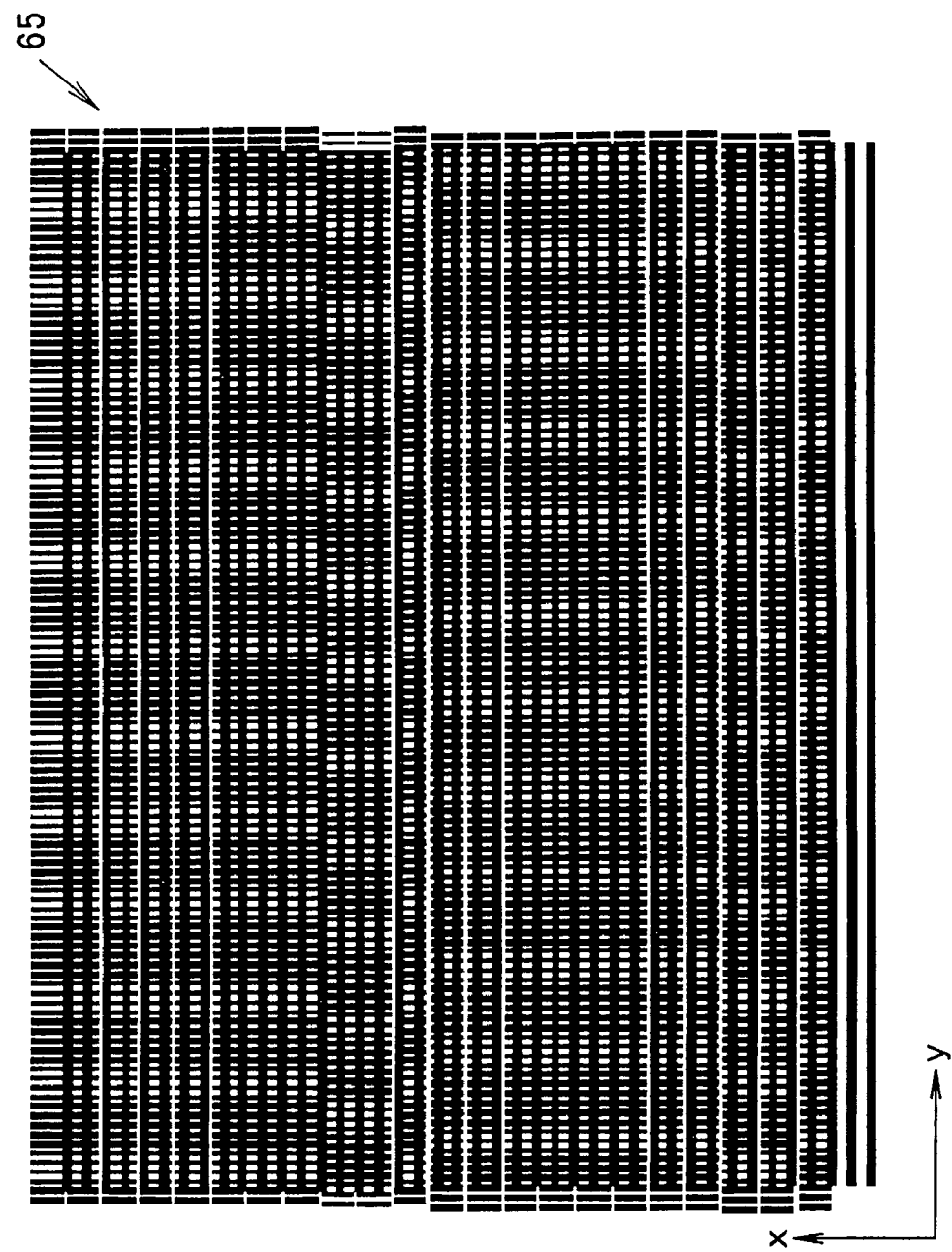
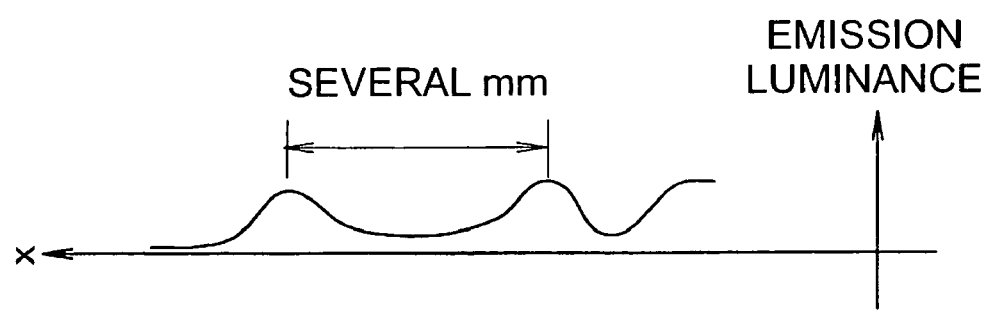
SEVERAL mm
EMISSION LUMINANCE

[FIG. 21]
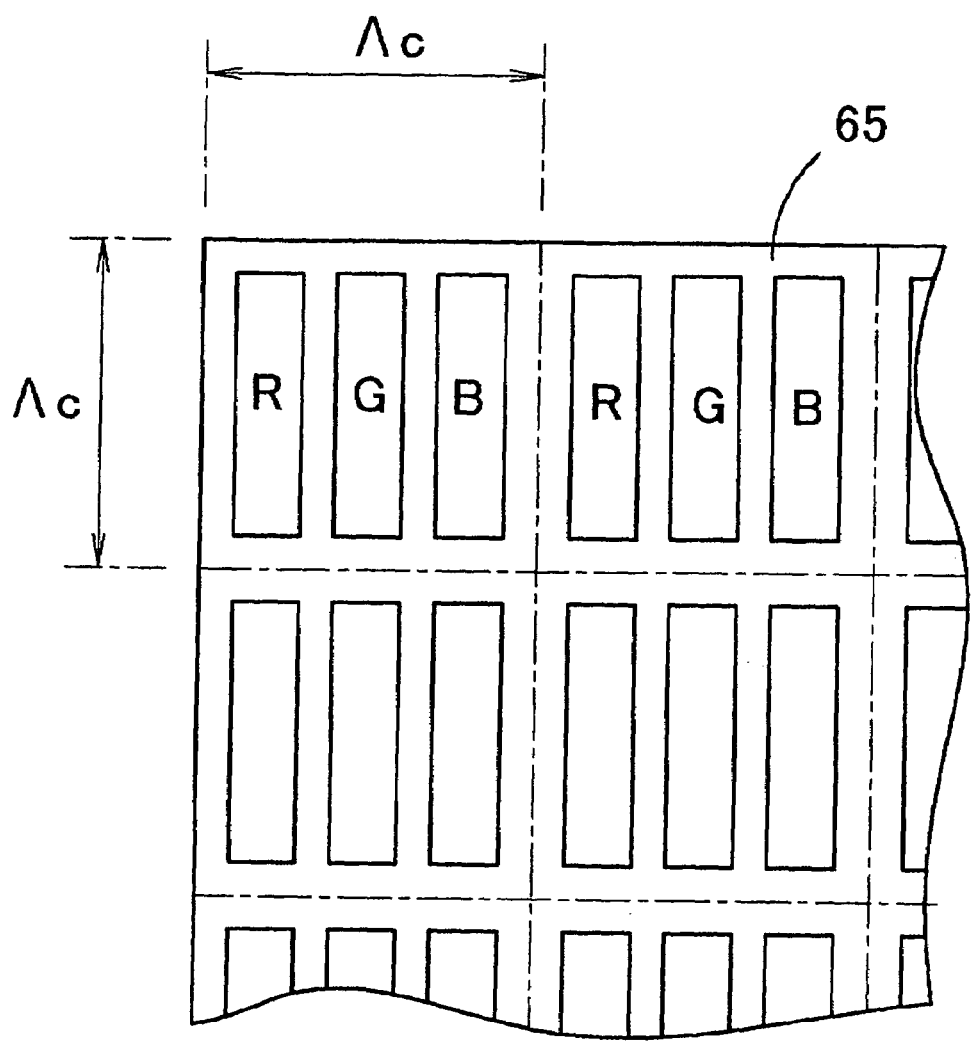

[FIG. 22]
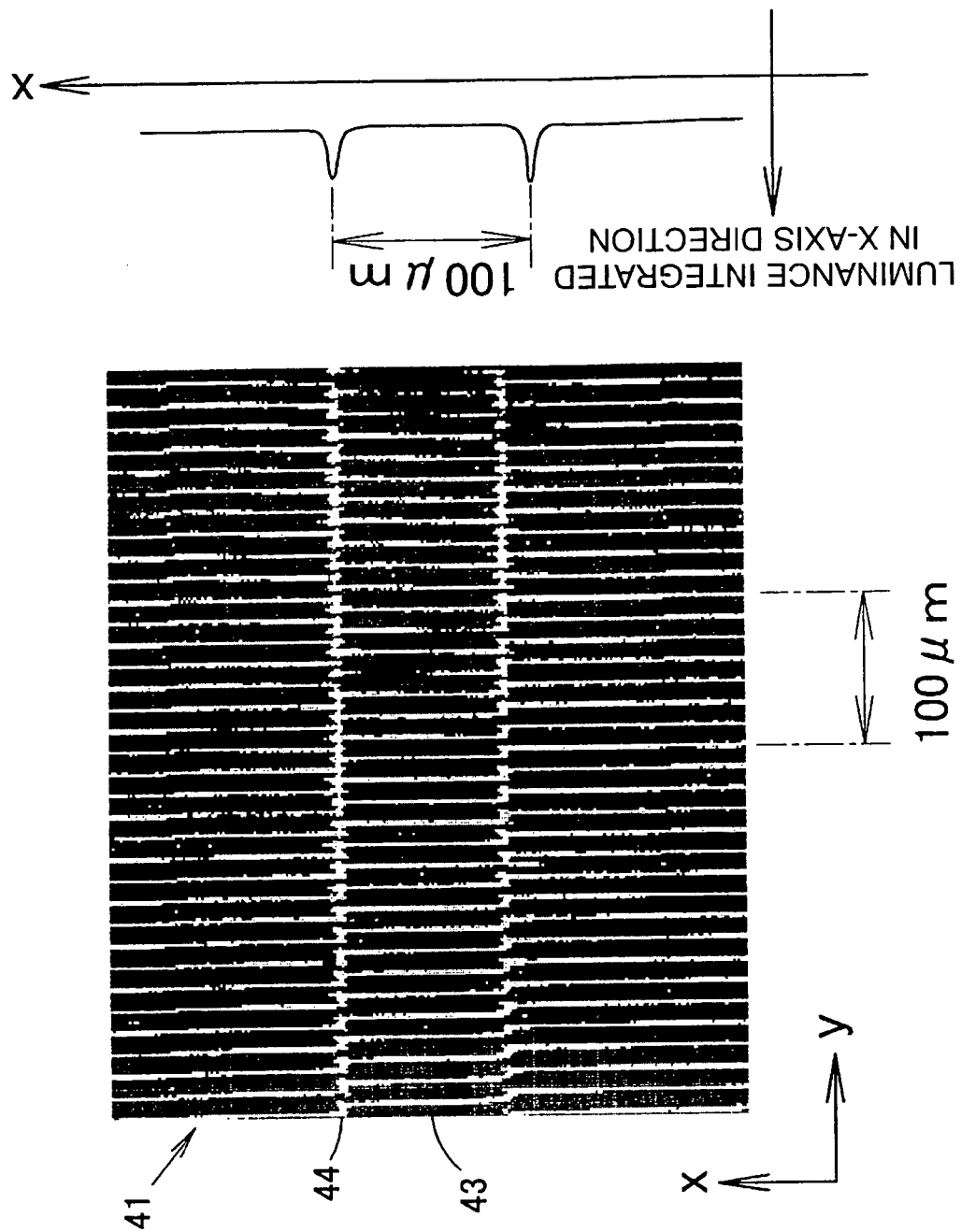

[FIG. 23]
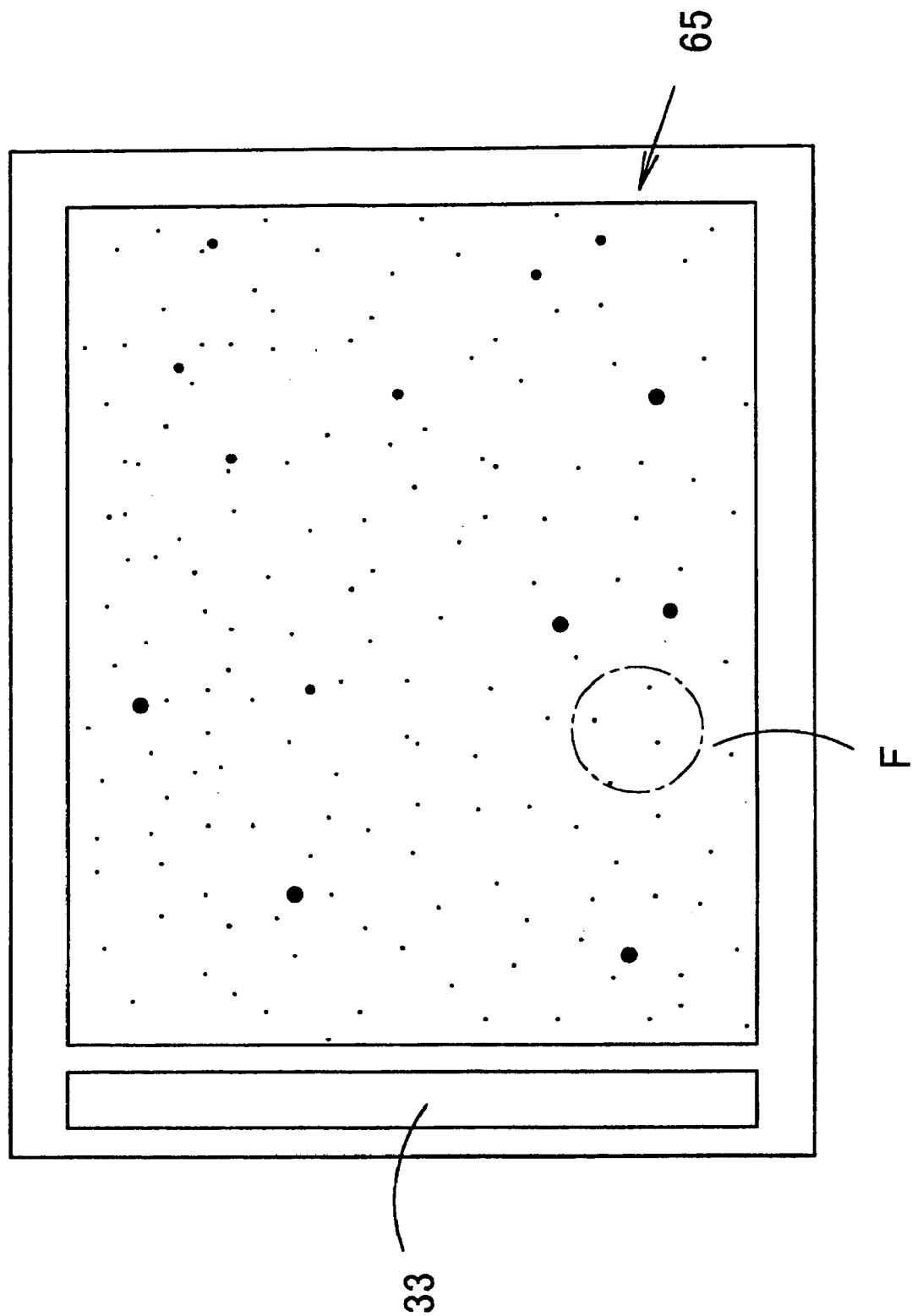

[FIG. 24]
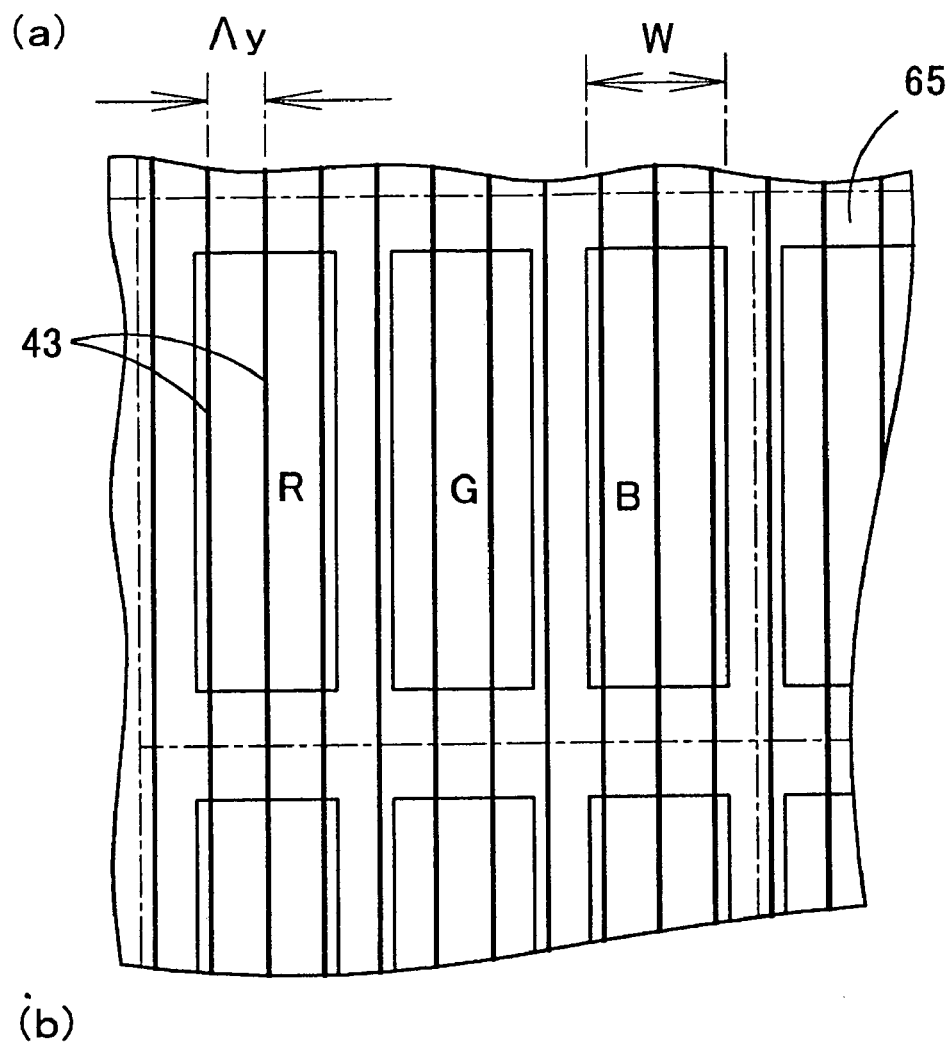
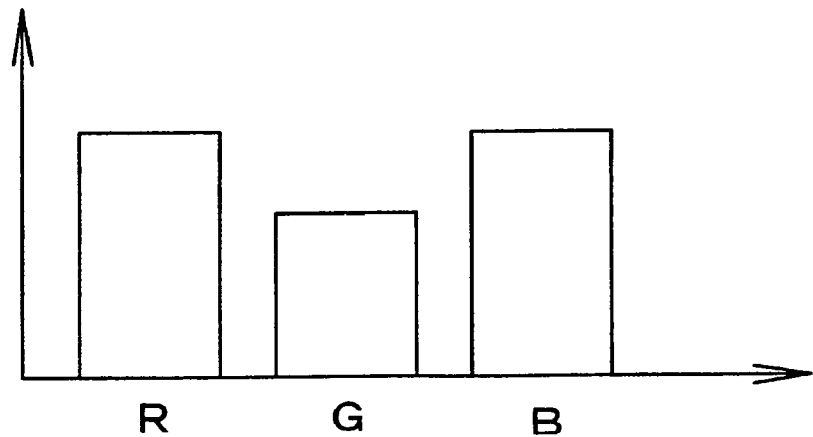

[FIG. 25]
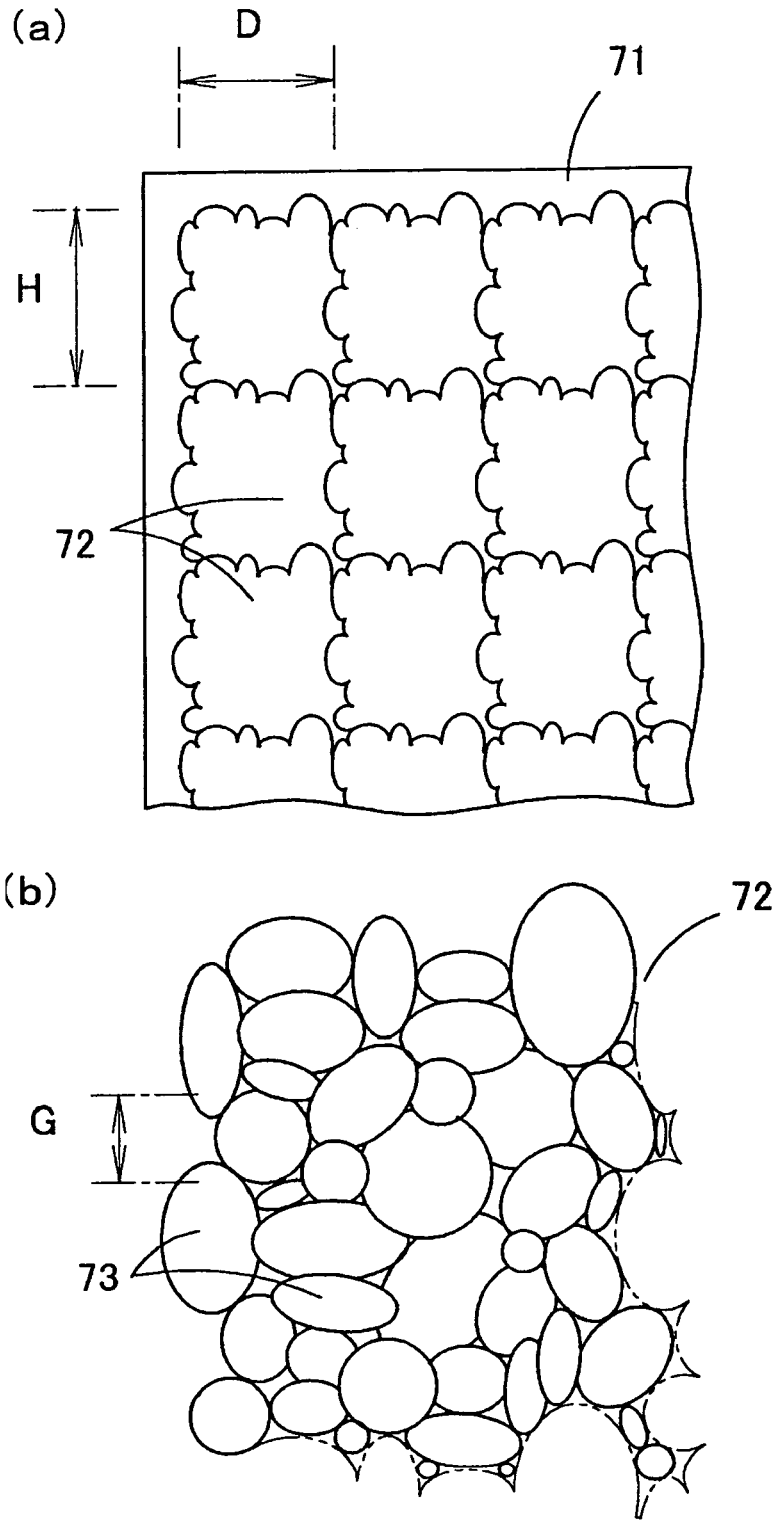

[FIG. 26]
(a)
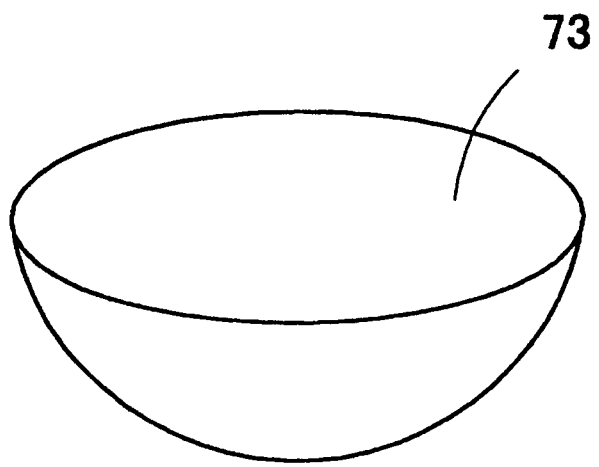
(b)
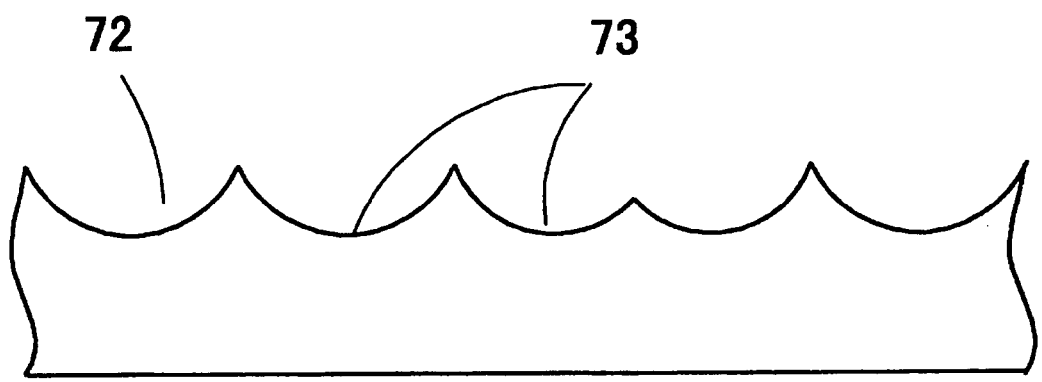

[FIG. 27]
(a)
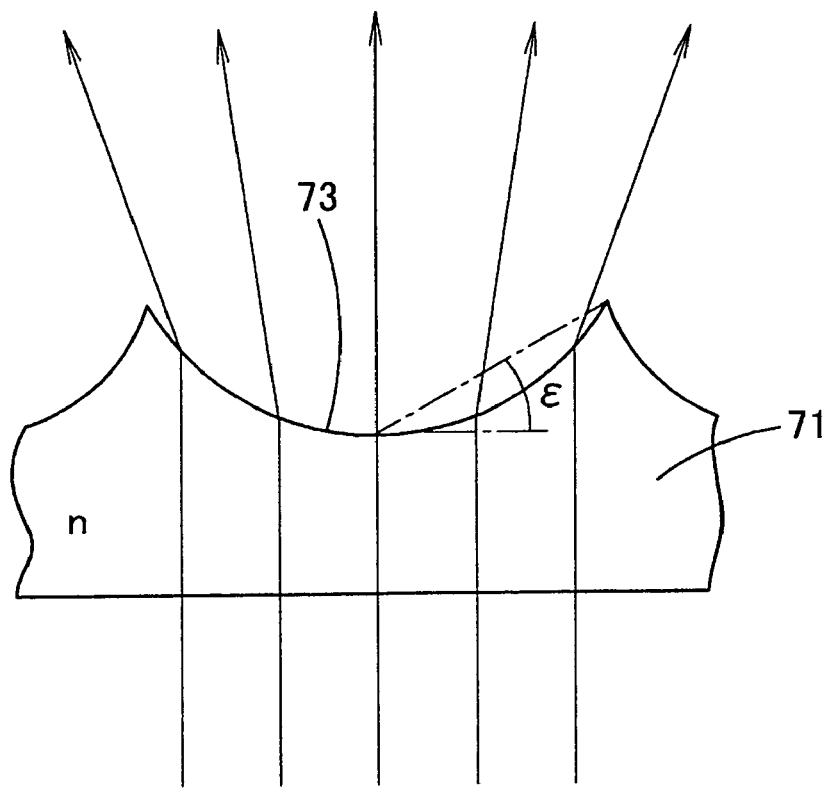
(b)
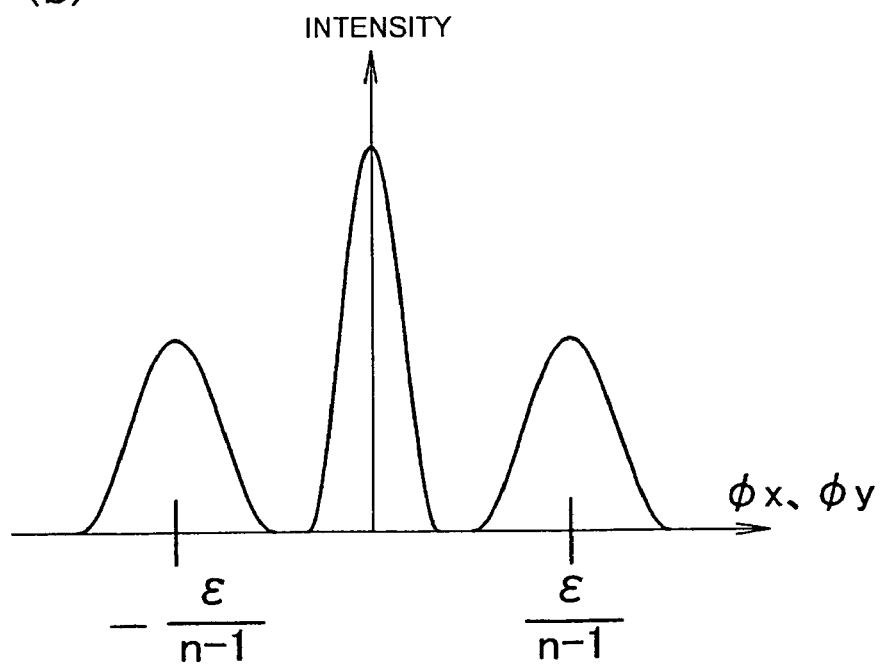

[FIG. 28]
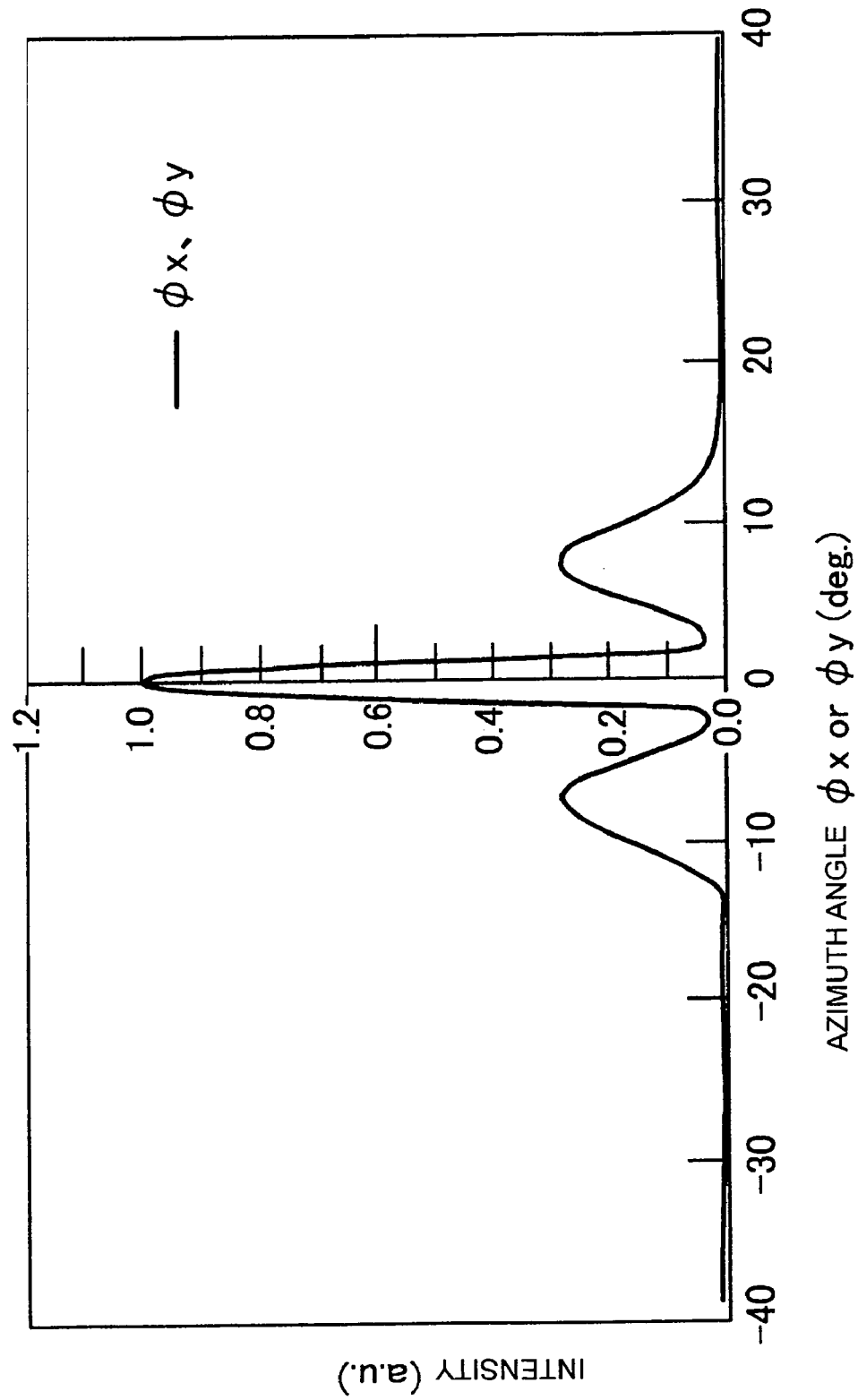

[FIG. 29]
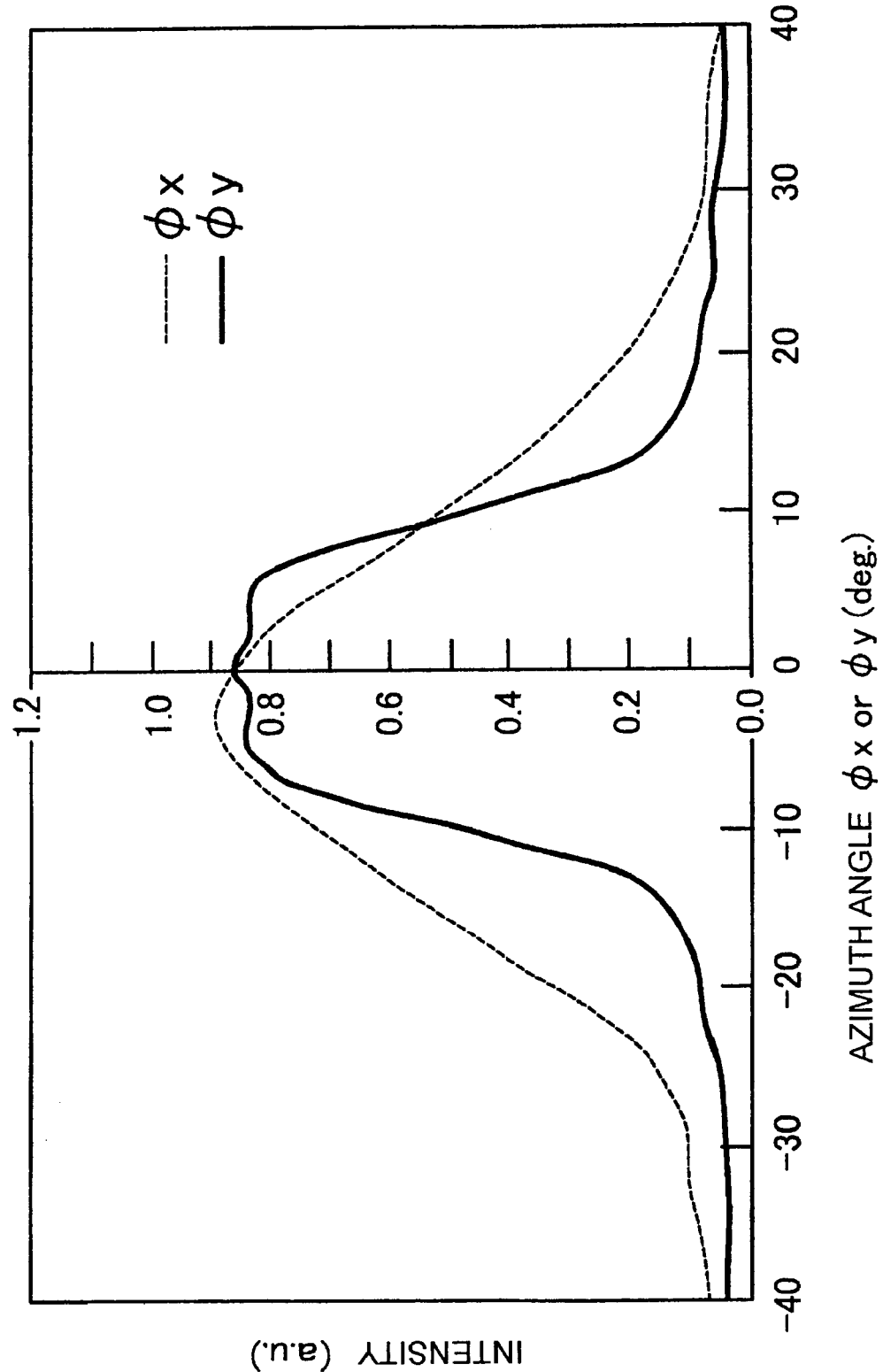

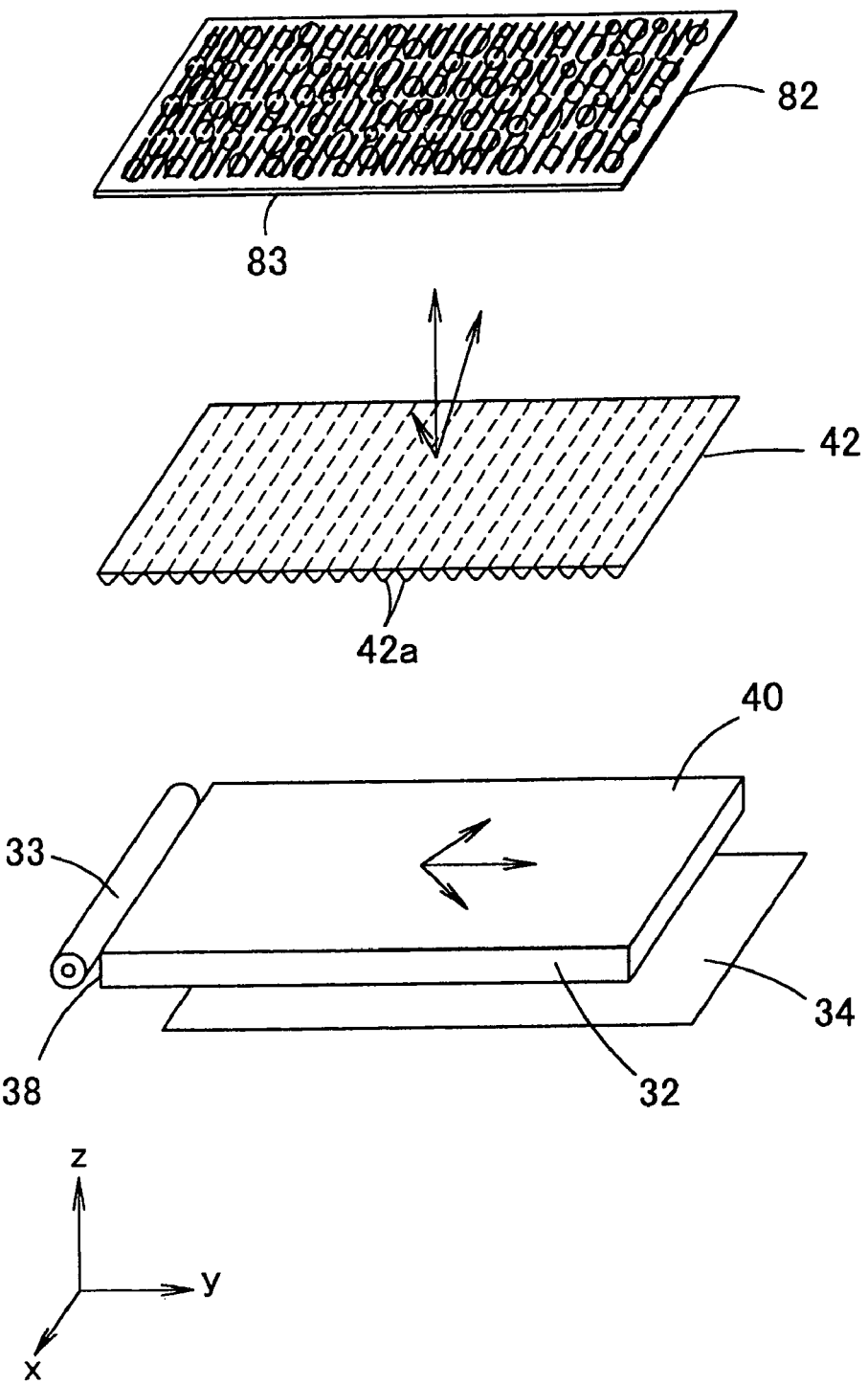
[FIG. 30]

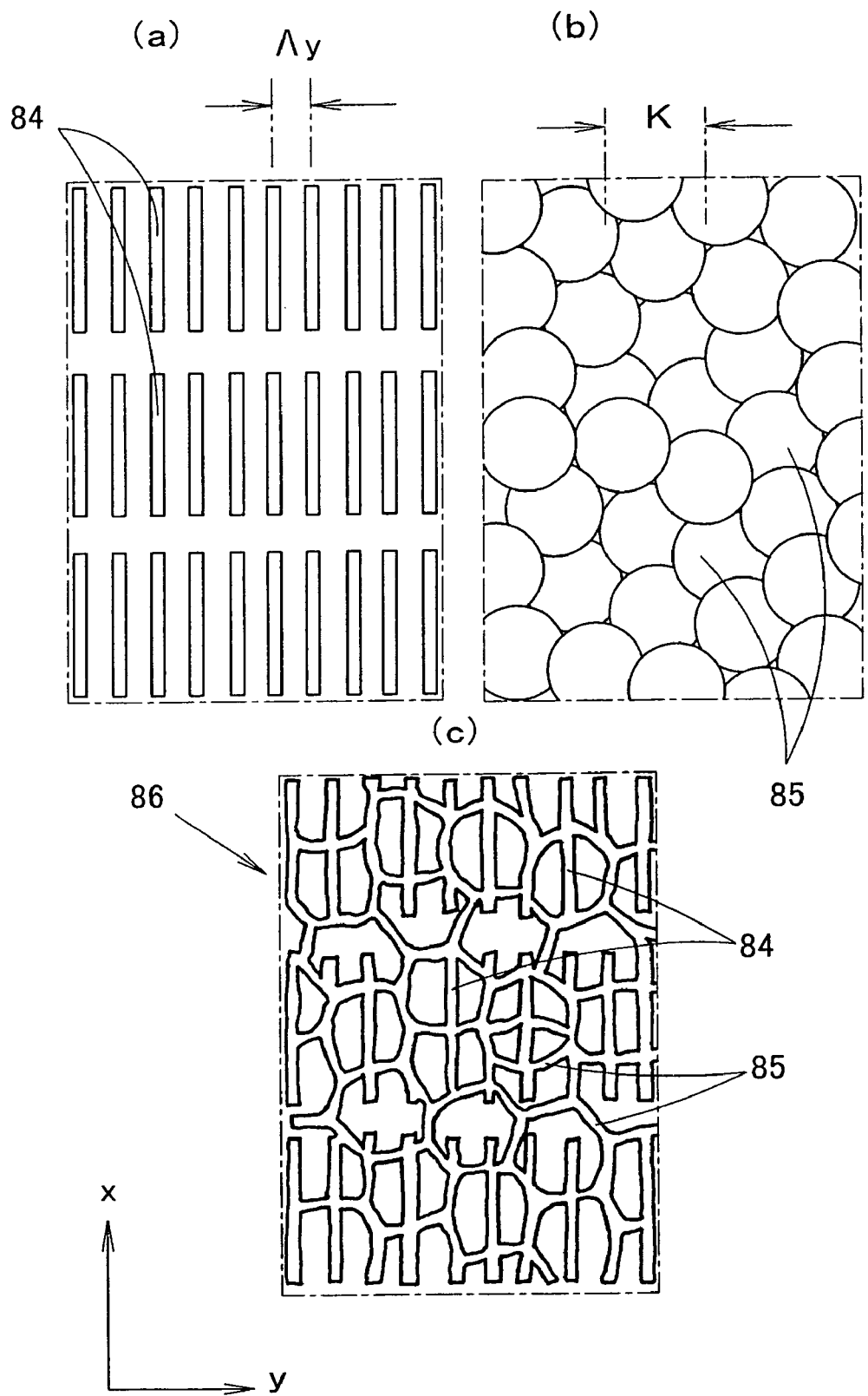
[FIG. 31]

[FIG. 32]
(a)
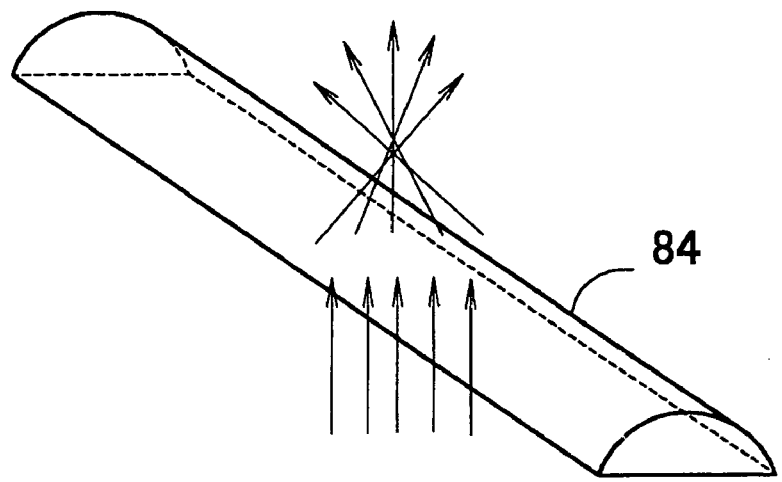
(b)
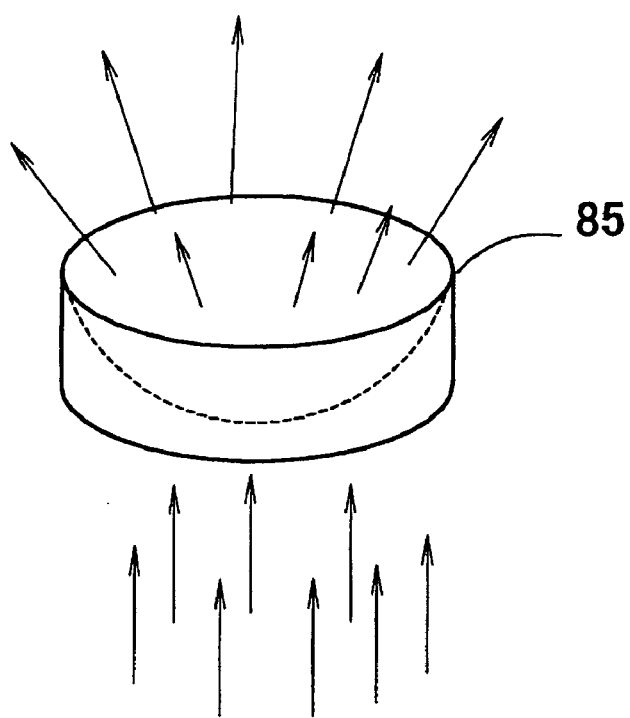

[FIG. 33]
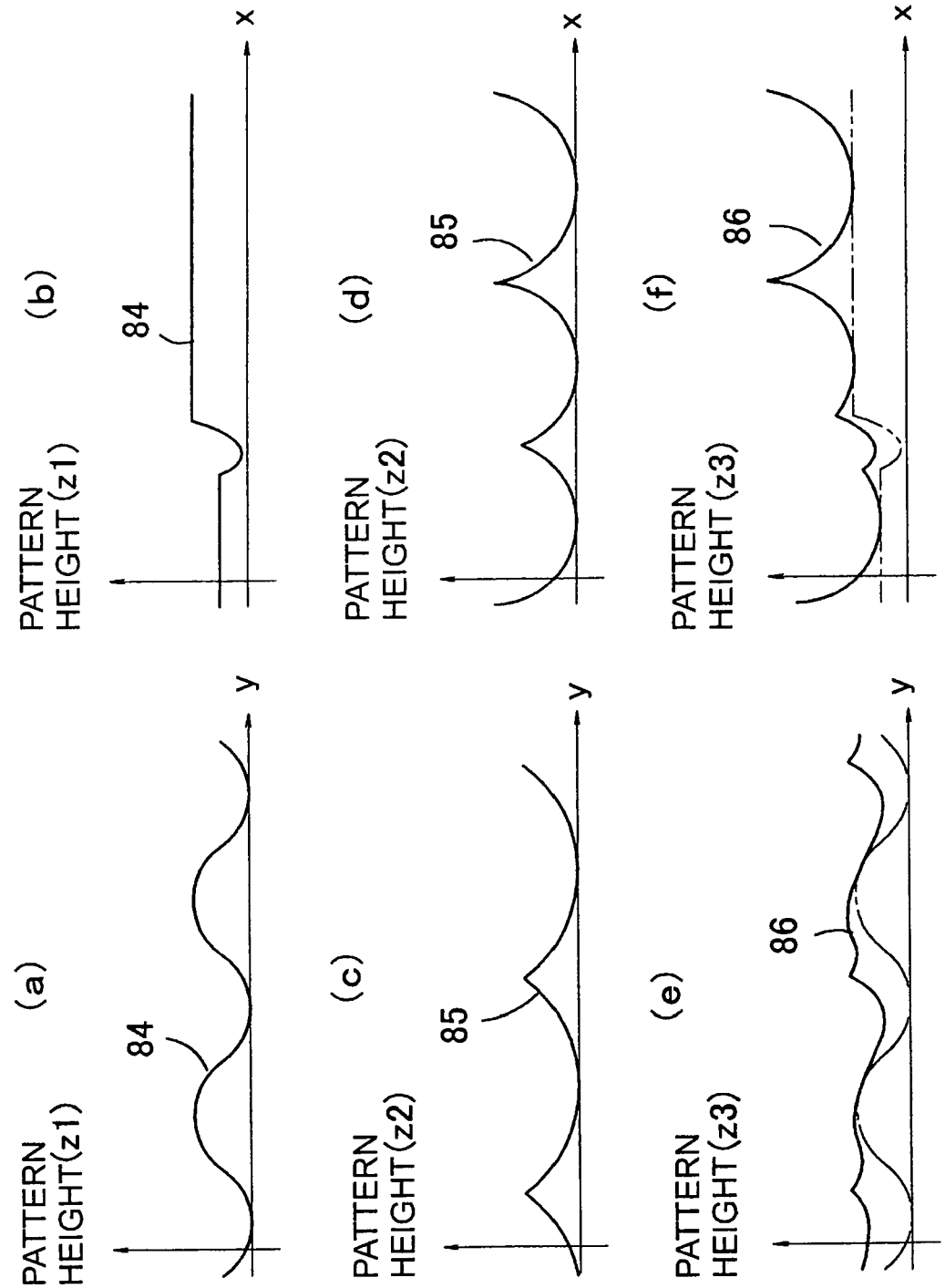

[FIG. 34]
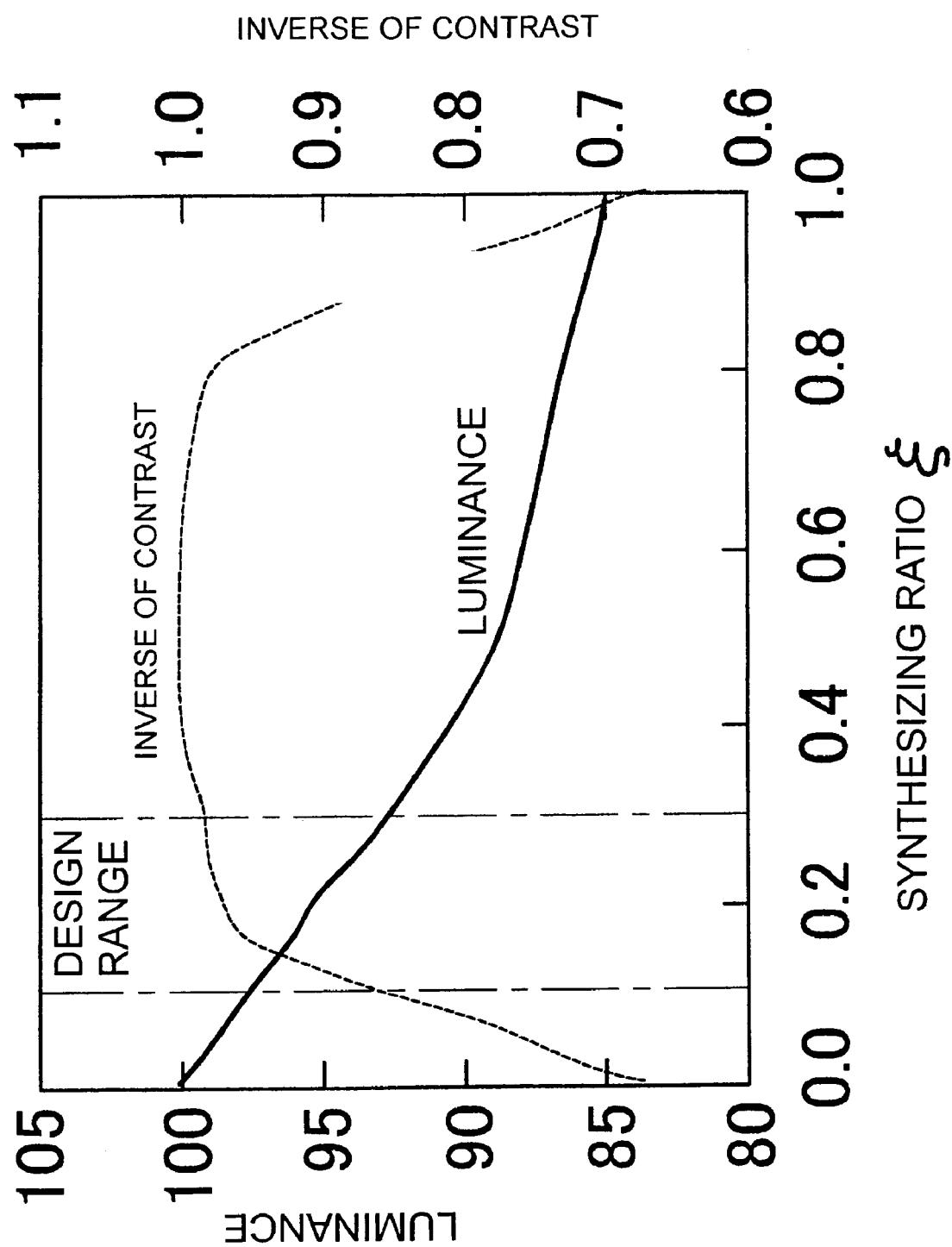

[FIG. 35]
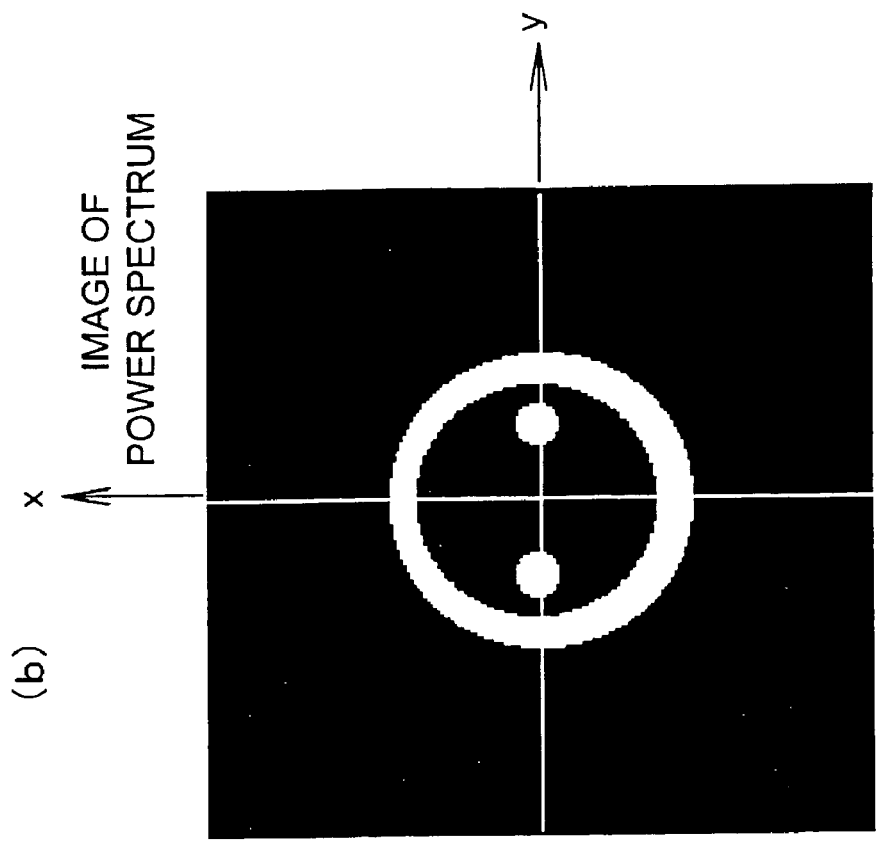
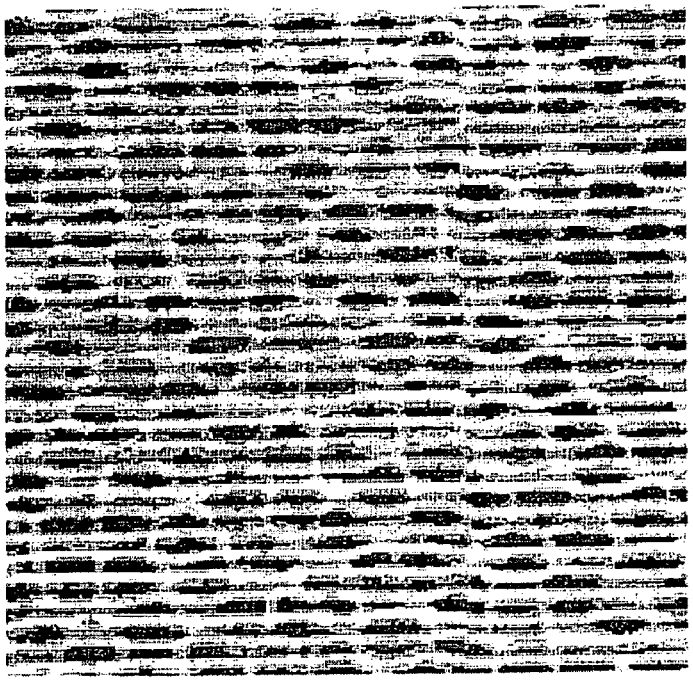

[FIG. 36]
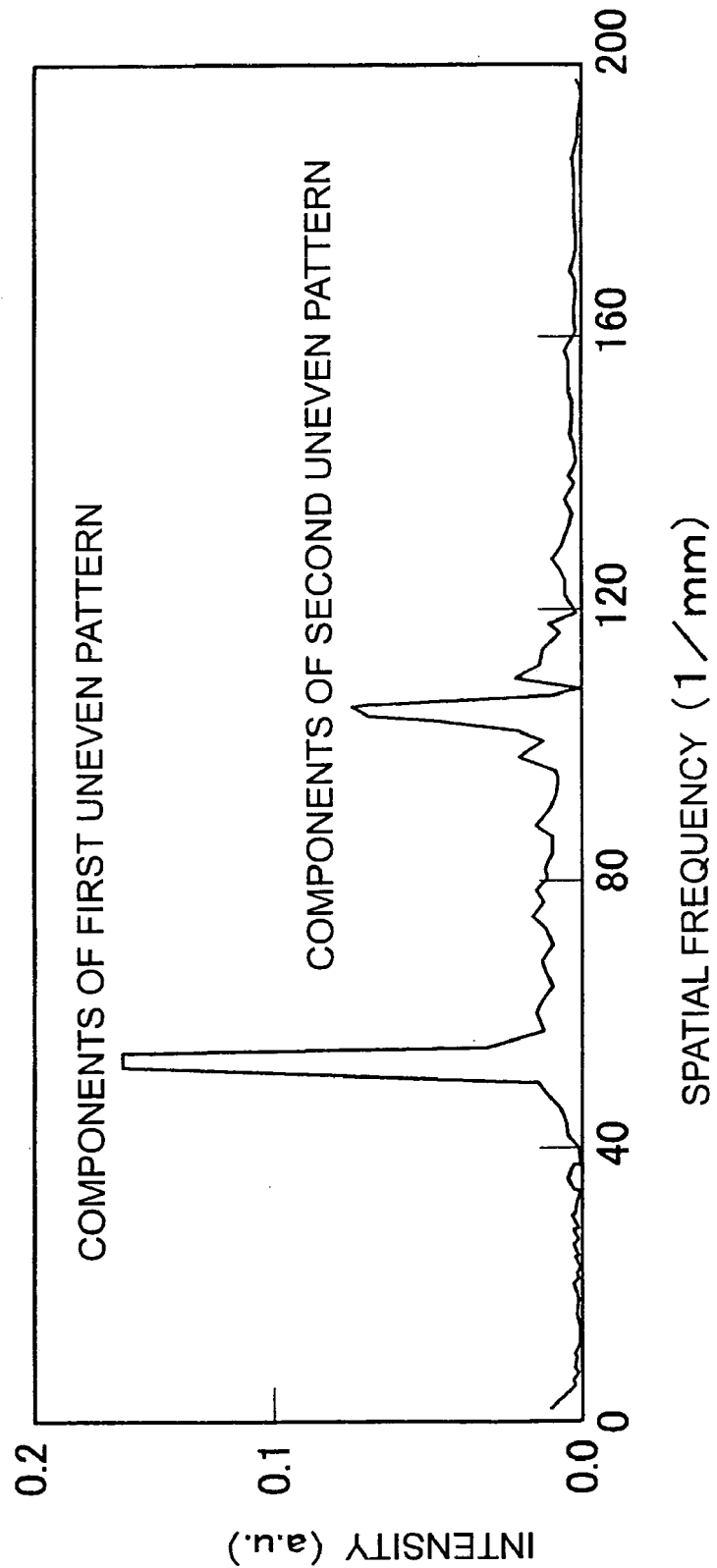

[FIG. 37]
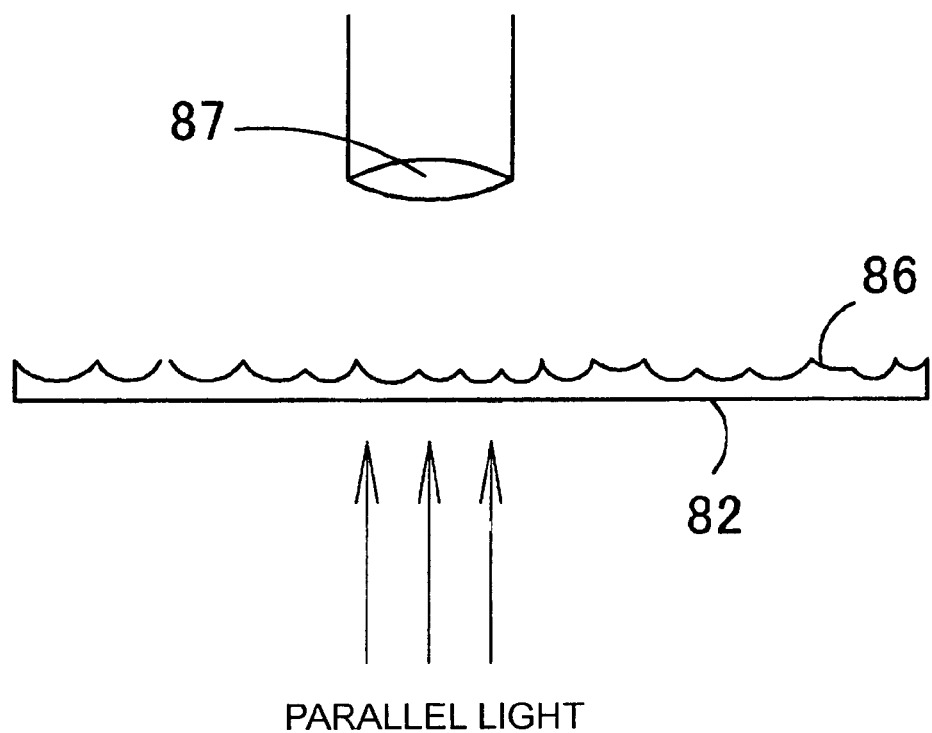
PARALLEL LIGHT

[FIG. 38]
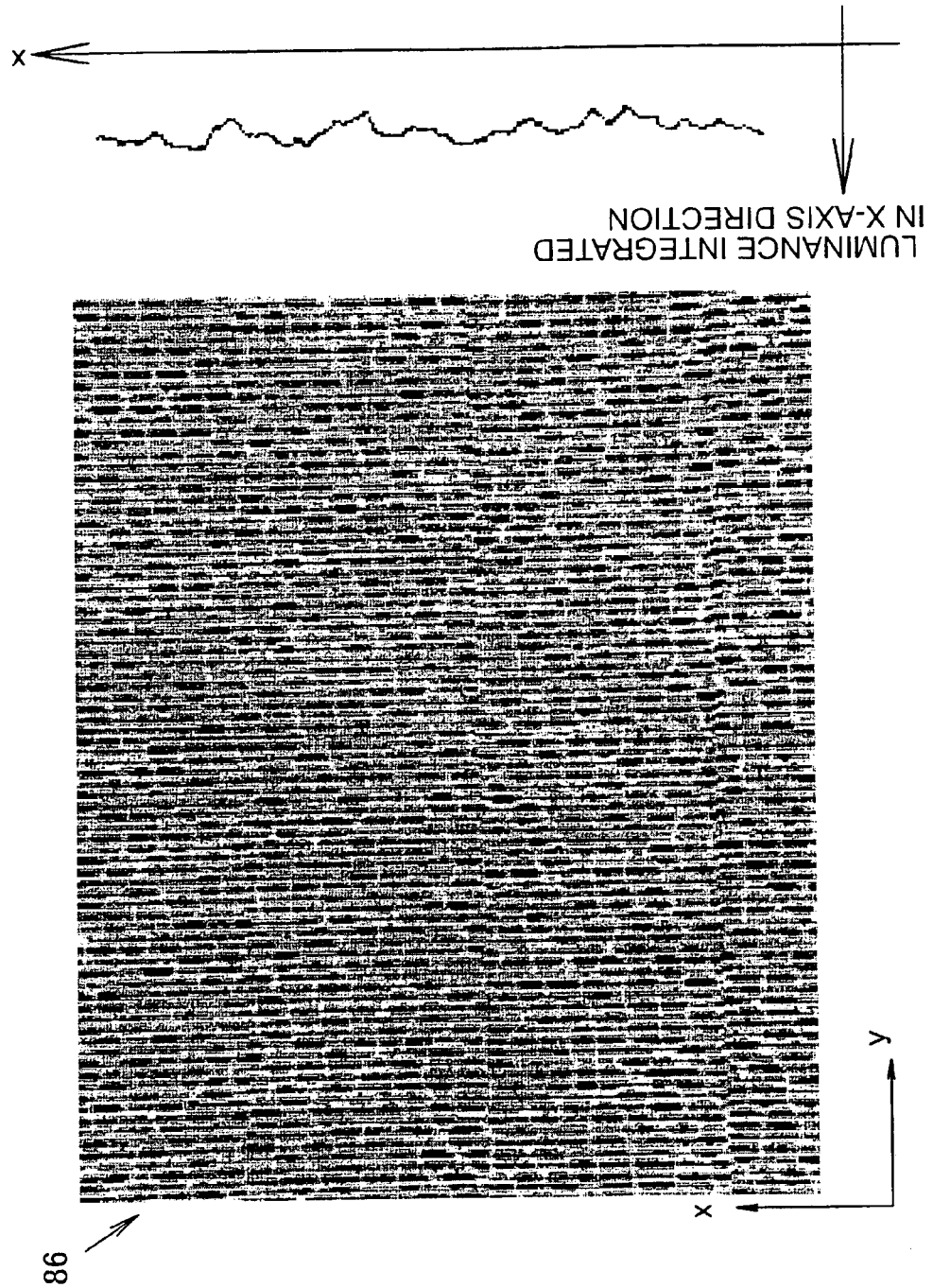

[FIG. 39]
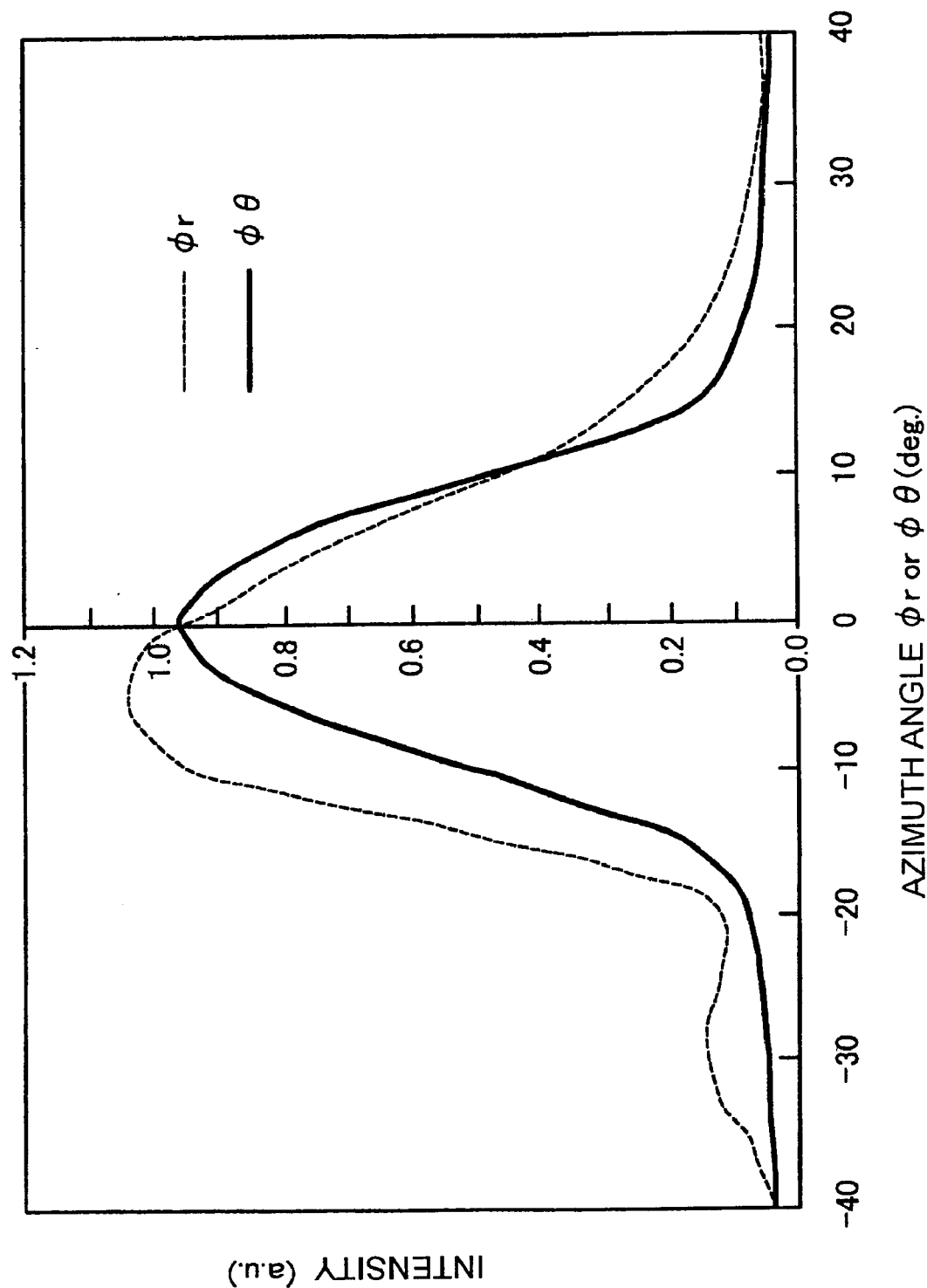

[FIG. 40]
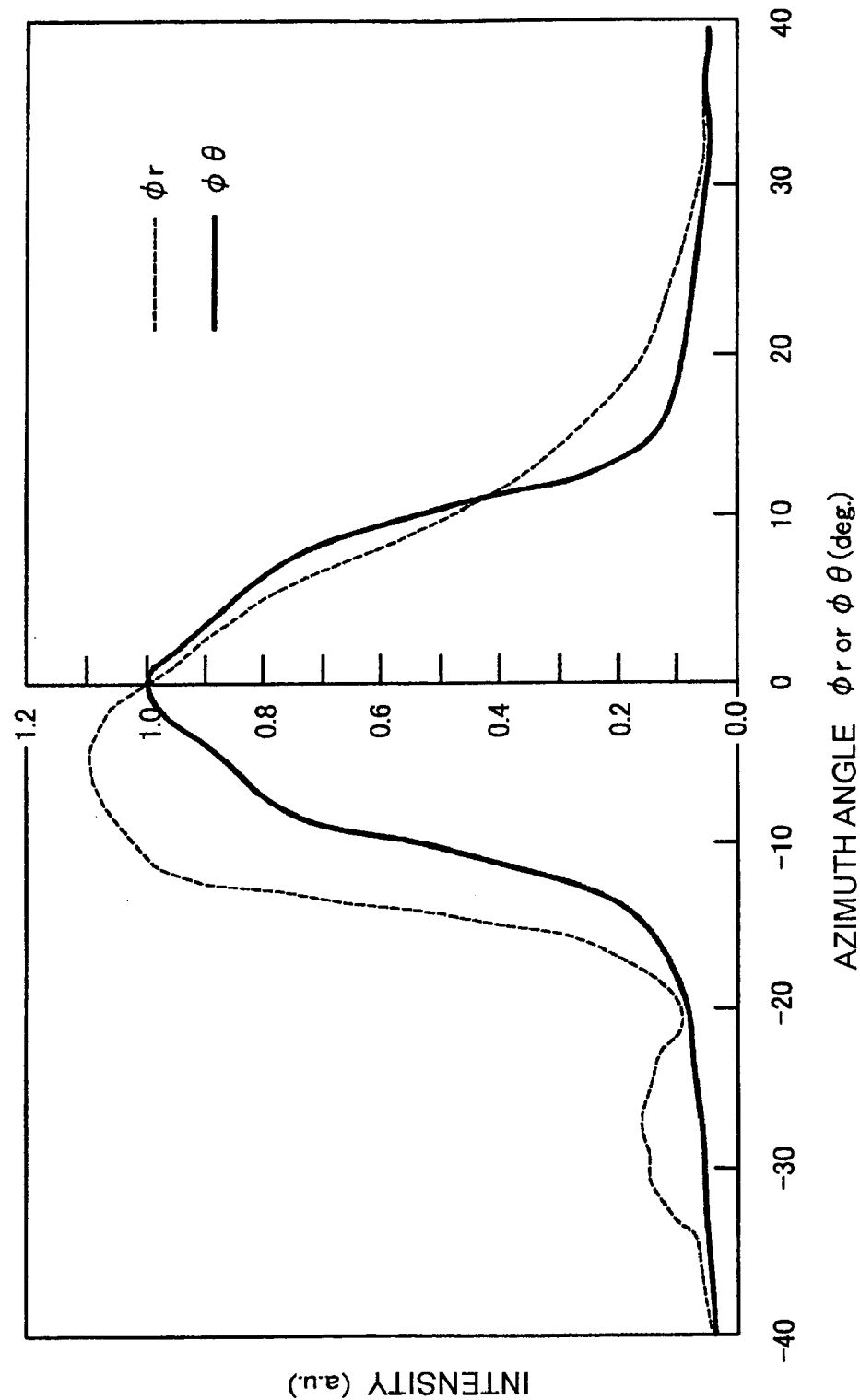

[FIG. 41]
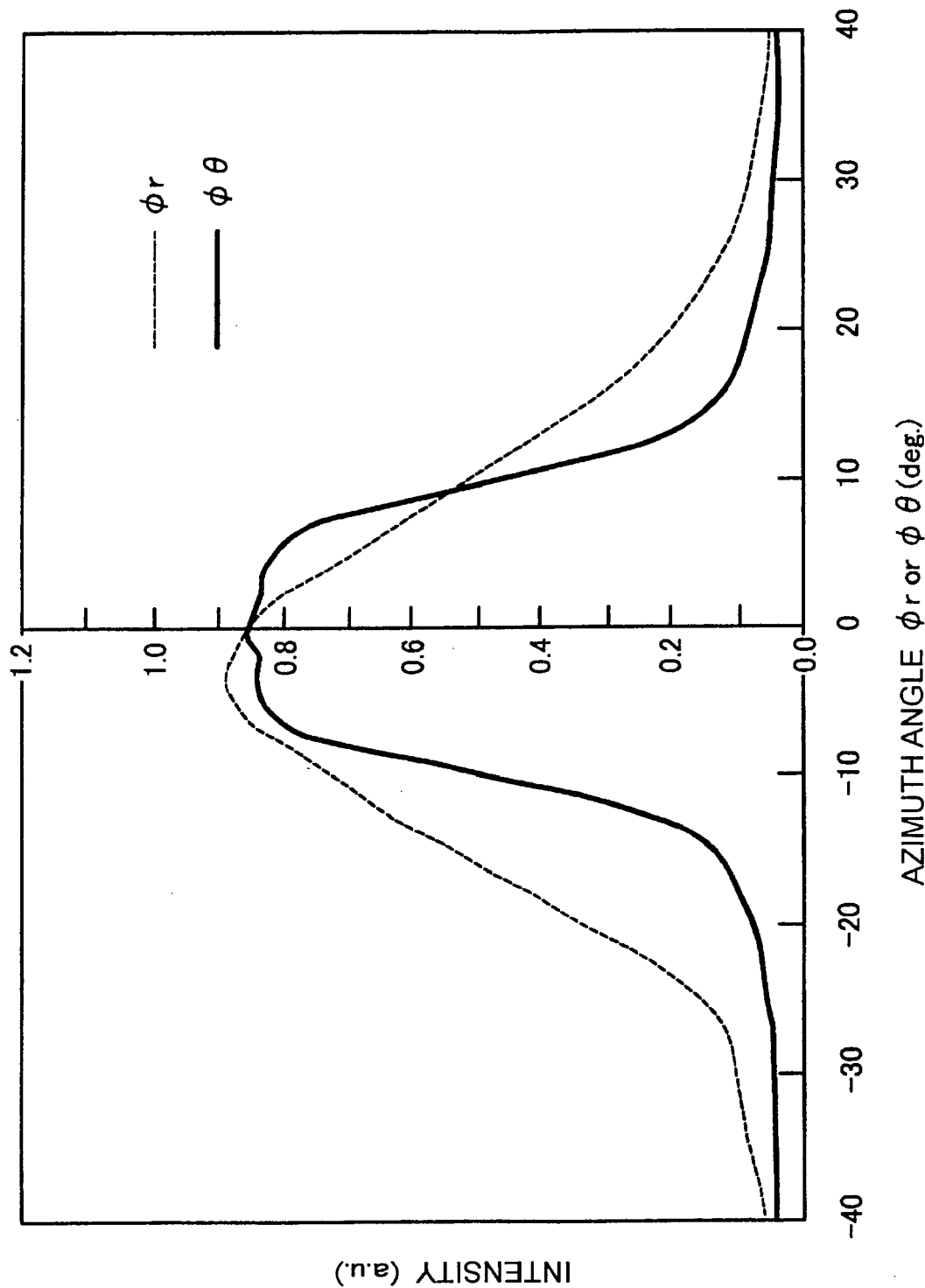

[FIG. 42]
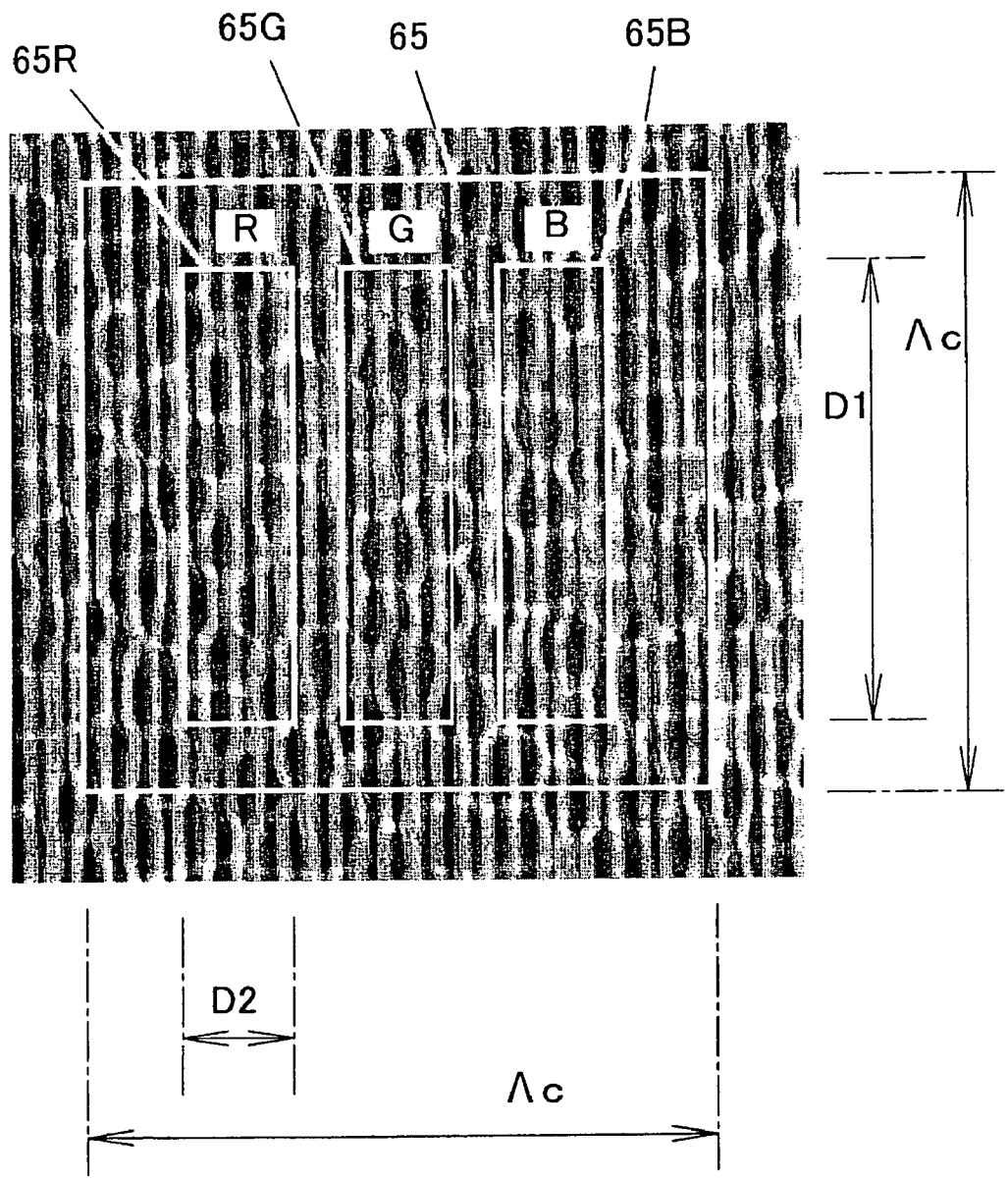

[FIG. 43]
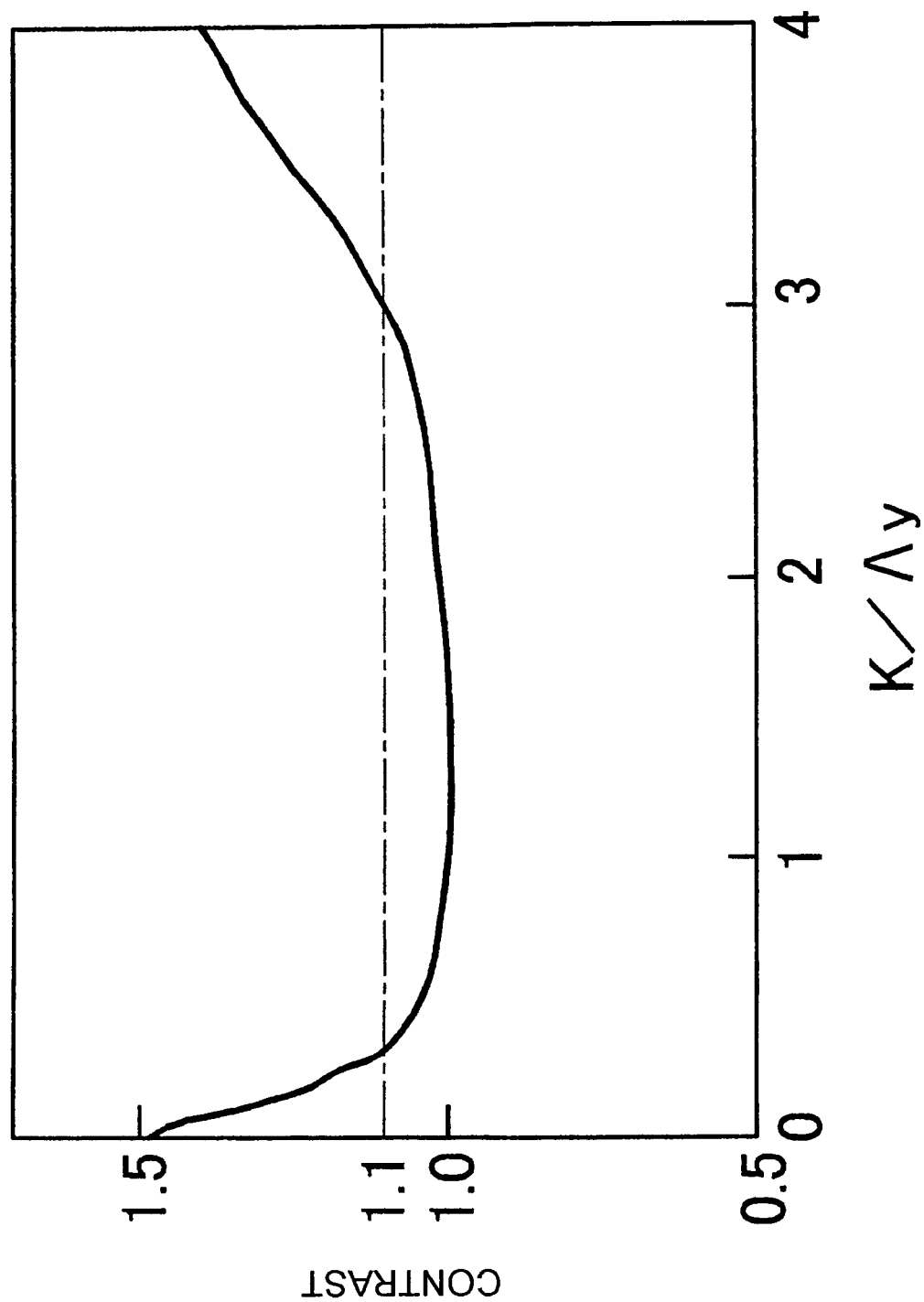

[FIG. 44]
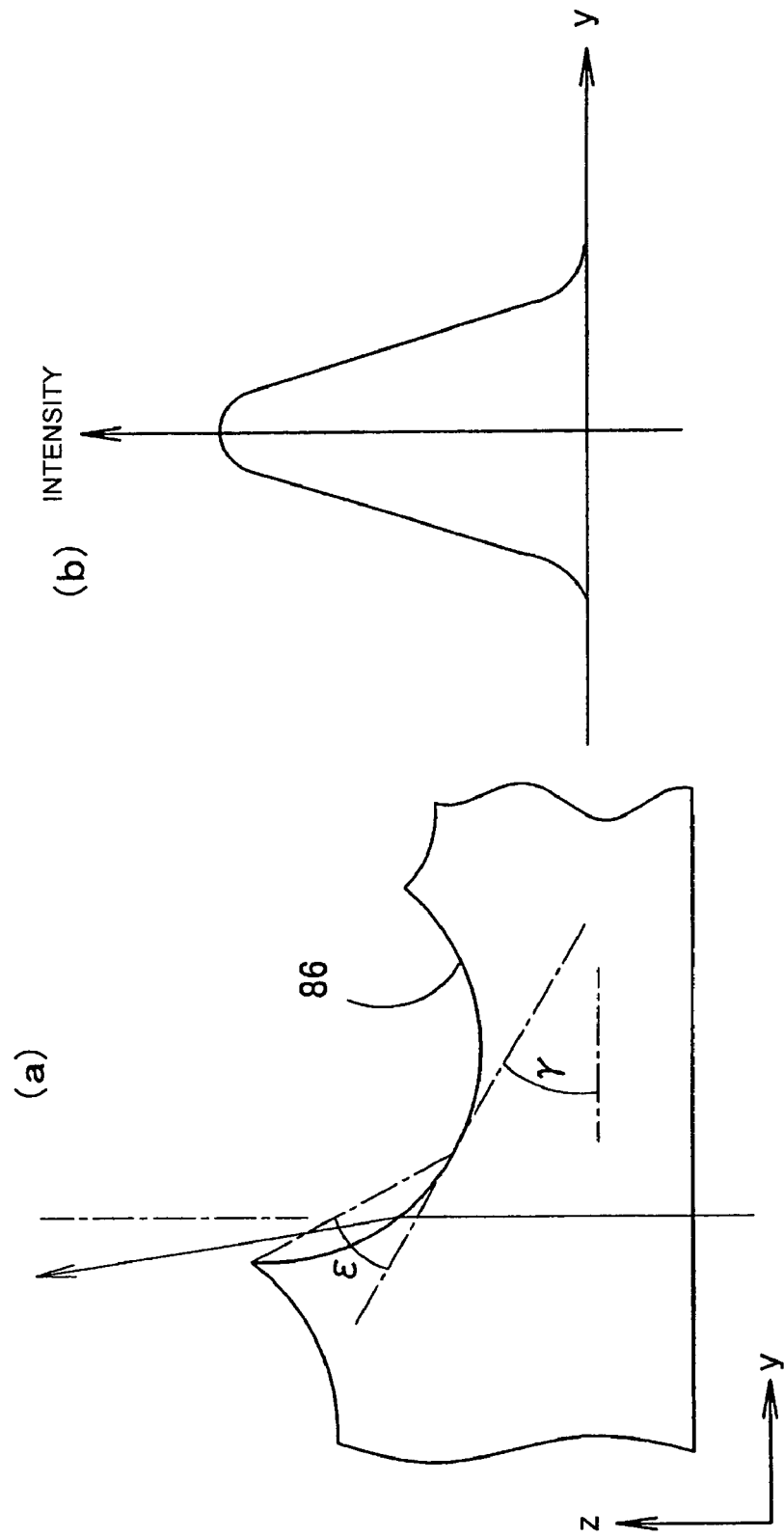

[FIG. 45]
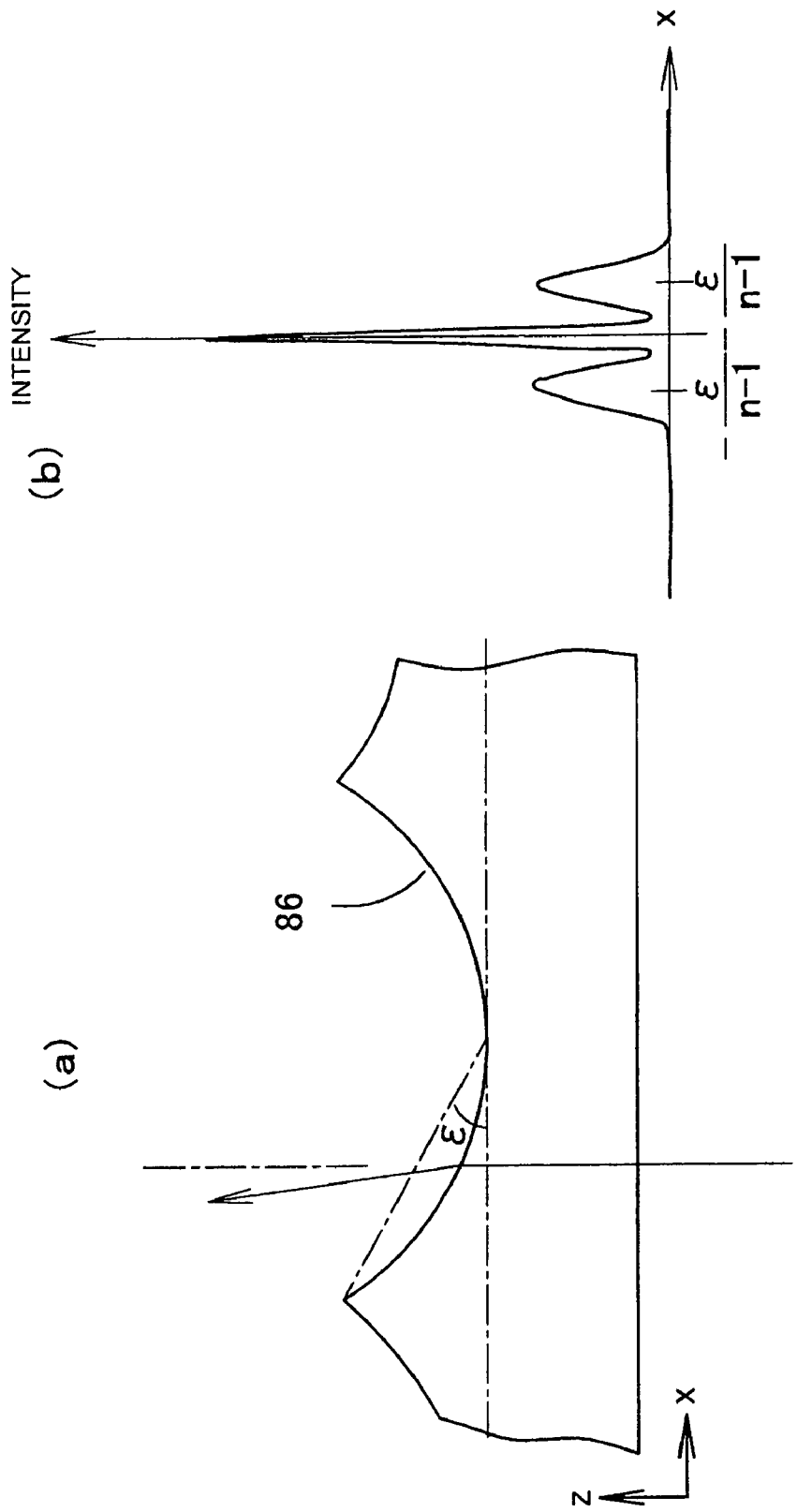

[FIG. 46]
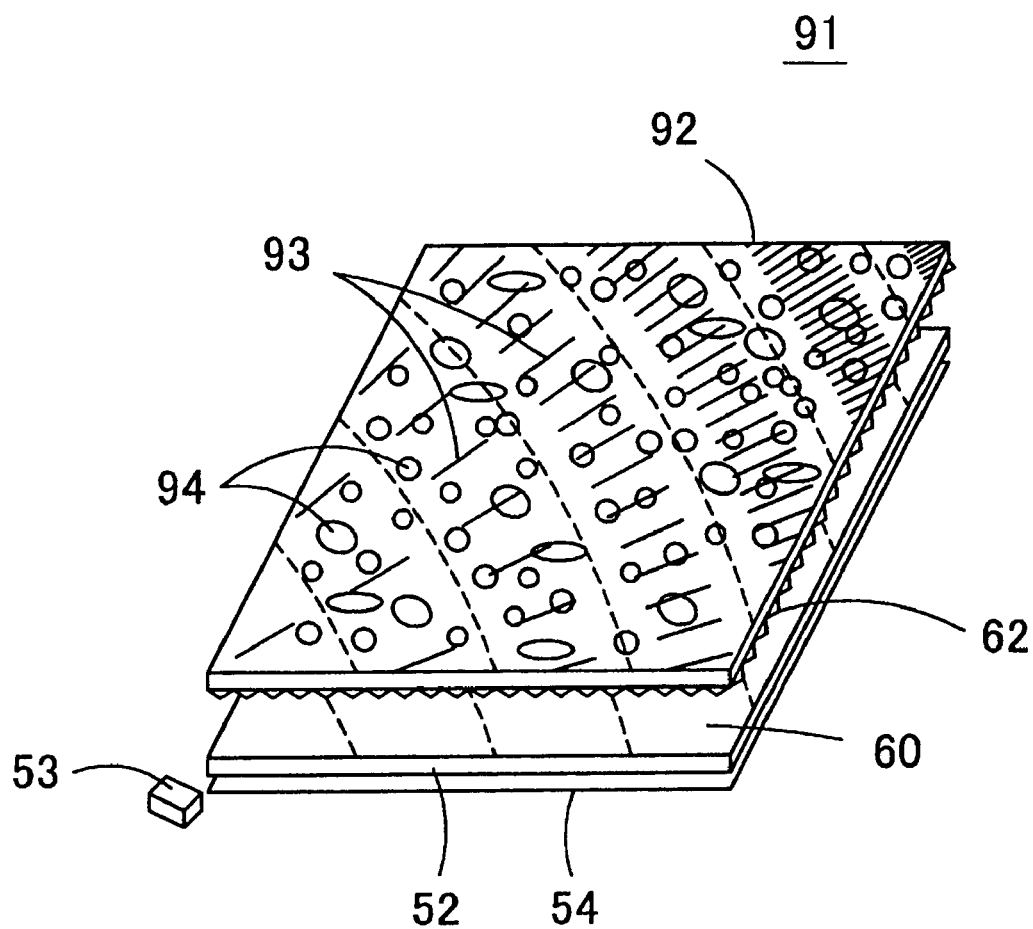

[FIG. 47]
(a)
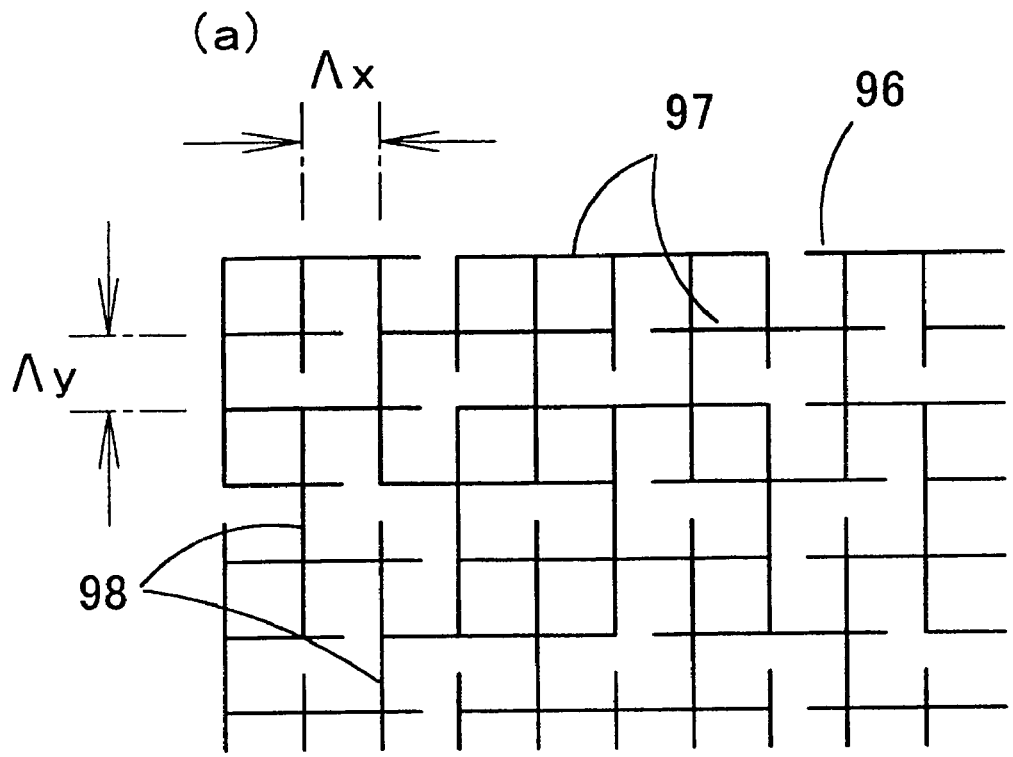
(b)
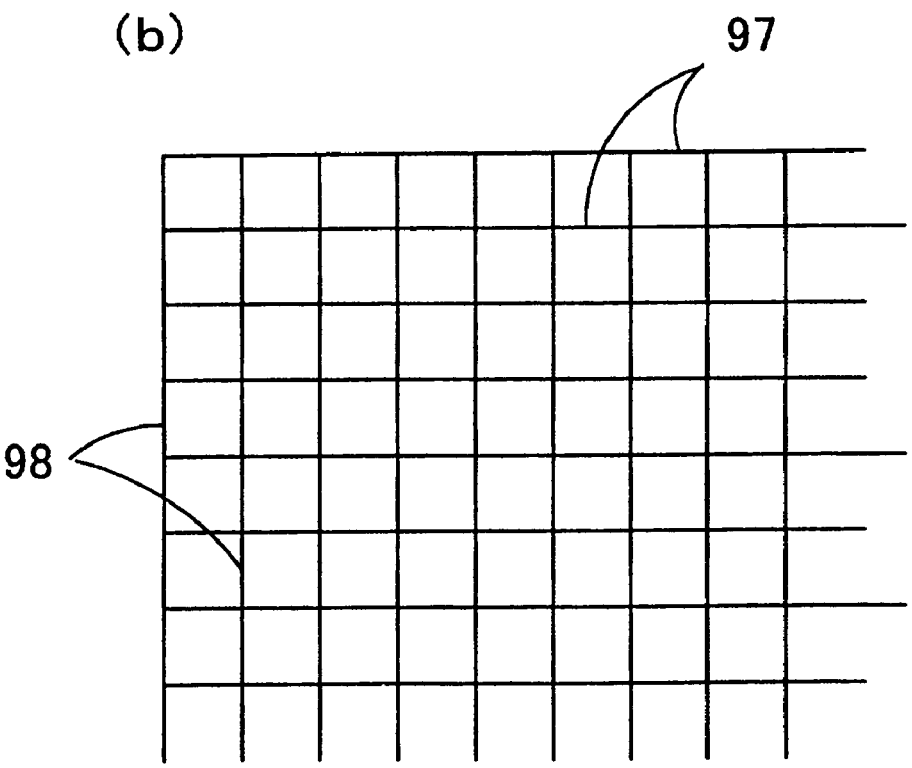

[FIG. 48]
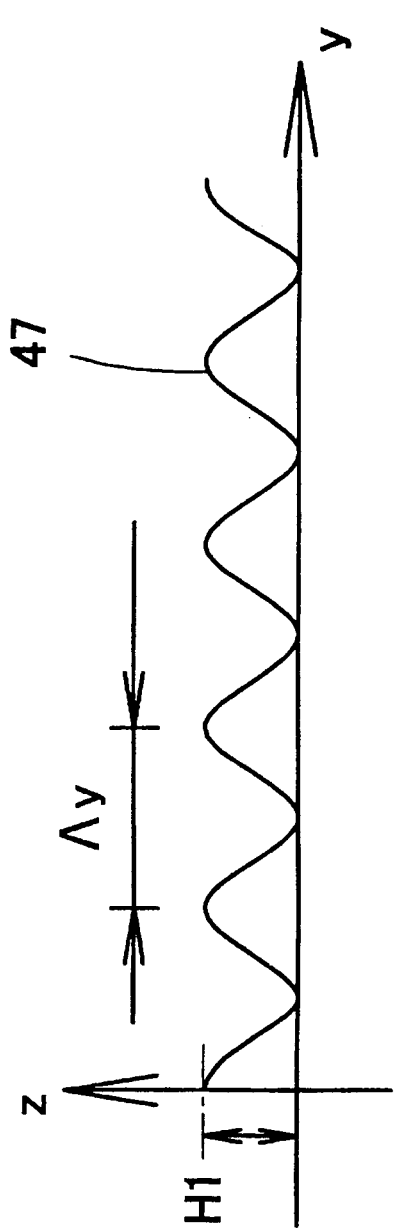
(a)
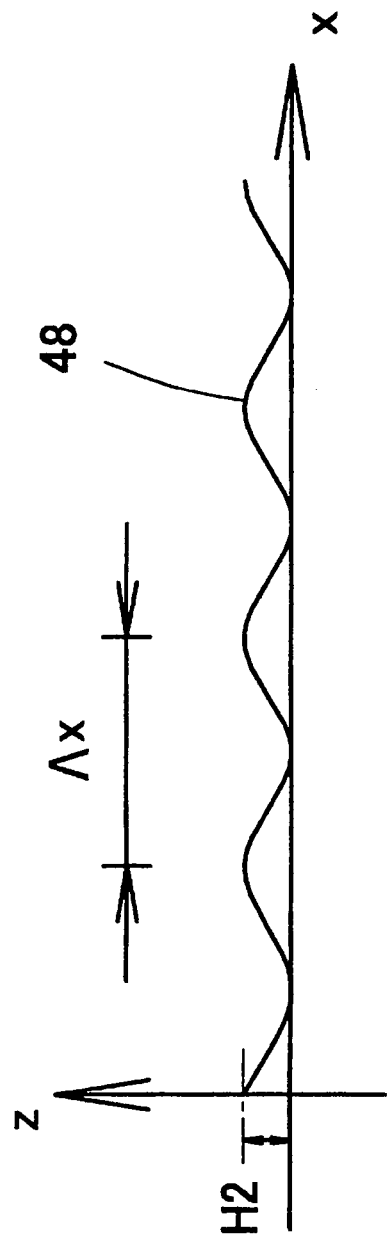
(b)

[FIG. 49]
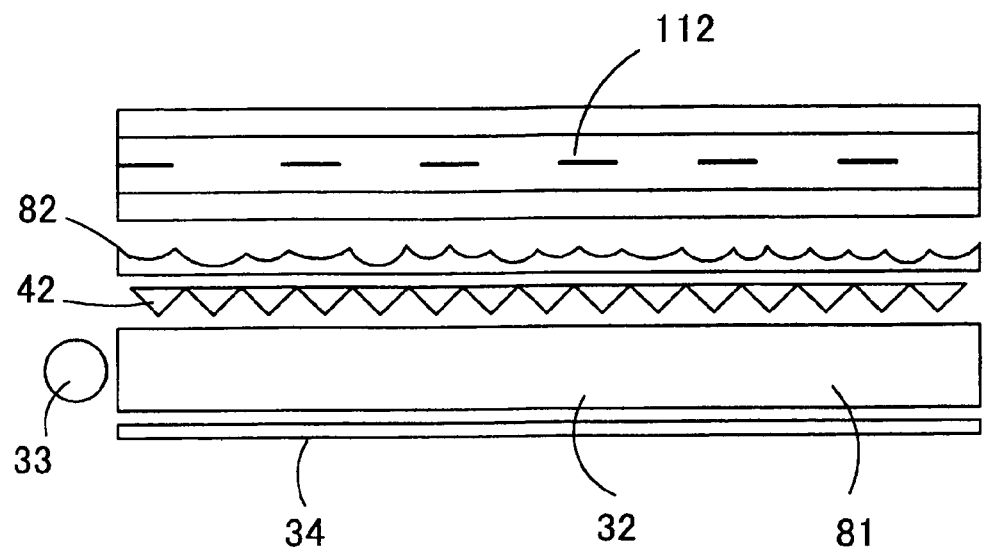
[FIG. 50]
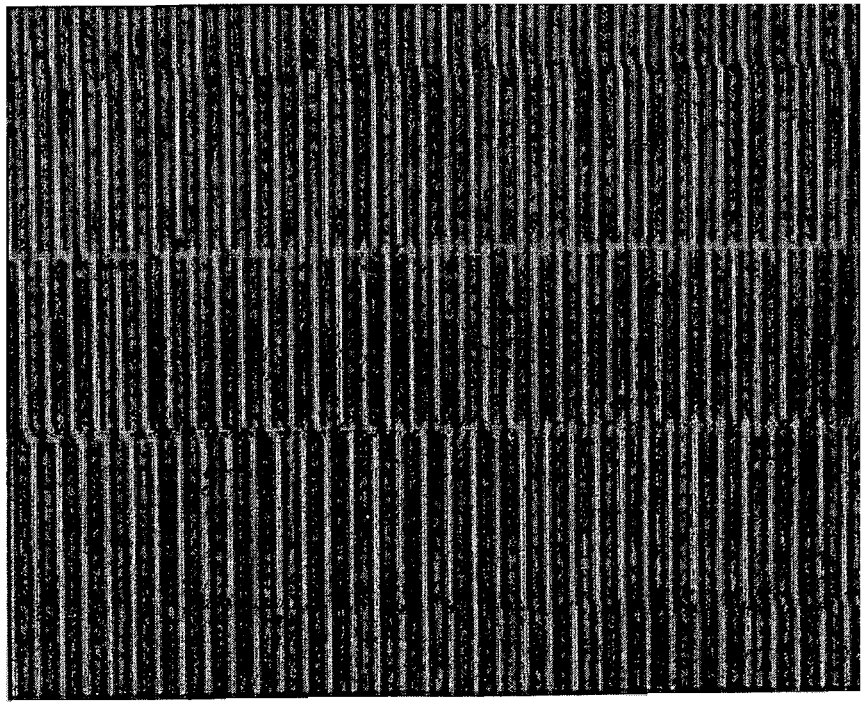

[FIG. 51]
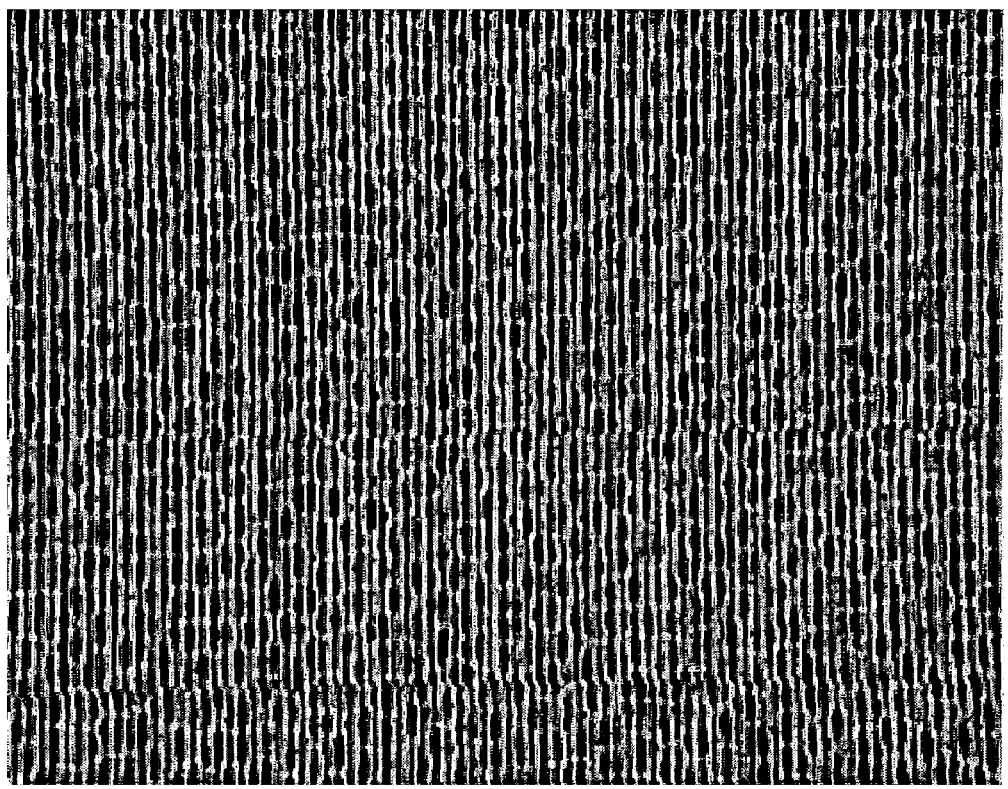

DIFFUSING BOARD AND SURFACE LIGHT SOURCE DEVICE

TECHNICAL FIELD

The present invention relates to a diffusing board and a surface light source device. More specifically, the invention relates to a surface light source device used as a backlight for illuminating a liquid crystal display panel and a diffusing board for diffusing light emitted from the surface light source device.

BACKGROUND ART

FIG. 1 is an exploded perspective view showing a backlight type surface light source device 11 according to a first example of the related art and FIG. 2 is a schematic sectional view of the same. The surface light source device 11 includes a light guide 12 for confining light, a light-emitting portion 13, and a reflector 14. The light guide 12 is formed from a resin having a great refractive index such as polycarbonate resin or polymethylmethacrylate, and a pattern 15 is formed on a bottom surface of the light guide 12 by processing the surface to have concavities and convexities having a substantially semi-circular sectional shape or printing dots of a diffuse reflection ink on the same. The light-emitting portion 13 is provided by mounting a plurality of so-called point light sources 17 such as light-emitting diodes (LED) on a circuit board 16, and this portion faces a side surface of the light guide 12 (a light-entrance surface 18). The reflector 14 is formed from a material having a high reflectivity, e.g., a white resin sheet, and two side parts of the same are attached to a bottom surface of the light guide 12 using double-sided tapes 19.

As shown in FIG. 2, light emitted from the light-emitting portion 13 and guided into the light guide 12 through the light entrance surface 18 (the light is indicated by an arrow) is guided in the light guide 12 by being repeatedly subjected to total reflection between a light exit surface 20 of the light guide 12 and a surface opposite to the same. The light guided in the light guide 12 undergoes diffuse reflection by impinging on the pattern 15. Beams of the light reflected to impinge on the light exit surface 20 at an angle smaller than the critical angle of the total reflection are output from the light exit surface 20. Beams of the light which have leaked out through locations of the bottom surface of the light guide 12 where the pattern 15 does not exist are reflected by the reflector 14 back into the light guide 12, which prevents any loss of luminous energy at the bottom surface of the light guide 12.

As shown in FIG. 2, the light exiting the light exit surface 20 of the light guide 12 as thus described exits in a direction substantially parallel to the light exit surface 20 of the light guide 12. Thus, the light exit surface 20 has low luminance in a direction perpendicular to the light exit surface 20 (hereinafter the direction may be expressed as "frontal") and is therefore very dark when viewed frontally unless some measure is taken. For this reason, a diffusing sheet 21 having a random pattern is disposed opposite to the light exit surface 20 of the light guide 12. The light exiting the light exit surface 20 substantially parallel to the same is scattered by the diffusing sheet 21, and the quantity of light exiting the direction perpendicular to the light exit surface 20 is thereby increased. In the surface light source device 11 of this type, however, light transmitted by the diffusing sheet 21 resembles Lambert light in that it has very wide directivity because the light is randomly diffused by the diffusing sheet 21. Thus, the surface light source device 11 has had low frontal luminance.

Under the circumstance, various ideas for improving the frontal luminance of a surface light source device have been proposed. FIG. 3 is an exploded perspective view showing a backlight type surface light source device 31 according to a second example of the related art, and FIG. 4 is a schematic sectional view of the same. In the surface light source device 31, a plurality of microscopic deflecting pattern elements 35 having a substantially triangular sectional shape are provided on a bottom surface of a light guide 32. In order to achieve a uniform luminance distribution, the pattern density of the deflecting pattern elements 35 is low in the neighborhood of a light-emitting portion 33, and the pattern density gradually increases with the distance from the light-emitting portion 33. A mirror reflection sheet 34 is disposed opposite to the bottom surface of the light guide 32. A bar-shaped light emitting portion 33 constituted by a cold-cathode tube is disposed in a position opposite to a light entrance surface 38 of the light guide 32. A prism sheet 42 is disposed in a position opposite to a light exit surface 40 of the light guide 32, and an uneven diffusing board 41 is placed on the same. On the prism sheet 42, prisms 42a having a triangular sectional shape linearly extending in a direction parallel to the longitudinal direction of the light-emitting portion 33 are arranged parallel to each other at a constant pitch.

In the surface light source device 31, as shown in FIG. 4, light from the light-emitting portion 33 guided into the light guide 32 is guided in the light guide 32 by being repeatedly subjected to total reflection between the light exit surface 40 of the light guide 32 and a surface opposite to the same. A light guide angle $\alpha$ of the light guided in the light guide 32 increases each time the light impinges on a deflecting pattern element 35. When the light is reflected to impinge on the light exit surface 40 at an angle smaller than the critical angle of the total reflection, the light exits the light exit surface 40. In this surface light source device 31 again, the light exiting the light exit surface 40 exits in a direction substantially parallel to the light exit surface 40. The light which has exited the light guide 32 in a direction substantially parallel to the light exit surface 40 is deflected in a direction substantially perpendicular to the light exit surface 40 by being transmitted by the prism sheet 42.

Let us now assume that a direction perpendicular to the light entrance surface 38 of the light guide 32 is defined as a y-axis direction; a direction parallel to the light entrance surface 38 and also parallel to the light exit surface 40 is defined as an x-axis direction; and the direction perpendicular to the light exit surface 40 is defined as a z-axis direction. It is also assumed that $\phi x$ represents an azimuth angle measured in the z-x plane from the z-axis direction and that $\phi y$ represents an azimuth angle measured in the y-z plane from the z-axis direction.

Light guided through the light guide 32 to exit the light exit surface 40 is not controlled in terms of directivity in the x-axis direction. Therefore, the light is widely diffused in the x-axis direction in the light guide 32, and the light transmitted by the prism sheet 42 has wide directivity in the $\phi x$ direction as indicated by $\Delta \phi x$ in FIG. 5. On the contrary, the light exits the light exit surface 40 toward a narrow range substantially in parallel with the light exit surface 40, and the light transmitted by the prism sheet 42 therefore has narrow directivity in the $\phi y$ direction as indicated by $\Delta \phi y$ in FIG. 5

A reduction in frontal luminance occurs when the directivity is too wide, whereas excessively narrow directivity degrades visibility because an image becomes less visible as a result of only a slight change in the position of the viewer's face. For this reason, in the surface light source device 31, an uneven diffusing board 41 is disposed on the prism sheet 42 as shown in FIG. 4, whereby the directivity of the light transmitted by the prism sheet 42 in the φy direction is expanded to β=20° in the y-z plane by the uneven diffusing board 41. As a result, the surface light source device 31 provides frontal luminance higher than that of the surface light source device 11 according to the first example of the related art, and it also allows any reduction in the visibility of a liquid crystal display to be prevented.

FIG. 6(a) is a plan view showing the disposition of diffusing patterns 43 on the uneven diffusing board 41. FIG. 6 (b) is an illustration showing a sectional shape of the uneven diffusing board 41 on a section thereof parallel to the z-x plane. FIG. 6 (c) is an illustration showing a sectional shape of the uneven diffusing board 41 on a section thereof parallel to the y-z plane. The diffusing patterns 43 are configured to diffuse light transmitted by the uneven diffusing patterns 41 widely in the y-z plane while limiting the diffusion in the z-x plane. Specifically, the diffusing patterns 43 formed on a surface of the uneven diffusing board 41 are uneven patterns linearly extending in a direction parallel to the x-axis and curved in a wavy shape on the section parallel to the y-z plane. Although the diffusing patterns 43 are formed to be flat and linear on the section parallel to the z-x plane, there are seams 44 in the form of concavities generated between the diffusing patterns 43 as a result of sagging at the time of molding.

Let us now assume that $\Lambda x$ represents the period of the diffusing patterns 43 in the x-axis direction and that $\Lambda y$ represents the period of the same in the y-axis direction. Then, the period $\Lambda y$ is smaller than the other period $\Lambda x$ in the plane in which light is to be diffused (that is, $\Lambda x \gg \Lambda y$). The period $\Lambda x$ of the diffusing patterns 43 is desirably 50 to 200 µm, and the period $\Lambda y$ is desirably 5 to 20 µm. One reason is that the diffusing patterns 43 become visually perceivable and thereby reduce the display quality of the liquid crystal display when the periods $\Lambda x$ and $\Lambda y$ of the diffusing patterns 43 exceed respective upper limit values. Further, the patterns become difficult to fabricate, and errors generated during the fabrication of the diffusing patterns 43 become great in comparison to the shape of the patterns when the periods $\Lambda x$ and $\Lambda y$ of the diffusing patterns 43 are smaller than respective lower limit values, which can reduce the utilization of light and can result in problems such as color irregularities caused by diffracted light that becomes dominant.

FIG. 7 is an illustration explaining an effect of the diffusing patterns 43 in the y-z plane, and FIG. 8 is an illustration explaining an effect of the diffusing patterns 43 in the z-x plane. The diffusing patterns 43 have a wavy shape on the section parallel to the y-z plane. When it is assumed that γ represents the angle of a line tangential to a light exit point. Then, light exiting a diffusing pattern 43 has a diffusing angle (deflection angle) φy expressed by:

$$\phi y = \gamma/(n-1)$$

where n represents the refractive index of the resin from which the uneven diffusing board 41 is formed and where the refractive index of air is 1.

On the contrary, as shown in FIG. 8, light passing through the diffusing patterns 43 is not diffused in the z-x plane because the diffusing patterns 43 are flat. Diffusion occurs in the z-x plane at the seams 44 between the diffusing patterns 43. However, since the period $\Lambda x$ in the x-axis direction is considerably greater than the period $\Lambda y$ in the y-axis direction, the quantity of light diffused in the z-x plane due to the seams 44 is quite small compared to the quantity of light diffused in the y-z plane by the diffusing patterns 43. Thus, the uneven diffusing board 41 causes diffusion substantially only in the y-z plane.

FIG. 10 is a diagram showing diffusing characteristics of the uneven diffusing board 41. As apparent from the characteristic diagram, the uneven diffusing board 41 causes substantially no diffusion of light in the φx direction in the z-x plane and causes diffusion spreading at about 20° in the φy direction in the y-z plane. The directional characteristics of light exiting the prism sheet 42 are wider in the φx direction and narrower in the φy direction as shown in FIG. 9. When the uneven diffusing board 41 having diffusion characteristics as shown in FIG. 10 is placed on the prism sheet 42 having such directional characteristics, light emitted from the surface light source device 31 will have directional characteristics as shown in FIG. 11. The directivity of light which has exited the uneven diffusing board 41 is substantially equal to the directivity of light which has passed through the prism sheet 42 in the φx direction. However, the directivity of light which has exited the uneven diffusing board 41 is wider than the directivity of light which has passed through the prism sheet 42 in the φy direction. The light is diffused at about 20° on both sides of the z-axis in both of the φx and φy directions, which provides a viewing angle that is sufficient when employed in a liquid crystal display.

FIG. 12 is a perspective view showing a backlight type surface light source device 51 according to a third example of the related art, and FIG. 13 is a schematic sectional view of the same. In this surface light source device 51, a light-emitting portion 53 constituted by a point light source such as an LED is disposed in the vicinity of a corner of a light guide 52. Deflecting pattern elements 55 having a triangular sectional shape are concentrically arranged about the light-emitting portion 53 on a bottom surface of the light guide 52. The pattern density of the deflecting pattern elements 55 is small in the neighborhood of the light-emitting portion 53, and the pattern density increases with the distance from the light-emitting portion 53. A mirror reflection sheet 54 is disposed in a position opposite to the bottom surface of the light guide 52. A prism sheet 62 is disposed in a position opposite to a light exit surface 60 of the light guide 52, and an uneven diffusing board 61 is placed on the same. The prism sheet 62 is formed with prisms having a triangular sectional shape and extending in the form of arcs about the light-emitting portion 53.

A position or direction with respect to the surface light source device 51 will be expressed using cylindrical coordinates. Let us now assume that a direction perpendicular to the light exit surface 60 of the light guide 52 is defined as a z-axis direction; a radial direction about the light-emitting portion 53 is defined as an r-axis direction; θ represents an angle measured from one side of the light guide 52; and a direction perpendicular to the r-axis direction and the z-axis direction is defined as a θ-axis direction. It is also assumed that φr represents an azimuth angle measured from the z-axis in a plane parallel to the r-axis direction and the z-axis direction and that φθ represents an azimuth angle measured from the z-axis in a plane perpendicular to the r-axis direction and parallel to the z-axis direction.

In the surface light source device 51, as shown in FIG. 13, light which has entered the light guide 52 from the light-emitting portion 53 (point light source) radially spreads about the light-emitting portion 53. In addition, each of the deflecting pattern elements 55 is disposed such that the longitudinal direction of the same becomes orthogonal to the direction of connecting it with the light-emitting portion 53 (r-axis direction) in a plan view taken in the z-axis direction. Therefore, the light guided through the light guide 52 travels substantially straightly in the r-axis direction without being scattered in the θ direction even if it is reflected by the deflecting pattern elements 55. As a result, light has directivity as shown in FIG. 14 when it is substantially perpendicularly deflected by the prism sheet 62 after being reflected by the deflecting pattern elements 55 to exit the light exit surface 60 of the light guide 52. The directivity of the light transmitted by the prism sheet 62 is narrow in terms of both of directivity Δϕr in the ϕr direction and directivity Δϕθ in the ϕθ direction. Since the directions of beams of light guided in the light guide 52 substantially agree with the r-axis direction, the directivity Δϕθ in the ϕθ direction is especially narrow.

Therefore, the uneven diffusing board 61 in the third example of the related art must have the function of spreading light transmitted by the prism sheet 62 in the ϕθ direction. For this reason, as shown in FIG. 15(a), diffusing patterns 63 extending in the r-axis direction are disposed concentrically or radially about the light-emitting portion 53. The diffusing patterns 63 are patterns that are flat as shown in FIG. 15(b) on the section indicated by P1-P1 in FIG. 15(a), and there are seams 64 between the diffusing patterns 63. The diffusing patterns 63 are patterns that are wavy as shown in FIG. 15(c) on the section indicated by P2-P2 in FIG. 15(a).

The function of the diffusing patterns 63 is similar to that of the diffusing patterns 43 in the second example of the related art (see FIGS. 7 and 8) except the direction in which light is diffused. The r-axis direction in the third example of the related art corresponds to the x-axis direction of the second example of the related art, and the θ-axis direction in the third example of the related art corresponds to the y-axis direction of the second example of the related art. Therefore, when it is assumed that Λr represents the period of the diffusing patterns 63 in the r-axis direction and that Λθ represents the period in the θ-axis direction, the period Λr in the r-axis direction is greater than the period Λθ in the θ direction (that is, Λr>>Λθ). The period Λr of the diffusing patterns 63 is desirably 50 to 200 μm, and the period Λθ is desirably 5 to 20 μm.

FIG. 17 is a diagram showing diffusing characteristics of the uneven diffusing board 61. As apparent from the characteristic diagram, the uneven diffusing board 61 causes substantially no diffusion of light in the ϕr direction in the z-r plane and causes diffusion spreading at about 20° in the ϕθ direction in the z-θ plane. The directional characteristics of light exiting the prism sheet 62 are wider in the ϕr direction and narrower in the ϕθ direction as shown in FIG. 16. When the uneven diffusing board 61 having diffusion characteristics as shown in FIG. 17 is placed on the prism sheet 62 having such directional characteristics, light emitted from the surface light source device 51 will have directional characteristics as shown in FIG. 18. The directivity of light which has exited the uneven diffusing board 61 is substantially equal to the directivity of light which has passed through the prism sheet 62 in the ϕr direction. However, the directivity of light which has exited the uneven diffusing board 61 is wider than the directivity of light which has passed through the prism sheet 62 in the ϕθ direction. The light is diffused at about 20° on both sides of the z-axis in both of the ϕr and ϕθ directions, which provides a viewing angle that is sufficient to be employed in a liquid crystal display.

However, the surface light source devices 31 and 51 utilizing the uneven diffusing boards 41 and 61 as used in the second and third examples of the related art had a problem when a liquid crystal display panel 65 was overlaid thereon to form a liquid crystal display in that moiré fringes M having a period of several mm were generated on the surface of a liquid crystal display panel 65 to degrade the display quality of the liquid crystal display. FIG. 20 shows how moiré fringes are generated in practice. FIG. 21 is a part of the liquid crystal display panel 65 in which one picture element was formed by a red pixel (R), a green pixel (G), and a blue pixel (B) and in which picture elements had an aperture period Λc=120 μm. When a liquid crystal display panel 65 as shown in FIG. 21 is overlaid on a surface light source device 31 according to the second example of the related art utilizing an uneven diffusing board 41 having a period Λx=200 μm in the x-axis direction and a period Λy=20 μm in the y-axis direction, moiré fringes as shown in FIG. 20 appear in a cycle of several mm to degrade an image on the liquid crystal display. In the case of the surface light source device according to the third example of the related art, moiré fringes not shown in a radial pattern are generated.

It is supposed that moiré fringes are generated on the surface of a liquid crystal display panel for the following reason when an uneven diffusing board having linear diffusing patterns arranged thereon. FIG. 22 shows the state of the uneven diffusing board 41 observed using a microscope, the board being illuminated from the back side thereof (FIG. 50 shows a microphotograph of the same). Luminance is higher at the seams 44 between the diffusing patterns 43 because there is no diffusion of light in the ϕy direction as seen at the diffusing patterns 43, and the uneven diffusing board 41 therefore has peaks of luminance along the seams 44. Since the period of the seams 44 is about 100 μm, the peaks of luminance of the uneven diffusing board 41 are repeatedly generated also in that cycle. The period of luminance peaks and the period Λc of the picture elements of the liquid crystal display panel 65 are similar values, and it is therefore supposed that the moiré fringes M are generated as a result of interference between them.

The use of the uneven diffusing boards 41 and 61 as used in the second and third examples of the related art resulted in another problem in that color flickers as shown in FIG. 23 were generated on the surface of the liquid crystal display panel 65. The reason is supposed as follows. For example, let us assume that the diffusing patterns 43 provided on the uneven diffusing board 41 has a period Λy=10 μm in the y-axis direction and that each of the red, green, and blue pixels of the liquid crystal display panel 65 has an aperture width W=35 μm. When such surface light source device and liquid crystal display panel are combined, as shown in FIG. 24, the number of diffusing patterns 43 extending through each pixel varies between two and three on a case-by-case basis. For example, in the case shown in FIG. 24, three diffusing patterns 43 extend through the aperture of a red pixel (R) and the aperture of a blue pixel (B), whereas only two diffusing patterns 43 extend through the aperture of a green pixel (G). Therefore, there is a maximum difference of 1.5 times between emission intensities of the pixels. In addition, since pixels in different emission colors have the higher intensity depending on their locations, the emission color of pixel having the higher intensity depends on locations, coloring occurs in different colors depending on locations, which is supposed to appear as color flickers.

A board having granular uneven patterns randomly formed thereon may be used as the uneven diffusing board to be used in the second or third example of the related art. FIGS. 25(a), 25(b), 26(a), and 26(b) are illustrations for explaining an uneven diffusing board 71 having different patterns. As shown in FIG. 25(a), the uneven diffusing board 71 has cyclic patterns 72 which are periodically arranged from left to right and from top to bottom such that substantially no gap is left between them. As shown in FIG. 10(b), the cyclic patterns 72 are provided by arranging concavities 73 at random with substantially no gap left between them. Widths H and D of one cyclic pattern 72 in the vertical and horizontal directions are made greater than the size of a pixel of the liquid crystal display panel in order to prevent moiré fringes, and they are both preferably in the range between 100 µm and 1 mm, inclusive. The concavities 73 constituting the cyclic patterns 72 are uneven in dimensions, and they desirably have an outer diameter G in the range between 5 µm and 30 µm, inclusive (in particular, a diameter of about 10 µm is preferable). The concavities 73 are concave-lens-shaped as shown in FIGS. 26(a) and 26(b).

Since the uneven diffusing board 71 has extraordinary diffusing characteristics, the uneven shape of the patterns must be accurately controlled. In doing so, the uneven patterns can be accurately formed by periodically arranging one uneven pattern because all uneven patterns will thus have the same shape and can be fabricated similarly. According to such a method, however, moiré fringes are more likely to be generated on the screen of the liquid crystal display, and pixels are more likely to become perceivable. On the contrary, when it is attempted to dispose uneven patterns at random, the shape and size of the uneven patterns must be varied one by one, which makes it difficult to fabricate them in accurate shapes. Further, the characteristics of the uneven diffusing board can vary depending on locations. For this reason, on the uneven diffusing board 71, the cyclic patterns 72 are formed by disposing concavities 73 having random shapes and dimensions at random, and the cyclic patterns 72 are periodically arranged to facilitate the fabrication of the patterns on the uneven diffusing board 71 while suppressing the generation of moiré fringes.

FIGS. 27(a) and 27(b) are illustrations for explaining the function of the uneven diffusing board 71. The uneven diffusing board 71 has a multiplicity of concavities 73 disposed thereon at random. Since each of the concavities 73 is in the form of a concave lens, when light enters the same perpendicularly from the bottom side thereof as shown in FIG. 27(a), the incident light is diffused about the optical axis by the effect of the concave lens. Therefore, the uneven diffusing board 71 exhibits diffusion characteristics as shown in FIG. 27(b). When it is assumed that n represents the refractive index of the uneven diffusing board 71 and that ε represents the slope of a line segment connecting the center of a concavity 73 and an edge (apex) of the same. In the diffusion characteristics, there are peaks in positions expressed by $\phi x=\phi y=\pm\epsilon/(n-1)$ on both sides of a high peak in the middle. The diffusing characteristics are rotation-symmetric about the z-axis when the concavity 73 is circular.

FIG. 28 is a graph showing actual diffusing characteristics of the uneven diffusing board 71, in which diffusion characteristics in the φx direction and diffusion characteristics in the φy direction coincide with each other. When the uneven diffusion plate 71 having such characteristics is substituted for the uneven diffusing board 41 in the second example of the related art, the directional characteristics shown in FIG. 9 after transmission through the prism sheet 42 are converted as shown in FIG. 29 after transmission through the uneven diffusion plate 71. As a result, the directional characteristics are expanded at about 20° in both of the φx and φy directions, which provides a viewing angle that is sufficient when employed in a liquid crystal display.

No moiré fringe is generated in such uneven diffusing board 71 because the concavities 73 are arranged at random. However, since the concavities 73 are disposed at random, local polarization occurs in the disposition of them to produce differences in emitting intensity between the pixels of a liquid crystal display panel, which has resulted in the problem of color flickers just as in the uneven diffusing board 41. The problem of color flickers similarly occurs when used in the third example of the related art.

Since the uneven diffusing board 71 similarly diffuses light in all directions about the optical axis, a problem has arisen in that it reduces the luminance of the screen of a liquid crystal display by about 15% when compared to the uneven diffusing board 41 and the uneven diffusing board 61.

As described above, an uneven diffusing board formed with linear patterns has the problem of moiré fringes and color flickers, and an uneven diffusing board having granular patterns disposed thereon at random has the problem of color flickers and a reduction in luminance. The elimination of those problems is therefore demanded.

The examples of the related art described above are disclosed in Patent Document 1.

Patent Document 1: JP-A-2003-215584

DISCLOSURE OF THE INVENTION

Problems that the Invention is to Solve

The invention was made taking the above-described technical problems into consideration, and it is an object of the invention to provide a diffusing board which can suppress moiré fringes and color flickers on the screen of a liquid crystal display and which can mitigate a reduction of the luminance of the screen.

MEANS FOR SOLVING THE PROBLEMS

A first diffusing board according to the invention is characterized in that a synthesized pattern obtained by overlapping a first uneven shape including a plurality of concavities or convexities for diffusing incident light in one plane including the optical axis of the incident light and a second uneven shape including a plurality of concavities or convexities for diffusing the incident light about the optical axis of the incident light is formed on either side of a substrate, light entering the substrate from one side thereof and exiting the same from the other side thereof. The optical axis of the incident light is a direction parallel to the beam of light having the maxim luminous intensity among the incident beams of light.

In the first diffusing board according to the invention, since the first uneven shape and the second uneven shape overlap each other, when the degree of diffusion is equal throughout the diffusing board, the contribution of the first uneven shape can be made smaller than that in the case of using the first uneven shape only. The generation of moiré fringes can be thus suppressed. Further, since light can be diffused by the second uneven shape in a direction different from that of the first uneven shape, a greater reduction of moiré fringes can be achieved. When the degree of diffusion is equal throughout the diffusing board, the contribution of the second uneven shape can be made smaller than that in the case of using the second uneven shape only, which allows a reduction in luminance to be made smaller. Further, the first diffusing board according to the invention has finer patterns because the first uneven shape and the second uneven shape overlap each other. It is therefore possible to suppress variations in emission colors between the pixels of a liquid crystal display panel, which allows color flickers to be reduced.

An embodiment of the first diffusing board of the invention is characterized in that the shape of a surface of the synthesized pattern is expressed by:

$$Z=(1-\xi)\times f(x,y)+\xi\times g(x,y)$$

using a parameter $\xi$ satisfying $0 \leqq \xi \leqq 1$, where an x-axis and a y-axis are defined in two orthogonal directions which are parallel to either side of the substrate and a z-axis is defined in a direction perpendicular to the one side; the shape of a surface of the first uneven shape is expressed by $z=f(x, y)$; and the shape of a surface of the second uneven shape is expressed by $z=g(x, y)$.

Therefore, in this embodiment, the diffusing board can be designed with the ratio of distribution between the first uneven shape and the second uneven shape varied arbitrarily by changing the parameter $\xi$ in the range from 0 to 1. In particular, when $z=f(x, y)$ and $z=g(x, y)$ express a first uneven shape and a second uneven shape having the same degree of diffusion, the ratio of distribution between the first uneven shape and the second uneven shape can be changed without changing the degree of diffusion achieved by the diffusing board.

In another embodiment of the first diffusing board of the invention, the parameter $\xi$ is set to satisfy:

$$0.1 \leqq \xi \leqq 0.3.$$

By setting the parameter $\xi$ in this range, the contrast of an image can be increased to prevent color flickering and to maintain high luminance when used in a liquid crystal display.

Another embodiment of the first diffusing board of the invention is characterized in that the first uneven shape is formed by periodically arranging linear concavities or convexities which are long in one direction and in that the second uneven shape is formed by arranging spherical or conical concavities or convexities in a non-periodic manner. When the first uneven shape has linear concavities or convexities which are long in one direction, e.g., features in the form of cylindrical lenses, incident light can be diffused in a plane orthogonal to the longitudinal direction of the same. When the second uneven shape has spherical or conical concavities or convexities, e.g., features in the form of concave lenses, incident light can be diffused about the optical axis of the same. When a synthesized pattern is fabricated according to the embodiment, the synthesized pattern has a region substantially parallel to a surface of the substrate, and a lattice-like feature constituted by an array of substantially rectangular shapes is formed on the region when viewed from either side of the substrate. As a result, it improves the effect of preventing color flickers when used in a liquid crystal display.

Still another embodiment of the first diffusing board of the invention is characterized in that the maximum size of the concavities or convexities forming the second uneven shape is in the range between one-thirds and three times, inclusive, of the period of arrangement of the concavities or convexities forming the first uneven shape when viewed in a direction perpendicular to the substrate. It is therefore possible to reduce color flickers on the screen of a liquid crystal display.

A second diffusing board according to the invention is characterized in that a first uneven shape including a plurality of concavities or convexities for diffusing incident light in one plane including the optical axis of the incident light and a second uneven shape including a plurality of concavities or convexities for diffusing the incident light in one plane including the optical axis of the incident light are disposed in such directions that the two planes are orthogonal to each other on either side of a substrate, light entering the substrate from one side thereof and exiting the same from the other side thereof.

When combined with a liquid crystal display panel, the second diffusing board according to the invention is also capable of reducing moiré fringes, suppressing any reduction in luminance, and reducing color flickers on the screen.

An embodiment of the second diffusing board according to the invention is characterized in that the incident light is a beam of light having narrow directional characteristics in either of two directions orthogonal to the optical axis thereof and wide directional characteristics in the other direction; the concavities or convexities forming the first uneven diffusing shape are disposed to diffuse incident light in a plane parallel to the direction in which the incident light has narrow directional characteristics and the concavities or convexities forming the second uneven diffusing shape are disposed to diffuse incident light in a plane parallel to the direction in which the incident light has wide directional characteristics; and the degree of diffusion provided by the first uneven shape is higher than the degree of diffusion provided by the second uneven shape. Therefore, the use of the diffusing board allows incident light to be widely diffused by the first uneven shape in the direction in which the incident light has narrow directional characteristics and allows the incident light to be narrowly diffused by the second uneven shape in the direction in which the incident light has wide directional characteristics, which makes it possible to improve the visibility of the screen of a liquid crystal display.

In another embodiment of the second diffusing board of the invention, both of the concavities or convexities forming the first uneven shape and the concavities or convexities forming the second uneven shape are linear concavities or convexities which are long in one direction. Linear concavities or convexities which are long in one direction, e.g., features in the form of cylindrical lenses, are capable of diffusing incident light in a plane perpendicular to the longitudinal direction thereof. The degree of diffusion of each of the concavities or convexities forming the first uneven shape and the second uneven shape may be adjusted depending on the curvatures of surfaces thereof or the like.

In still another embodiment of the second diffusing board of the invention, the period of the concavities or convexities forming the second uneven shape in a direction parallel to the plane in which incident light is diffused by the second uneven shape is in the range between one-thirds and three times, inclusive, of the period of the concavities or convexities forming the first uneven shape in a direction parallel to the plane in which incident light is diffused by the first uneven shape. This embodiment makes it possible to reduce color flickers on the screen of a liquid crystal display.

In still another embodiment of the first and second diffusing boards of the invention, the linear concavities or convexities which are long in one direction of the first uneven shape are radially disposed about one predetermined point. Therefore, the diffusing boards according to the invention can be used even in a surface light source device utilizing a very small light source.

In particular, in one of surface light source devices according to the invention, the light source is a point light source; deflecting pattern elements which are in a shape having directivity in the longitudinal direction thereof and which face the point light source substantially perpendicularly in the longitudinal direction are disposed at intervals from each other substantially throughout a surface opposite to the light exit surface of the light guide; prisms having a substantially triangular sectional shape are formed in the form of arcs about a point corresponding to the point light source on a surface of the prism sheet opposite to the light guide; and the linear concavities or convexities, which are long in one direction, of the first uneven shape forming the synthesized pattern of the diffusing board are radially disposed about the point corresponding to the point light source.

In addition to the advantages provided by the use of a diffusing board according to the invention, such a surface light source device allows light emitted by the point light source to exit the light exit surface of the light guide as light having a narrow viewing angle and allows the light to be spread by the diffusing board to achieve a viewing angle providing high visibility. It is therefore possible to obtain a source light source achieving high utilization of light and having high visibility.

The above-described elements of the invention may be arbitrarily combined as long as occasion permits.

BRIEF DESCRIPTION OF THE DRAWINGS

FIG. 1 is an exploded perspective view showing a surface light source device according to a first example of the related art.

FIG. 2 is a schematic sectional view of the surface light source device according to the first example of the related art.

FIG. 3 is an exploded perspective view showing a surface light source device according to a second example of the related art.

FIG. 4 is a schematic sectional view of the surface light source device according to the second example of the related art.

FIG. 5 is a perspective view of the surface light source device showing directional characteristics of light transmitted by a prism sheet.

FIG. 6(a) is a plan view showing the disposition of diffusing patterns on an uneven diffusing board used in the second example of the related art. FIG. 6(b) is an illustration showing a sectional shape of the uneven diffusing board on a section thereof parallel to a z-x plane. FIG. 6(c) is an illustration showing a sectional shape of the uneven diffusing board on a section thereof parallel to a y-z plane.

FIG. 7 is an illustration explaining an effect of the diffusing patterns in the y-z plane.

FIG. 8 is an illustration explaining an effect of the diffusing patterns in the z-x plane.

FIG. 9 is a diagram showing directional characteristics of light exiting the prism sheet.

FIG. 10 is a diagram showing diffusing characteristics of an uneven diffusing board.

FIG. 11 is a diagram showing directional characteristics of light exiting the surface light source device when an uneven diffusing board having diffusion characteristics as shown in FIG. 10 is used.

FIG. 12 is an exploded perspective view showing a surface light source device according to a third example of the related art.

FIG. 13 is a schematic sectional view of the surface light source device according to the third example of the related art.

FIG. 14 is a perspective view of the surface light source device showing directional characteristics of light transmitted by a prism sheet.

FIG. 15(a) is a plan view of an uneven diffusing board used in the third example of the related art. FIG. 15(b) is a sectional view taken along the line P1-P1 in (a). FIG. 15(c) is a sectional view taken along the line P2-P2 in FIG. 15(a).

FIG. 16 is a diagram showing directional characteristics of light exiting the prism sheet.

FIG. 17 is a diagram showing diffusion characteristics of an uneven diffusing board.

FIG. 18 is a diagram showing directional characteristics of light exiting the surface light source device when an uneven diffusing board having diffusion characteristics as shown in FIG. 17 is used.

FIG. 19 is an illustration showing moiré fringes generated on the surface of a liquid crystal display panel in the second example of the related art.

FIG. 20 is an illustration showing moiré fringes in practice.

FIG. 21 is a schematic plan view showing pixel apertures of a liquid crystal display panel.

FIG. 22 is an illustration for explaining the cause of the generation if moiré fringes.

FIG. 23 is an illustration showing color flickers generated on the surface of a liquid crystal display panel.

FIG. 24(a) is an enlarged view of the region F in FIG. 23, and FIG. 24(b) is a diagram showing the emission intensity of each of red, green, and blue pixels.

FIG. 25(a) and FIG. 25(b) are illustrations for explaining structures of uneven diffusing boards having different patterns.

FIG. 26(a) and FIG. 26(b) are a perspective view and a sectional view showing the shape of a concavity provided on the above-mentioned uneven diffusing board.

FIG. 27(a) is an illustration for explaining the function of the uneven diffusing board, and FIG. 27(b) is a graph showing diffusing characteristics of the same.

FIG. 28 is a graph showing diffusing characteristics of the uneven diffusing board.

FIG. 29 is a graph showing directional characteristics of light after being transmitted by the uneven diffusing board.

FIG. 30 is an exploded perspective view showing a surface light source device utilizing an uneven diffusing board according to Embodiment 1 of the invention.

FIG. 31(a) is an illustration showing first uneven patterns. FIG. 31(b) is an illustration showing second uneven patterns. FIG. 31(c) is an illustration showing a pattern of an uneven diffusing board molded using a synthetic pattern synthesized from the first uneven patterns in FIG. 31(a) and the second uneven patterns in FIG. 31(b).

FIG. 32(a) is an illustration for explaining the function of the first uneven patterns, and FIG. 32(b) is an illustration for explaining the function of the second uneven patterns.

FIG. 33(a), FIG. 33(b), FIG. 33(c), FIG. 33(d), FIG. 33(e), and FIG. 33(f) are illustrations for explaining a method of synthesizing the first uneven patterns and the second uneven patterns.

FIG. 34 is a graph showing results of a simulation of changes in the luminance of the screen of the liquid crystal display and the inverse of contrast between apertures for emission colors (R, G, B) of the liquid crystal display panel carried out with a synthesizing ratio ξ varied from 0 to 1.

FIG. 35(a) shows a microscopic image of the synthesized pattern on the uneven diffusing board, and FIG. 35(b) shows a power spectral image of the same.

FIG. 36 is a graph showing distances (spatial frequencies) of the power spectral image in FIG. 35(b) from the origin along the horizontal axis and intensities of the same along the vertical axis.

FIG. 37 is an illustration showing how the uneven diffusing board is photographed through a microscope.

FIG. 38 is an enlarged view showing the synthesized pattern on the uneven diffusing board and a diagram representing the distribution of luminance in an x-axis direction.

FIG. 39 is a graph showing luminance and directional characteristics obtained using the uneven diffusing board according to the invention.

FIG. 40 is a graph showing luminance and directional characteristics obtained using an uneven diffusing board on which only the first uneven patterns are provided.

FIG. 41 is a graph showing luminance and directional characteristics obtained using an uneven diffusing board on which only the second uneven patterns are provided.

FIG. 42 is an illustration showing the uneven diffusing board of Embodiment 1 overlaid on a liquid crystal display panel.

FIG. 43 is a graph showing changes in contrast relative to a size ratio $K/\Lambda y$ between the patterns on the uneven diffusing board.

FIG. 44($a$) is an illustration showing the pattern shape of the synthesized pattern on a z-x plane, and FIG. 44($b$) is a graph showing directional characteristics of the same in the z-x plane.

FIG. 45($a$) is an illustration showing the pattern shape of the synthesized pattern on a y-z plane, and FIG. 45($b$) is a graph showing directional characteristics of the same in the y-z plane.

FIG. 46 is a perspective view showing a surface light source device according to Embodiment 2 of the invention.

FIG. 47($a$) is a schematic illustration showing patterns on a diffusing board according to Embodiment 3 of the invention, and FIG. 47($b$) is an illustration showing an image of the patterns in FIG. 47($a$) observed with a microscope.

FIG. 48($a$) is an illustration showing a section of first uneven patterns in a direction orthogonal to the longitudinal direction thereof, and FIG. 48($b$) is an illustration showing a section of second uneven patterns in a direction orthogonal to the longitudinal direction thereof.

FIG. 49 is a schematic illustration showing a liquid crystal display according to Embodiment 4 of the invention.

FIG. 50 is a microphotograph of the uneven diffusing board shown in FIG. 22.

FIG. 51 is a microphotograph of the uneven diffusing board shown in FIG. 38.

DESCRIPTION OF THE REFERENCE NUMERALS AND SIGNS

32: light guide
33: light-emitting portion
34: mirror reflection sheet
35: deflecting pattern element
38: light entrance surface
40: light exit surface
42: prism sheet
52: light guide
53: light-emitting portion
54: mirror reflection sheet
55: deflecting pattern element
60: light exit surface
81: surface light source device
82: uneven diffusing board
83: transparent substrate
85: second uneven pattern
86: synthesized pattern
91: surface light source device
92: uneven diffusing board

BEST MODE FOR CARRYING OUT THE INVENTION

Embodiments of the invention will now be described in detail with reference to the drawings. However, it is obvious that the invention is not limited to the embodiments described below.

Embodiment 1

FIG. 30 is an exploded perspective view showing a surface light source device 81 utilizing a diffusing board according to Embodiment 1 of the invention. The surface light source device 81 is constituted by a light guide 32, a light-emitting portion 33, a mirror reflection sheet 34, a prism sheet 42, and an uneven diffusing board 82. The constituent members other than the uneven diffusing board 82 will not be described because they are identical to the second example of the related art which has already been described, and only a structure and operations of the uneven diffusing board 82 will be described below.

The uneven diffusing board 82 is obtained by molding a first uneven shape and a second uneven shape on a top surface of a transparent substrate 83 at a time using the stamper method or the like, and the first uneven shape and the second uneven shape are overlapped with each other in a synthetic manner. FIG. 31($a$) and FIG. 31($b$) are illustrations showing the first uneven shape and the second uneven shape, respectively, from which a synthesized pattern originates, and FIG. 31($c$) is an illustration showing part of a pattern formed on a surface of the uneven diffusing board 82 based on a pattern obtained by synthesizing the first uneven shape and the second uneven shape.

The first uneven shape is constituted by first uneven patterns 84 (concavities or convexities). The first uneven patterns 84 are formed with a section having a wavy shape, a semi-circular shape, a semi-elliptic shape, a shape like a cylindrical lens, a shape like a triangular pole-like, a trapezoidal shape or the like. The patterns linearly extend with the section of the same kept uniform and therefore have a linear or bar-like shape. The first uneven patterns 84 are repeatedly arranged in cycles $\Lambda x$ and $\Lambda y$ in X- and y-directions such that they are in parallel with each other. As shown in FIG. 32($a$), a typical optical effect of the first uneven patterns 84 is to diffuse incident light in a plane which includes the optical axis of the incident light (the beam of light having the maximum luminous intensity) and which is perpendicular to the longitudinal direction of the first uneven patterns 84 when the light enters the same from the bottom side thereof.

The second uneven shape is constituted by second uneven patterns 85 (concavities or convexities). The second uneven patterns 85 are formed like spherical concave lenses, non-spherical concave lenses, cones, truncated cones, pyramids, truncated pyramids, or the like and are randomly arranged. The second uneven patterns 85 may have random sizes. Further, the entirety of the second uneven patterns 85 are desirably formed by repeatedly and periodically disposing basic patterns which are randomly arranged (see the explanation of FIG. 25). As shown in FIG. 32($b$), a typical optical effect of the second uneven patterns 85 is to diffuse incident light about a straight line which is parallel to the optical axis of the incident light and which passes through the center of the second uneven patterns 85.

A synthesized pattern 86 on a surface of the surface light source device 81 is synthesized by overlapping the plurality of first uneven patterns 84 arranged as shown in FIG. 31($a$) and the plurality of second uneven patterns 85 arranged as shown in FIG. 31($b$). FIG. 33($a$), FIG. 33($b$), FIG. 33($c$), FIG. 33($d$), FIG. 33($e$), and FIG. 33($f$) illustrate a method of synthesizing the first uneven patterns 84 and the second uneven patterns 85. FIG. 33($a$) and FIG. 33($b$) show a pattern shape of the first uneven patterns 84 on a section parallel to the y-z plane and a pattern shape of the same on a section parallel to the z-x plane. FIG. 33($c$) and FIG. 33($d$) show a pattern shape of the second uneven patterns 85 on a section parallel to the y-z plane and a pattern shape of the same on a section parallel to the z-x plane. FIG. 33(e) and FIG. 33(f) show a pattern shape of the synthesized pattern 86 on a section parallel to the y-z plane and a pattern shape of the same on a section parallel to the z-x plane.

Let us now assume that the height of the first uneven patterns 84 shown in FIG. 33(a) and FIG. 33(b) is represented by z=z1 and that the shape of the first uneven patterns 84 is expressed by z=z1=f(x, y). Similarly, let us assume that the height of the second uneven patterns 85 shown in FIG. 33(c) and FIG. 33(d) is represented by z=z2 and that the shape of the second uneven patterns 85 is expressed by z=z2=g(x, y). Then, the shape of the synthesized pattern 86 shown in FIG. 33(e) and FIG. 33(f) is expressed by overlapping the first uneven patterns 84 and the second uneven patterns 85. That is, when it is assumed that the synthesized pattern 86 has a height z=z3, the shape of the synthesized pattern 86 is expressed by:

$$Z=z3=z1+z2=f(x,y)+g(x,y).$$

When the shape of the synthesized pattern 86 is thus determined, a Ni master board is fabricated using electron beam lithography; a stamper is fabricated from the master board, an ultraviolet curing resin applied on a transparent substrate 83 is molded using the stamper; and the ultraviolet curing resin is cured by irradiating it with ultraviolet light to obtain an uneven diffusing board 82.

Let us assume that the pattern shape z1=f(x, y) of the first uneven patterns 84 represents patterns having the degree of diffusion to be achieved and that the pattern shape z2=g(x, y) of the second uneven patterns 85 also represents patterns having the degree of diffusion to be achieved. Then, the synthesized pattern 86 having a pattern shape expressed by Equation 1 below is also a pattern having the degree of diffusion to be achieved.

$$z=z3=(1-\xi)\times f(x,y)+\xi\times g(x,y) \quad (1)$$

where ξ represents the ratio in which the second uneven patterns 85 are synthesized and which satisfies 0≦ξ≦1. Therefore, when the synthesized pattern 86 is designed using Equation (1), the shape of the synthesized pattern 86 can be varied using ξ as a parameter while maintaining the target degree of diffusion. Therefore, an optimum shape of the synthesized pattern 86 can be determined by determining the value of ξ at which moiré fringes, color flickers, a reduction in luminance, and the like can be minimized using ξ as a parameter.

FIG. 34 shows a simulation of the luminance of the screen of the liquid crystal display and the inverse of contrast between apertures for emission colors (R, G, B) of the liquid crystal display panel shown in FIG. 21. As apparent from FIG. 34, the luminance of the screen becomes lower as the ratio of the second uneven patterns 85 becomes greater as a result of an increase in ξ. The reason is that the luminance of the second uneven patterns 85 is about 15% lower than the first uneven patterns 84. The inverse of contrast is great when ξ is in the range expressed by ξ=0.2 to 0.8. The inverse of contrast becomes small when ξ is smaller than 0.2 and also when ξ is in the excess of 0.8.

Referring to FIG. 34, the inverse of contrast approaches 1 to make color flickers less visible, as the synthesizing ratio ξ increases from 0 to 0.5, although luminance gradually decreases. The value of the synthesizing ratio ξ of the second uneven patterns 85 is desirably set in a range in which the inverse of contrast is 0.95 or more and in which luminance does not decrease by 10% or more of that of the first uneven patterns 84. It is therefore desirable to set the value (design range) of the synthesizing ratio of the second uneven patterns 85 to satisfy:

$$0.1\leq\xi\leq0.3$$

More desirably, the value is set at about 0.2.

In practice, however, even when the molding die (stamper) for molding the synthesized pattern 86 is fabricated by accurately synthesizing the first uneven patterns 84 and the second uneven patterns 85, the synthesized pattern 86 molded using the molding die undergoes some deformation. Specifically, since the synthesized pattern 86 obtained by synthesizing the first and second uneven patterns 84 and 85 has finer patterns compared to the first and second uneven patterns 84 and 85, difficulty can occur in filling tips of the synthesized pattern 86 with the resin, and the pattern is likely to have slight distortion. As a result, the top surfaces of the first uneven patterns 84 and the tips of the second uneven patterns 85 constitute regions substantially parallel to the transparent substrate 83, and the regions substantially parallel to the transparent substrate 83 form a lattice-like feature that is an array of substantially rectangular shapes, as shown in FIG. 31(c) (a microphotograph of an actual synthesized pattern 86 is shown in FIG. 51). In particular, when the synthesizing ratio ξ is small, the first uneven patterns 84 appear with higher intensity, and the synthesized pattern 86 is therefore likely to become a lattice-like pattern that is an array of substantially rectangular shapes as shown in FIG. 31(c) and FIG. 51.

FIG. 35(a) shows a microscopic image of the synthesized pattern 86 on the uneven diffusing board 82. The image was obtained by photographing the synthesized pattern 86 through a microscope objective lens 87 while irradiating the uneven diffusing board 82 with parallel light from the bottom side thereof as shown in FIG. 37. Referring to FIG. 35(a), one can observe two patterns, i.e., first uneven patterns 84 which are obviously long in one direction and a plurality of second uneven patterns 85 which are randomly arranged. Referring to the second uneven patterns 85, since the sides of adjoining uneven patterns along which the patterns contact each other form straight lines, the second uneven patterns 85 appear as an array of polygonal shapes in practice.

FIG. 35(b) shows a power spectral image obtained by performing two-dimensional Fourie transform of the original image in FIG. 35(a). On the power spectral image in FIG. 35(b), peaks existing on the y-axis and a peak spreading in all directions can be observed. The peaks existing on the y-axis correspond to the period Λy of the first uneven patterns 84 elongate in one direction, and the peak spreading in all directions corresponds to an outline dimension K of an array of a plurality of the second uneven patterns 85.

FIG. 36 shows a graph (power spectral components) showing distances (spatial frequencies) of the power spectral image in FIG. 35(b) from the origin along the horizontal axis and intensities of the same along the vertical axis. A peak attributable to a component of the first uneven patterns 84 and a peak attributable to a component of the second uneven patterns 85 appear separately from each other again.

The moiré eliminating effect provided by the uneven diffusing board 82 according to the invention will now be described. In the case of the second example of the related art, moiré fringes have been generated due to peaks of luminance periodically generated at the seams 44 between the diffusing patterns 43. In the case of the uneven diffusing board 82 used in the invention, since components of the first uneven patterns 84 corresponding to the diffusing patterns 43 constitute part of the synthesized pattern 86, resultant peaks of luminance are small accordingly, and moiré fringes are less likely to be generated. Further, since the first uneven patterns 84 and the second uneven patterns 85 overlap each other, pattern seams are eliminated, and the possibility of periodic generation of high luminance peaks is reduced as seen on the luminance distribution in FIG. 38 (FIG. 51 shows a microphotograph of the uneven diffusion board described here). As a result, interference is unlikely to occur between the uneven diffusing board 82 and the pitch of the apertures of a liquid crystal display panel, and moiré fringes can therefore be eliminated.

It is expected that the uneven diffusion board 82 according to the invention will provide luminance that is intermediate between those provided by the first uneven patterns 84 and the second uneven patterns 85. FIG. 39, FIG. 40, and FIG. 41 show a comparison of luminance and directional characteristics made between a case in which the uneven diffusing board 82 according to the invention is used, a case in which an uneven diffusing board having only the first uneven patterns 84 is used, and a case in which an uneven diffusing board having only the second uneven patterns 85 is used, respectively. In any of those cases, directivity of about 20° is achieved to provide a viewing angle which can be satisfactorily used for the purpose of display.

Let us now assume that luminance achieved using the diffusing board having only the first uneven patterns 84 serves as a reference and that the luminance is 1. Then, luminance of 0.85 was achieved using the diffusing board having only the second uneven patterns 85, and luminance of 0.95 was achieved using the uneven diffusing board 82 according to the invention. Therefore, the use of the uneven diffusing board 82 results in luminance 10% higher than that achievable using the uneven diffusing board having only the second uneven patterns 85, although the luminance is lower in comparison to that achievable using the uneven diffusing board having only the first uneven diffusing patterns 84.

A description will now be made on a reason for the elimination of color flickers achieved by the use of the uneven diffusing board 82 according to the invention. As apparent from FIG. 22, the synthesized pattern 86 is a pattern which is finer compared to either of the first uneven diffusing patterns 84 and the second uneven diffusing patterns 85 and which is uniformly distributed throughout the uneven diffusing board 82 because it is obtained by overlapping the first uneven diffusing patterns 84 and the second uneven diffusing patterns 85. As a result, when the liquid crystal display panel 65 is laid on the surface light source device 81, no difference in the amount of distribution is observed between the synthesized pattern 86 distributed in a red pixel 65R, the synthesized pattern 86 distributed in a green pixel 65G, and the synthesized pattern 86 distributed in a blue pixel 65B, as shown in FIG. 42. Therefore, the pixels in the respective emission colors are illuminated to the same brightness, and the possibility of color flickering is thus reduced.

A more specific description will be made with reference to FIG. 42. The liquid crystal display panel 65 has an aperture period $\Lambda c = 150$ μm, and the aperture of each emission color has a vertical size D1=100 μm and a width D2=35 μm. The first uneven patterns 84 have a period $\Lambda x = 100$ μm in the x direction and a period $\Lambda y = 10$ μm in the y direction, and the second uneven patterns 85 have an outline dimension K=11 μm. Luminance in the red pixels 65R, green pixels 65G, and blue pixels 65B was measured to have the following ratio:

red pixel luminance:green pixel luminance:blue pixel luminance=1.03:1.03:1

Thus, an improved contrast ratio of 1.03 is achieved. Therefore, uneven diffusing board 82 can substantially mitigate color flickers on a screen.

The contrast of the luminance in pixel apertures changes as shown in FIG. 43 relative to the ratio of the period $\Lambda y$ of the first uneven patterns 84 to the outline dimension of the second uneven patterns 85 or a ratio $K/\Lambda y$. Referring to the condition to be satisfied in order that no color flicker is observed, it is about 1.1 in terms of contrast. Therefore, according to results of experiments, the relationship between the period $\Lambda y$ of the first uneven patterns 84 in the direction orthogonal to the longitudinal direction thereof and the outline dimension K of the second uneven patterns 85 desirably satisfies:

$1/3 \leq K/\Lambda y \leq 3$

It is more desirable that the relationship satisfies:

$1/2 \leq K/\Lambda y \leq 2$

FIG. 44(a) shows a section of the synthesized pattern 86 on the y-Z plane, and FIG. 44(b) shows diffusing characteristics of the synthesized pattern 86 on the y-z plane. FIG. 45(a) shows a section of the synthesized pattern 86 in the z-x plane, and FIG. 45(b) shows diffusing characteristics of the synthesized pattern 86 in the z-x plane. The sloping angle of the synthesized pattern 86 in the y-z plane is a sloping angle γ of the first uneven patterns 84 plus a sloping angle ε of the second uneven patterns 85, and the diffusing characteristics in the y-z plane are determined by the angles γ and ε. The sloping angle of the synthesized pattern 86 in the z-x plane is determined only by the sloping angle ε of the second uneven patterns 85, and the diffusing characteristics include peaks at ±ε/(n−1). Therefore, the diffusing characteristics in the y-z plane and the diffusing characteristics in the z-x plane can be optimized by adjusting the angles γ and ε of the first uneven diffusion patterns 84 and the second uneven diffusing patterns 85.

Embodiment 2

FIG. 46 is a perspective view showing a surface light source device 91 according to Embodiment 2 of the invention. Details of constituent parts of Embodiment 2 will be also omitted other than an uneven diffusing board 92 because the embodiment has the same configuration as that of the third example of the related art. In the uneven diffusing board 92 used in Embodiment 2, a synthesized pattern 95 is formed by overlapping first uneven patterns 93 having a linear shape and radially extending about a light source 53 and a second uneven patterns 94 in the form of spheres, cones, or the like arranged in a non-periodic manner. The description of Embodiment 1 applies to Embodiment 2 when the description of the Embodiment 1 is read with the x-axis direction and the y-axis direction replaced by the r-axis direction and the θ-axis direction, respectively.

Embodiment 3

FIG. 47(a) is a plan view showing patterns provided on an uneven diffusing board 96 according to Embodiment 3 of the invention. In Embodiment 3, first uneven patterns 97 having a linear shape are arranged parallel to each other in a cycle $\Lambda y$, and second uneven patterns 98 having a linear shape are arranged parallel to each other in a cycle $\Lambda x$. In Embodiment 3, both of the first uneven patterns 97 and the second uneven patterns 98 are molded to have a wavy sectional shape, a semi-circular sectional shape, a shape like a cylindrical lens, a trapezoidal sectional shape, a shape like a triangular pole, or the like. The first uneven patterns 97 and the second uneven patterns 98 are disposed such that they are orthogonal to each other in the longitudinal direction thereof. Since those patterns are very fine, they appear like a lattice as shown in FIG. 47(b) even when viewed with a microscope.

FIG. 48(a) is an illustration showing a section of the first uneven patterns 97 in a direction orthogonal to the longitudinal direction thereof, and FIG. 48(b) is an illustration showing a section of the second uneven patterns 98 in a direction orthogonal to the longitudinal direction thereof. As shown in FIG. 48, a pattern height H2 of the second uneven patterns 98 is smaller than a pattern height H1 of the first uneven patterns 97, and a pattern period Λx of the second uneven pattern 98 is longer than a pattern period Λy of the first uneven patterns 97. Therefore, the second uneven patterns 98 are smaller in diffusing characteristics than the first uneven patterns 97.

In particular, the aspect ratio H2/Λx of the second uneven patterns 98 is as small as about one-fifth of the aspect ratio H1/Λy of the first uneven patterns 97. A combination of the first uneven patterns 97 and the second uneven patterns 98 as thus described allows the diffusing characteristics in the y direction to be made smaller than the diffusing characteristics in the x direction and allows substantially no reduction in luminance.

Thus, peaks of luminance at seams between the first uneven patterns 97 become small as a result of diffusion of light provided by the second uneven patterns 98, and peaks of luminance at seams between the second uneven patterns 98 become small as a result of diffusion of light provided by the first uneven patterns 97. Consequently, the peaks become less likely to generate moiré fringes as result of interference with the periods of the pixel apertures of a liquid crystal display panel.

Since the vertical and horizontal combination of the first uneven patterns 97 and the second uneven patterns 98 results in fine patterns, maldistribution of patterns is less likely to occur at each pixel aperture of a liquid crystal display panel, and color flickers are reduced. In particular, in order to reduce color flickers, the ratio between the period Λy of the first uneven patterns 97 and the period Λx of the second uneven patterns 98 is desirably set to satisfy:

$$1/3 \leq \Lambda x/\Lambda y \leq 3$$

The ratio is more desirably set to satisfy:

$$1/2 \leq \Lambda x/\Lambda y \leq 2$$

Embodiment 4

FIG. 49 is a schematic sectional view showing a liquid crystal display 111 according to the invention. The display is provided by, for example, placing a liquid crystal panel 112 on a surface light source device 81 according to Embodiment 1 in a face-to-face relationship.

As described above, a diffusing board according to the invention makes it possible to suppress moiré fringes and color flickers while maintaining high luminance of the screen of the liquid crystal display.

The invention claimed is:

1. A diffusing board in which
a synthesized pattern obtained by overlapping a first uneven shape including a plurality of concavities or convexities for diffusing incident light in one plane including the optical axis of said incident light and a second uneven shape including a plurality of concavities or convexities for diffusing the incident light about the optical axis of said incident light is formed on either side of a substrate, light entering the substrate from one side thereof and exiting the same from the other side thereof,
wherein the shape of a surface of the synthesized pattern is expressed by:

$Z=(1-\xi)\times f(x,y)+\xi\times g(x,y)$ using a parameter $\xi$ satisfying $0.1 < \xi < 0.3$, where an x-axis and a y-axis are defined in two orthogonal directions which are parallel to either side of the substrate and a z-axis is defined in a direction perpendicular to the one side;
the shape of a surface of the first uneven shape is expressed by z=f(x, y); and
the shape of a surface of the second uneven shape is expressed by z=g(x, y),
wherein the first uneven shape is formed by periodically arranging linear concavities or convexities which are long in one direction; and the second uneven shape is formed by arranging spherical or conical concavities or convexities in a non-periodic manner such that there are no gaps between the spherical concavities or convexities, and
wherein the maximum size of the concavities or convexities forming the second uneven shape is in the range between one-thirds and three times, inclusive, of the period of arrangement of the concavities or convexities forming the first uneven shape when viewed in a direction perpendicular to the substrate.

2. A diffusing board according to claim 1, characterized in that the synthesized pattern has a region substantially parallel to a surface of the substrate, and a lattice-like feature constituted by an array of substantially rectangular shapes is formed on the region when viewed from either side of the substrate.

* * * * *